United States Patent
Gunn et al.

(10) Patent No.: US 12,491,153 B2
(45) Date of Patent: Dec. 9, 2025

(54) INNATE TARGETING OF ADOPTIVE CELLULAR THERAPIES

(71) Applicant: Qu Biologics Inc., Burnaby (CA)

(72) Inventors: Harold David Gunn, Vancouver (CA); David W. Mullins, Norwich, VT (US); Mark Bazett, Burnaby (CA); Shirin Kalyan, Burnaby (CA)

(73) Assignee: Qu Biologics Inc., Burnaby (CA)

( * ) Notice: Subject to any disclaimer, the term of this patent is extended or adjusted under 35 U.S.C. 154(b) by 592 days.

(21) Appl. No.: 16/957,505

(22) PCT Filed: Dec. 28, 2018

(86) PCT No.: PCT/CA2018/051683
§ 371 (c)(1),
(2) Date: Jun. 24, 2020

(87) PCT Pub. No.: WO2019/134036
PCT Pub. Date: Jul. 11, 2019

(65) Prior Publication Data
US 2021/0052645 A1    Feb. 25, 2021

Related U.S. Application Data

(60) Provisional application No. 62/743,935, filed on Oct. 10, 2018, provisional application No. 62/613,259, filed on Jan. 3, 2018.

(51) Int. Cl.
*A61K 9/00* (2006.01)
*A61K 39/00* (2006.01)
(Continued)

(52) U.S. Cl.
CPC ............ *A61K 9/0019* (2013.01); *A61K 39/02* (2013.01); *A61K 39/39* (2013.01); *A61K 40/11* (2025.01);
(Continued)

(58) Field of Classification Search
CPC ............ A61K 35/17; A61K 2039/5158; A61K 39/0011; A61K 39/02; A61P 35/00; A61P 37/04; C07K 14/7051; C07K 2319/03
See application file for complete search history.

(56) References Cited

U.S. PATENT DOCUMENTS 8,034,359 B2 * 10/2011 Gunn ................ A61K 39/0011
                                                424/259.1
8,501,198 B2 *  8/2013 Gunn ............. A61K 39/464838
                                                424/257.1
(Continued)

FOREIGN PATENT DOCUMENTS

WO    WO0209748 A1    2/2002
WO    WO03051305 A2   6/2003
(Continued)

OTHER PUBLICATIONS

Altschul et al., Basic Local Alignment Search Tool, J. Mol. Biol., May 1990, 215:403-10. (Year: 1990).*

(Continued)

*Primary Examiner* — Gary B Nickol
*Assistant Examiner* — Amelia Nicole Dickens
(74) *Attorney, Agent, or Firm* — Shweta Chandra; Bret E. Field; Bozicevic, Field & Francis LLP

(57) ABSTRACT

Therapeutic modalities are provided for targeting adoptive cellular therapies to specific sites of disease, involving the use of specific repertoires of PRR ligands. In effect, innate immune system signaling is provoked so as to facilitate the homing of adoptive immune cells to sites of disease, for example to the site of a solid tumor.

18 Claims, 9 Drawing Sheets

(51) Int. Cl.

| | | |
|---|---|---|
| A61K 39/02 | (2006.01) | |
| A61K 39/39 | (2006.01) | |
| A61K 40/11 | (2025.01) | |
| A61K 40/31 | (2025.01) | |
| A61K 40/32 | (2025.01) | |
| A61K 40/42 | (2025.01) | |
| A61P 35/00 | (2006.01) | |
| A61P 37/04 | (2006.01) | |
| C07K 14/725 | (2006.01) | |

(52) U.S. Cl.
CPC .............. *A61K 40/31* (2025.01); *A61K 40/32* (2025.01); *A61K 40/4202* (2025.01); *A61K 40/4255* (2025.01); *A61K 40/4273* (2025.01); *A61P 35/00* (2018.01); *A61P 37/04* (2018.01); *C07K 14/7051* (2013.01); *A61K 2039/52* (2013.01); *A61K 2039/545* (2013.01); *A61K 2039/55594* (2013.01); *A61K 2239/31* (2023.05); *A61K 2239/38* (2023.05); *A61K 2239/50* (2023.05); *A61K 2239/55* (2023.05); *A61K 2239/57* (2023.05); *C07K 2319/03* (2013.01)

(56) References Cited

U.S. PATENT DOCUMENTS

| | | | |
|---|---|---|---|
| 8,980,279 | B2* | 3/2015 | Gunn .................. A61K 39/085 424/257.1 |
| 9,107,864 | B2* | 8/2015 | Gunn .................. A61K 31/405 |
| 9,272,002 | B2 | 3/2016 | Powell, Jr. et al. |
| 9,320,787 | B2* | 4/2016 | Gunn ............ A61K 39/464838 |
| 9,320,788 | B2 | 4/2016 | Gunn |
| 9,365,641 | B2 | 6/2016 | June et al. |
| 9,394,368 | B2 | 7/2016 | Brogdon et al. |
| 9,402,865 | B2 | 8/2016 | Powell et al. |
| 9,447,194 | B2 | 9/2016 | Jensen |
| 9,598,489 | B2 | 3/2017 | Powell, Jr. |
| 9,701,758 | B2 | 7/2017 | Cooper et al. |
| 9,775,896 | B2 | 10/2017 | Gunn |
| 10,086,066 | B2* | 10/2018 | Gunn .................. A61K 39/0241 |
| 10,130,692 | B2* | 11/2018 | Gunn .................. A61K 39/102 |
| 10,251,946 | B2 | 4/2019 | Gunn et al. |
| 10,946,083 | B2 | 3/2021 | Gunn et al. |
| 2010/0203056 | A1* | 8/2010 | Irving .................. A61P 31/04 435/69.6 |
| 2011/0020401 | A1* | 1/2011 | Gunn .................. A61K 45/06 424/234.1 |
| 2012/0148552 | A1 | 6/2012 | Jensen |
| 2013/0115245 | A1* | 5/2013 | Lubitz ................ A61K 39/4622 424/277.1 |
| 2013/0287748 | A1 | 10/2013 | June et al. |
| 2014/0050708 | A1 | 2/2014 | Powell et al. |
| 2014/0099340 | A1 | 4/2014 | June et al. |
| 2014/0271635 | A1 | 9/2014 | Brogdon et al. |
| 2014/0286973 | A1 | 9/2014 | Powell, Jr. |
| 2014/0301993 | A1 | 10/2014 | Powell, Jr. et al. |
| 2014/0314795 | A1 | 10/2014 | Riddell et al. |
| 2014/0322275 | A1 | 10/2014 | Brogdon et al. |
| 2014/0370045 | A1 | 12/2014 | June et al. |
| 2015/0024482 | A1 | 1/2015 | Frigault et al. |
| 2015/0038684 | A1 | 2/2015 | Jensen |
| 2015/0140019 | A1 | 5/2015 | June et al. |
| 2015/0225480 | A1 | 8/2015 | Powell, Jr. |
| 2015/0307623 | A1 | 10/2015 | Abbot et al. |
| 2015/0342993 | A1 | 12/2015 | Kloss et al. |
| 2015/0376296 | A1 | 12/2015 | Fedorov et al. |
| 2016/0008398 | A1 | 1/2016 | Sadelain et al. |
| 2016/0009813 | A1 | 1/2016 | Themeli et al. |
| 2016/0045551 | A1 | 2/2016 | Brentjens et al. |
| 2016/0122766 | A1 | 5/2016 | Wucherpfennig et al. |
| 2016/0228547 | A1 | 8/2016 | Wagner et al. |
| 2016/0311917 | A1 | 10/2016 | Beatty et al. |
| 2016/0326265 | A1 | 11/2016 | June et al. |
| 2016/0361360 | A1 | 12/2016 | Chang et al. |
| 2017/0002072 | A1 | 1/2017 | Powell et al. |
| 2017/0067022 | A1 | 3/2017 | Poirot et al. |
| 2017/0107285 | A1 | 4/2017 | Jensen |
| 2017/0136063 | A1 | 5/2017 | Perez et al. |
| 2017/0137783 | A1 | 5/2017 | Bedoya et al. |
| 2017/0145095 | A1 | 5/2017 | Abken et al. |
| 2017/0158749 | A1 | 6/2017 | Cooper et al. |
| 2017/0166652 | A1 | 6/2017 | Schreiber et al. |
| 2017/0174771 | A1 | 6/2017 | Morgan et al. |
| 2017/0183407 | A1 | 6/2017 | Cooper et al. |
| 2017/0224798 | A1 | 8/2017 | Cooper et al. |
| 2017/0232070 | A1 | 8/2017 | Junghans |
| 2017/0240630 | A1 | 8/2017 | Powell, Jr. |
| 2017/0260268 | A1 | 9/2017 | Beatty et al. |
| 2017/0283775 | A1 | 10/2017 | June et al. |
| 2017/0313759 | A1 | 11/2017 | Batuwangala |
| 2017/0334968 | A1 | 11/2017 | Cooper et al. |
| 2017/0335281 | A1 | 11/2017 | Loew et al. |

FOREIGN PATENT DOCUMENTS

| | | |
|---|---|---|
| WO | WO2005120560 A1 | 12/2005 |
| WO | WO2007035368 A2 | 3/2007 |
| WO | WO2008049231 A1 | 5/2008 |
| WO | WO2009091826 A3 | 11/2009 |
| WO | WO2010025177 A1 | 3/2010 |
| WO | WO2012012874 A1 | 2/2012 |
| WO | WO2012079000 A1 | 6/2012 |
| WO | WO2012099973 A2 | 7/2012 |
| WO | WO2013063419 A2 | 5/2013 |
| WO | WO2013030670 A3 | 8/2013 |
| WO | WO2013123061 A1 | 8/2013 |
| WO | WO2013126712 A1 | 8/2013 |
| WO | WO2013126726 A1 | 8/2013 |
| WO | WO2013126729 A1 | 8/2013 |
| WO | WO2014011987 A1 | 1/2014 |
| WO | WO2014011988 A2 | 1/2014 |
| WO | WO2014055442 A2 | 4/2014 |
| WO | WO2014055771 A1 | 4/2014 |
| WO | WO2014130657 A1 | 8/2014 |
| WO | WO2015090230 A1 | 6/2015 |
| WO | WO2015142675 A2 | 9/2015 |
| WO | WO2015157399 A1 | 10/2015 |
| WO | WO2015164979 A1 | 11/2015 |
| WO | WO2016044605 A1 | 3/2016 |
| WO | WO2016055551 A1 | 4/2016 |
| WO | WO2016073629 A1 | 5/2016 |
| WO | WO2016126608 A1 | 8/2016 |
| WO | WO-2016126878 A2 * | 8/2016 |
| WO | WO2016149665 A1 | 9/2016 |
| WO | WO2016154628 A1 | 9/2016 |
| WO | WO2015188141 A8 | 10/2016 |
| WO | WO2016174652 A1 | 11/2016 |
| WO | WO2017015427 A1 | 1/2017 |
| WO | WO2017027291 A1 | 2/2017 |
| WO | WO2017040324 A1 | 3/2017 |
| WO | WO2017040945 A1 | 3/2017 |
| WO | WO2017041143 A1 | 3/2017 |
| WO | WO2017049166 A1 | 3/2017 |
| WO | WO2017059557 A1 | 4/2017 |
| WO | WO2017070395 A1 | 4/2017 |
| WO | WO2017070649 A1 | 4/2017 |
| WO | WO2017075147 A1 | 5/2017 |
| WO | WO2017075537 A1 | 5/2017 |
| WO | WO2017108805 A1 | 6/2017 |
| WO | WO2017149515 A1 | 9/2017 |
| WO | WO2017178562 A1 | 10/2017 |
| WO | WO-2017185180 A1 * | 11/2017 ............. A61K 35/74 |
| WO | WO2018085937 A1 | 5/2018 |

OTHER PUBLICATIONS

Craddock et al., Enhanced tumor trafficking of GD2 chimeric antigen receptor T cells by expression of the chemokine receptor CCR2b, J Immunother, Oct. 2010, 33(8):780-788. Made of record in IDS filed May 25, 2021. (Year: 2010).*

(56) References Cited

OTHER PUBLICATIONS

Spear et al., Collaboration of chimeric antigen receptor (CAR)-expressing T cells and host T cells for optimal elimination of established ovarian tumors, OncoImmunology, Apr. 1, 2013, 2:4,e23564. Made of record in IDS filed May 25, 2021. (Year: 2013).*
Yong et al. "CAR T-cell therapy of solid tumors", 2017, Immunology and Cell Biology, vol. 95, p. 356-363. (Year: 2017).*
Bressler et al., Site-Specific Immunomodulator: A Novel Treatment for Crohn's Disease, Gastroenterology Research and Practice, May 12, 2015, vol. 2015, doi:10.1155/2015/231243, ISSN 1687-6121, pp. 1-8. (Year: 2015).*
Craddock et al., Enhanced tumor trafficking of GD2 chimeric antigen receptor T cells by expression of the chemokine receptor CCR2b, J Immunother, Oct. 2010, 33(8):780-788. (Year: 2010).*
Mokhtari et al. "Combination therapy in combating cancer", Mar. 30, 2017, Oncotarget, vol. 8, No. 23, p. 38022-38043. (Year: 2017).*
Dai et al. "Development of an *Escherichia coli* Expressing Listeriolysin-O Vaccine Against Wilms Tumor Gene 1-expressing Tumors " Oct. 2009, Journal of Immunotherapy, vol. 32, No. 8, p. 845-855. (Year: 2009).*
Hernandez-Flores et al. "Biological Effects of Listeriolysin O: Implications for Vaccination", 2015, BioMed Research International, vol. 2015, Article ID 360741, p. 1-9. (Year: 2015).*
Rafiq et al. "Optimized T-cell receptor-mimic chimeric antigen receptor T cells directed toward the intracellular Wilms Tumor 1 antigen", published online Dec. 7, 2016, Leukemia, vol. 31, p. 1788-1797. (Year: 2016).*
Bressler et al. "Site-Specific Immunomodulator: A Novel Treatment for Crohn's Disease", 2015, Gastroenterology Research and Practice, vol. 2015, Article ID 231243, 7 pages. (Year: 2015).*
Spear et al., Collaboration of chimeric antigen receptor (CAR)-expressing T cells and host T cells for optimal elimination of established ovarian tumors, OncoImmunology, Apr. 1, 2013, 2:4,e23564. (Year: 2013).*
Tokunaga et al. "CXCL9, CXCL10, CXCL11/CXCR3 axis for immune activation—A target for novel cancer therapy", Nov. 26, 2017, Cancer Treatment Reviews, vol. 63, p. 40-47. (Year: 2017).*
Ahmed et al., Human epidermal growth factor receptor 2 (HER2)-specific chimeric antigen receptor-modified T cells for the immunotherapy of HER2-positive sarcoma, J Clin Oncol, May 2015, 33(15): 1688-1696.
Ahmed et al., T cells redirected against HER2 for the adoptive immunotherapy for HER2-positive osteosarcoma, Cancer Res, Apr. 2012, Abstract only.
Altschul et al., Basic Local Alignment Search Tool, J. Mol. Biol., May 1990, 215:403-10.
Bazett et al., Harnessing innate lung anti-cancer effector functions with a novel bacterial-derived immunotherapy, OncoImmunolgy, (Nov. 27, 2017), vol. 7, No. 3, doi:10.1080/2162402X.2017. 1398875, ISSN 2162-4011, pp. 1-13.
Bazett et al., A novel microbe-based treatment that attenuates the inflammatory profile in a mouse model of allergic airway disease, Sci. Rep. 6, 35338, Oct. 2016.
Beatty et al., Mesothelin-specific chimeric antigen receptor mRNA-engineered T cells induce anti-tumor activity in solid malignancies, Cancer Immunol Res, Feb. 1, 2014; 2(2): 112-120.
Beatty et al., Safety and antitumor activity of chimeric antigen receptor modified T cells in patients with chemotherapy refractory metastatic pancreatic cancer, J Clin Oncol, 2015, 33(15):3007.
Bordon, Innate memory training, 2014, Nature Reviews Immunology, AOP, published online Oct. 10, 2014.
Brentjens et al., Genetically targeted T cells eradicate systemic acute lymphoblastic leukemia xenografts, Clin Cancer Res, Sep. 15, 2007, 13(18 Pt 1):5426-35.
Brentjens et al., Safety and persistence of adoptively transferred autologous CD19-targeted T cells in patients with relapsed or chemotherapy refractory B-cell leukemias, Blood, Nov. 3, 2011, 118(18):4817-4828.

Bressler et al., Site-Specific Immunomodulator: A Novel Treatment for Crohn's Disease, Gastroenterology Research and Practice, May 12, 2015, vol. 2015, doi:10.1155/2015/231243, ISSN 1687-6121, pp. 1-8.
Broz et al., Newly described pattern recognition receptors team up against intracellular pathogens, Nature Reviews Immunology, published online Jul. 12, 2013; Nature Reviews Immunology 13, 551-565.
Burga et al., Liver myeloid-derived suppressor cells expand in response to liver metastases in mice and inhibit the anti-tumor efficacy of anti-CEA CAR-T, Cancer Immunol Immunother, Jul. 2015; 64(7): 817-829.
Cai et al., Co-infusion of haplo-identical CD-19 chimeric antigen receptor T cells and stem cells achieved full donor engraftment in refractory acute lymphoblastic leukemia, J Hematol Oncol., 2016, 9(1):131.
Carpenito et al., Control of large, established tumor xenografts with genetically retargeted human T cells containing CD28 and CD137 domains, PNAS, Mar. 3, 2009, 106(9):3360-3365.
Caruana et al., Heparanase promotes tumor infiltration and antitumor activity of CAR-redirected T lymphocytes, Nat Med, May 2015, 21(5):524-529.
Chinnasamy et al., Gene therapy using genetically modified lymphocytes targeting VEGFR-2 inhibits the growth of vascularized syngenic tumors in mice, J Clin Invest, Nov. 2010, 120(11):3953-3968.
Chmielewski et al., IL-12 release by engineered T cells expressing chimeric antigen receptors can effectively Muster an antigen-independent macrophage response on tumor cells that have shut down tumor antigen expression, Cancer Res, Jul. 2011, 71:5697-5706.
Craddock et al., Enhanced tumor trafficking of GD2 chimeric antigen receptor T cells by expression of the chemokine receptor CCR2b, J Immunother, Oct. 2010, 33(8):780-788.
Emtage et al., Second-generation anti-carcinoembryonic antigen designer T cells resist activation-induced cell death, proliferate on tumor contact, secrete cytokines, and exhibit superior antitumor activity in vivo: a preclinical evaluation, Clin Cancer Res, Dec. 15, 2008, 14(24):8112-8122.
Fong et al., Ovarian cancer mouse models: a summary of current models and their limitations, J. Ovarian Res, Sep. 2009, 2:12.
Garcia, Diagnostic medical parasitology, ASM Press American Society for Microbiology, 5th ed., 2007, 1225 pages.
Grupp et al., Chimeric antigen receptor-modified T cells for acute lymphoid leukemia, N Engl J Med, Apr. 2013, 368(16):1509-1518.
Henikoff et al., PNAS, Nov. 1992, 89(22): 10915-10919.
Hoyos et al., Engineering CD19-specific T lymphocytes with interleukin-15 and a suicide gene to enhance their anti-lymphoma/leukemia effects and safety, Leukemia, Jun. 2010, 24(6):1160-1170.
Iwasaki et al., Control of adaptive immunity by the innate immune system, Nat Immunol, Apr. 2015; 16(4): 343-353.
Jernigan et al., Parasitic infections of the small intestine, Gut 1994; 35:289-93.
Johnson et al., Rational development and characterization of humanized anti-EGFR variant III chimeric antigen receptor T cells for glioblastoma, Sci Transl Med, Feb. 18, 2015, 7(275):275ra222.
Kaczanowska et al., TLR agonists: our best frenemy in cancer immunotherapy, Journal of Leukocyte Biology, Jun. 30, 2013, 93(6):847-863.
Kakarla et al., Antitumor Effects of Chimeric Receptor Engineered Human T Cells Directed to Tumor Stroma, Mol Ther, Aug. 2013, 21(8):1611-20.
Katz et al., Phase I hepatic immunotherapy for metastases study of intra-arterial chimeric antigen receptor-modified T-cell therapy for CEA+ liver metastases, Clin Cancer Res, Jul. 15, 2015, 21(14):3149-3159.
Kerkar et al., Tumor-specific CD8+ T cells expressing interleukin-12 eradicate established cancers in lymphodepleted hosts, Cancer Res, Sep. 1, 2010, 70(17):6725-6734.
Kershaw et al., A phase I study on adoptive immunotherapy using gene-modified T cells for ovarian cancer, Clin Cancer Res, Oct. 15, 2006, 12(20 Pt 1):6106-6115.

(56) References Cited

OTHER PUBLICATIONS

Kochenderfer et al., B-cell depletion and remissions of malignancy along with cytokine-associated toxicity in a clinical trial of anti-CD19 chimeric-antigen-receptor-transduced T cells, Blood, Mar. 22, 2012, 119(12):2709-2720.
Kowolik et al., CD28 costimulation provided through a CD19-specific chimeric antigen receptor enhances in vivo persistence and antitumor efficacy of adoptively transferred T cells, Cancer Res, Nov. 15, 2006, 66(22):10995-1004.
Lamers et al., Treatment of metastatic renal cell carcinoma with autologous T-lymphocytes genetically retargeted against carbonic anhydrase IX: first clinical experience, J Clin Oncol, May 1, 2006, 24(13):e20-e22.
Lamaers et al., Treatment of metastatic renal cell carcinoma with CAIX CAR-engineered T cells: clinical evaluation and management of on-target toxicity, Mol Ther, Apr. 2013, 21(4):904-912.
Lanitis et al., Redirected antitumor activity of primary human lymphocytes transduced with a fully human anti-mesothelin chimeric receptor, Mol Ther., Mar. 2012, 20(3):633-643.
Levast et al., Vaccine Potentiation by Combination Adjuvants , Vaccines, Apr. 2014, 2, 297-322.
Liu et al., Allogeneic CD19-CAR-T cell infusion after allogeneic hematopoietic stem cell transplantation in B cell malignancies, J Hematol Oncol, Jan. 2017, 10(1):35.
Maher et al., CAR mechanics: driving T cells into the MUC of cancer, Cancer Res, Jun. 1, 2009, 69(11):4559-4562.
Maisonneuve et al., Unleashing the potential of NOD- and Toll-like agonists as vaccine adjuvants, PNAS, Aug. 26, 2014, 111(34): 12294-12299.
Mancini et al., Adoptive T-cell therapy in the treatment of viral and opportunistic fungal infections, Future Microbiol, 2015, 10(4):665-82.
Bennett et al., Mandell, Douglas, and Bennett's Infectious Disease Essentials, 5th Edition, 2000, Churchill Livingstone, Philadelphia, PA, USA, 561 pages.
Maude et al., Chimeric antigen receptor T cells for sustained remissions in leukemia, N Engl J Med, Oct. 16, 2014, 371(16):1504-17.
Maus et al., T cells expressing chimeric antigen receptors can cause anaphylaxis in humans, Cancer Immunol Res, Jul. 2013, 1(1):26-31.
Milone et al., Chimeric receptors containing CD137 signal transduction domains mediate enhanced survival of T cells and increased antileukemic efficacy in vivo, Mol Ther, Aug. 2009, 17(8):1453-64.
Moon et al., Expression of a functional CCR2 receptor enhances tumor localization and tumor eradication by retargeted human T cells expressing a mesothelin-specific chimeric antibody receptor, Clin Cancer Res, Jul. 15, 2011, 17(14):4719-4730.
Morgan et al., Case report of a serious adverse event following the administration of T cells transduced with a chimeric antigen receptor recognizing ERBB2, Mol Ther, Apr. 2010, 18(4):843-851.
Nakazawa et al., Anti-proliferative effects of T cells expressing a ligand-based chimeric antigen receptor against CD116 on CD34+ cells of juvenile myelomonocytic leukemia, J Hematol Oncol, 2016, 9(1):27.
Needleman et al., A general method applicable to the search for similarities in the amino acid sequence of two proteins J Mol Biol, Mar. 1970;48(3):443-53.
Netea et al., Innate immune memory: a paradigm shift in understanding host defense, Nature Immunology, Jul. 2015, 16(7):675-679.
Niederman et al., Antitumor activity of cytotoxic T lymphocytes engineered to target vascular endothelial growth factor receptors, PNAS, May 14, 2002, 99(10):7009-7014.
Nishio et al., Oncolytic virus expressing RANTES and IL-15 enhances function of CAR-modified T cells in solid tumors, OncoImmunology, Feb. 2015, 4:2, e988098.
O'Rourke et al., A single dose of peripherally infused EGFRvIII-directed Car T cells mediates antigen loss and induces adaptive resistance in patients with recurrent glioblastoma, Sci Transl Med, Jul. 19, 2017, (9):399, 30 pages.
Park et al., Adoptive transfer of chimeric antigen receptor re-directed cytolytic T lymphocyte clones in patents with neuroblastoma, Mol Ther, Apr. 2007, 15(4):825-833.
Payne et al., Adoptive cellular therapy of cancer: exploring innate and adaptive cellular crosstalk to improve anti-tumor efficacy, Future Oncol, Aug. 2014, 10(10):1779-94.
Pearson et al., Improved tools for biological sequence comparison, PNAS USA, Apr. 1988, 85:2444-2448.
Perica et al., Adoptive T cell immunotherapy for cancer, Rambam Maimonides Medical Journal, Jan. 2015, 6(1):e0004, pp. 1-9.
Porter et al., Chimeric antigen receptor-modified T cells in chronic lymphoid leukemia, N Engl J Med, Aug. 25, 2011, 365(8):725-733.
Pule et al., Virus-specific T cells engineered to coexpress tumor-specific receptors: persistence and anti-tumor activity in individuals with neuroblastoma, Nat Med, Nov. 2008, 14(11):1264-1270.
Savoldo et al., CD28 costimulation improves expansion and persistence of chimeric antigen receptor-modified T cells in lymphoma patients, J Clin Invest, May 2011, 121(5):1822-6.
Schafer et al., Parasites of the small intestine, Curr Gastroenterol Rep, Aug. 2006, 8(4):312-20.
Schubert et al., Chimeric antigen receptor T cell therapy targeting CD19-positive leukemia and lymphoma in the context of stem cell transplantation, Hum Gene Ther, Oct. 2016, 27(10):758-771.
Schuberth et al., Treatment of malignant pleural mesothelioma by fibroblast activation protein-specific re-directed T cells, J Transl Med, Aug. 12, 2013, 11:187.
Sentman et al., Mechanisms of Acute Toxicity in NKG2D Chimeric Antigen Receptor T Cell-Treated Mice, J. Immunol, Dec. 15, 2016, 197(12):4674-4685.
Shibaguchi et al., A fully human chimeric immune receptor for retargeting T-cells to CEA-expressing tumor cells, Anticancer Res, Nov-Dec. 2006;26(6A):4067-72.
Smith et al., Comparison of Biosequences, Adv. Appl. Math, 1981, 2:482-489.
Song et al., In vivo persistence, tumor localization, and antitumor activity of CAR-engineered T cells is enhanced by costimulatory signaling through CD137 (4-1BB), Cancer Res, Jul. 1, 2011, 71(13):4617-4627.
Spear et al., Collaboration of chimeric antigen receptor (CAR)-expressing T cells and host T cells for optimal elimination of established ovarian tumors, OncoImmunology, Apr. 1, 2013, 2:4,e23564.
Tang et al., PAMPs and DAMPs: Signal Os that Spur Autophagy and Immunity, Immunol Rev, Sep. 2012, 249(1): 158-175.
Tijssen, 1993, Laboratory Techniques in Biochemistry and Molecular Biology-Hybridization with Nucleic Acid Probes, Part I, Chapter 2 "Overview of principles of hybridization and the strategy of nucleic acid probe assays", Elsevier, N.Y.).
Till et al., Adoptive immunotherapy for indolent non-Hodgkin lymphoma and mantle cell lymphoma using genetically modified autologous CD20-specific T cells, Blood, Sep. 15, 2008, 112(6):2261-2271.
Turner et al., Cytokines and chemokines: At the crossroads of cell signalling and inflammatory disease, Biochim Biophys Acta, Nov. 2014;1843(11):2563-2582.
Vacchelli et al., Trial Watch: Adoptive cell transfer for anticancer immunotherapy, OncoImmunology, Aug. 11, 2017; 6(11):e1363139.
Van Schalkwyk et al., Design of a phase I clinical trial to evaluate intratumoral delivery of ErbB-targeted chimeric antigen receptor T-cells in locally advanced or recurrent head and neck cancer, Hum Gene Ther Clin Dev, Sep. 2013, 24:134-142.
Wang et al., Targeting fibroblast activation protein in tumor stroma with chimeric antigen receptor T cells can inhibit tumor growth and augment host immunity without severe toxicity, Cancer Immunol Res, Feb. 2014, 2(2):154-166.
Wang et al., Phase 1 studies of central memory-derived CD19 CAR-T cell therapy following autologous HSCT in patients with B-Cell NHL, Blood, Jun. 16, 2016, 127(24):2980-90.
Zhang et al., Site-specific immunomodulators (SSIs) are novel immunotherapies for cancer, J Immunol May 1, 2016, 196 (1 Supplement) 214.20.
Zhang et al., Improving adoptive T cell therapy by targeting and controlling IL-12 expression to the tumor environment, Mol Ther, Apr. 2011, 19(4):751-759.

(56) References Cited

OTHER PUBLICATIONS

International Search Report & Written Opinion dated Mar. 29, 2019 for PCT Application No. PCT/CA2018/051683, 12 pages.
Persing et al., Infection, Cancer, and the Immune Response, the Infectious Etiology of Chronic Diseases: Defining the Relationship, Enhancing the Research, and Mitigating the Effects: Workshop Summary, Washington (DC): National Academies Press (US); 2004, https://www.ncbi.nlm.nih.gov/books/NBK83682/: accessed Sep. 12, 2024.

* cited by examiner

Figure 11: Murine Chemokines
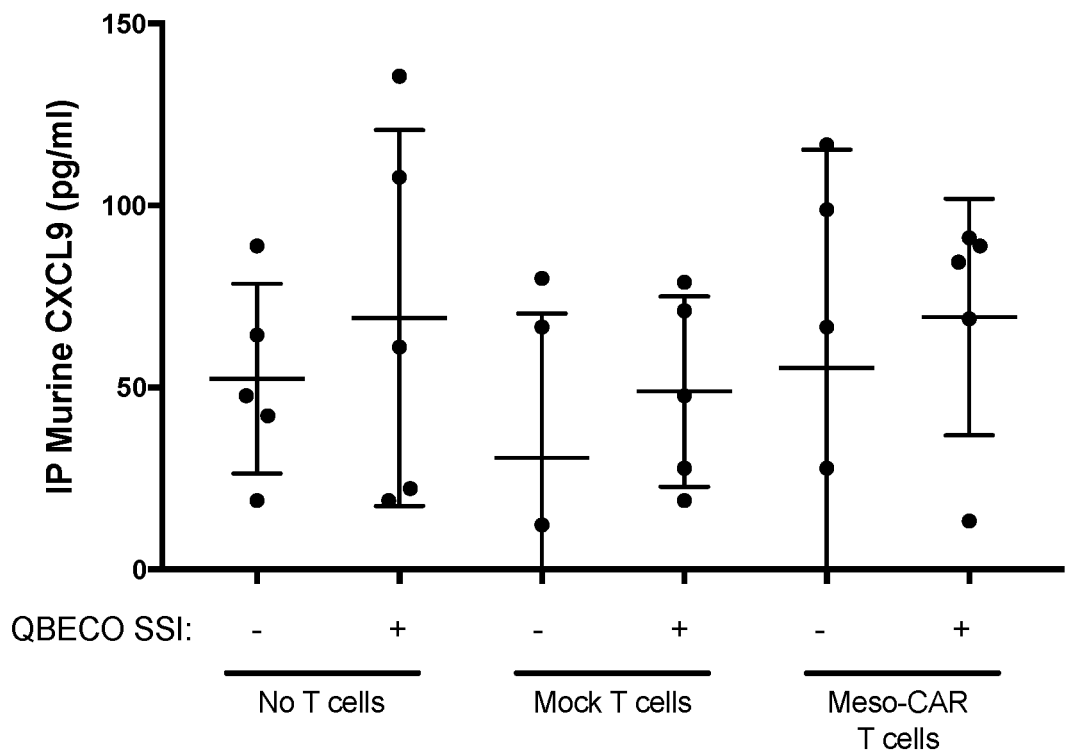
Figure 12: Murine Chemokines
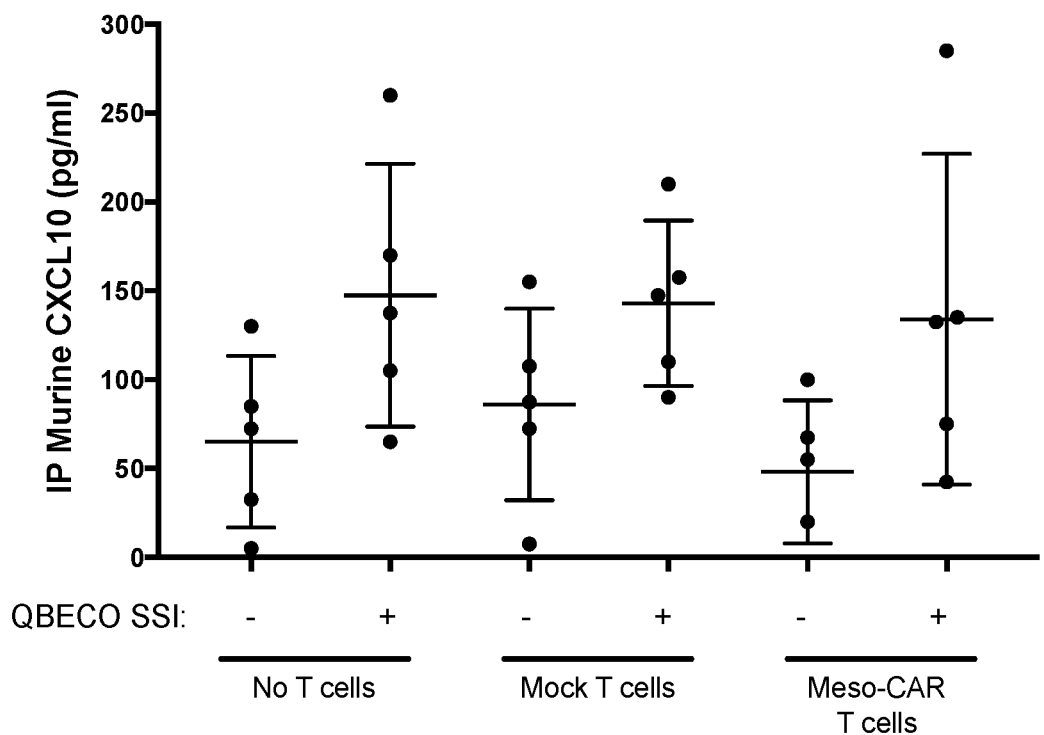

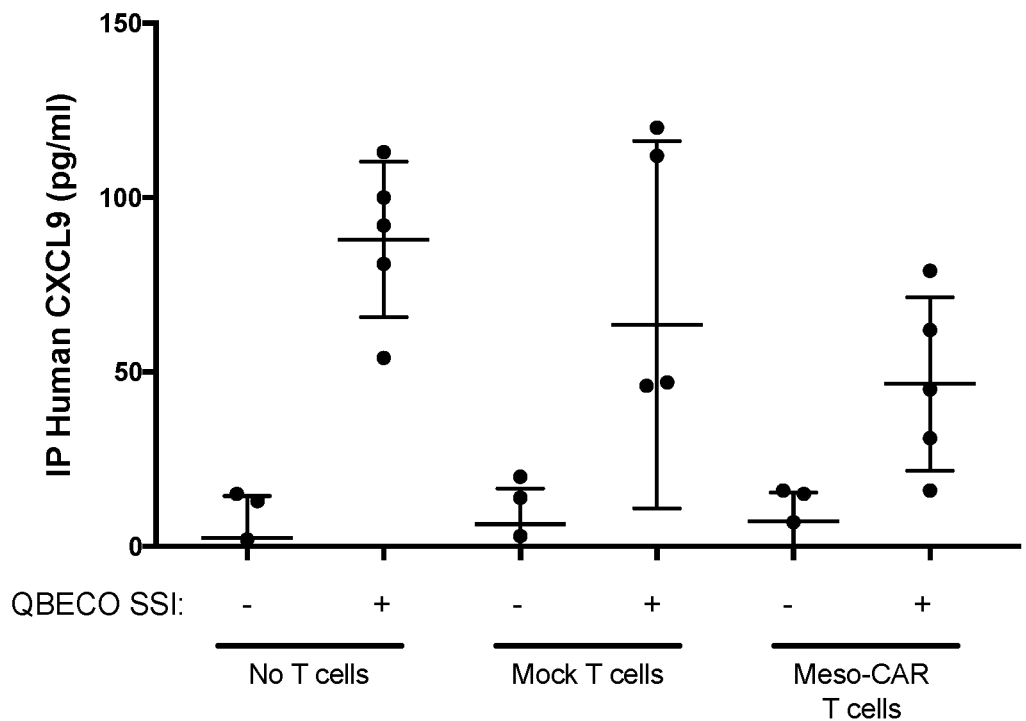
Figure 13: Human Chemokines
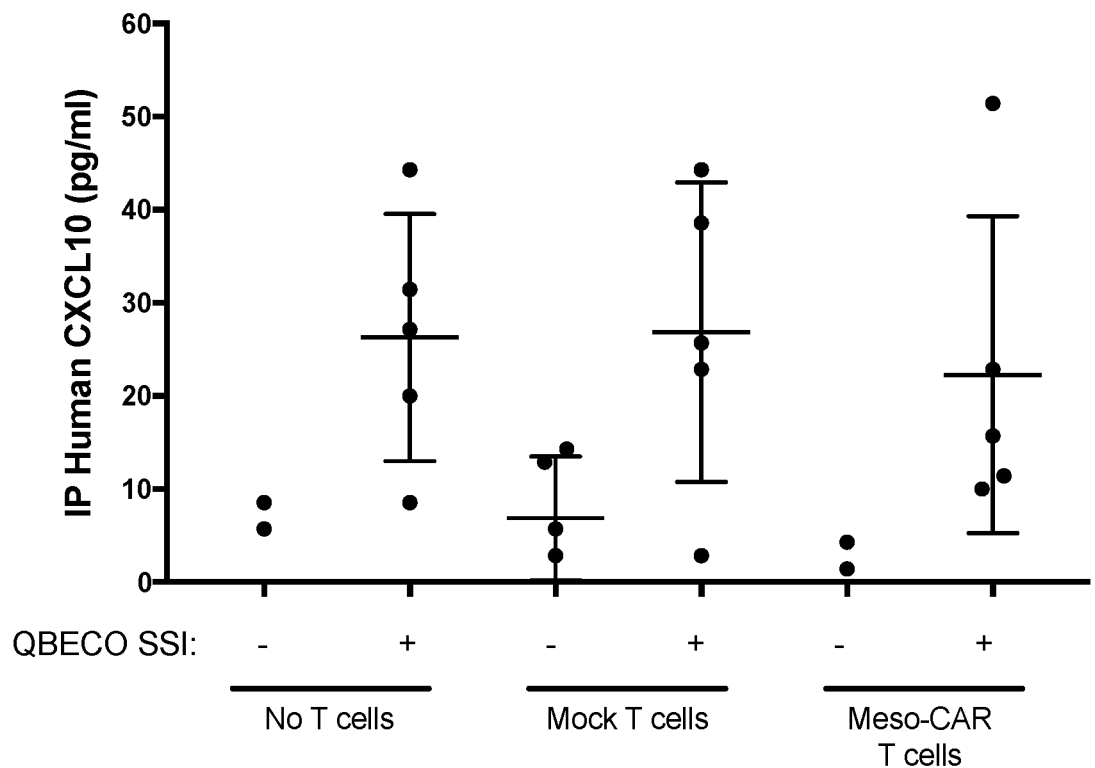
Figure 14: Human Chemokines

INNATE TARGETING OF ADOPTIVE CELLULAR THERAPIES

FIELD

Innovations are disclosed in the field of medical science, including the treatment of cancers, relating to the use of antigen-targeted cellular therapies in combination with tissue-specific preparations that contain innate immunogens, such as microbial components.

BACKGROUND

In vertebrates, an important aspect of immunological regulation involves the concerted activity of the innate immune system and the adaptive immune system. This concerted activity involves metabolic, enzymatic and molecular genetic changes within immune cells, orchestrating an elaborate system of cellular, cytokine and chemokine communication pathways mediating the coordinated activity of the disparate components of these complementary systems (see Iwasaki & Madzhitov, 2015, Nature Immunology 16:343-353; WO0209748; WO03051305; Turner et al., 2014, BBA-Molecular Cell Research 1843:11 2563-2582). An aspect of this coordinated activity underlies the recognition that ligands of the pattern recognition receptors (PRRs) of the innate immune system may be used as vaccine adjuvants to improve an adaptive immune response (see Maisonneuve et al., 2014, PNAS 111(34), 12294-9; WO2007035368), and particular repertoires of PRR ligands may be formulated together as site specific immunomodulators that provoke a therapeutic immune response in a target tissue (see WO2017185180).

Immunological memory, involving the recognition of specific antigens by B and T cell receptors, is a long recognized and central feature of the adaptive immune system, and the basis for vaccine efficacy (see Nature Immunology, Focus on immunological memory: June 2011, Volume 12 No 6 pp 461-575). Innate immune memory is a more recently recognized and less well understood characteristic of the immune system (see Netea et al., 2015, Nature Immunology 16, 675-679; and Bordon, 2014, Nature Reviews Immunology 14, 713).

Adoptive cellular therapies (ACT) have been described that involve the adoptive transfer of a wide range of immune cells, including gamma delta T cells, engineered T-cells (such as chimeric antigen receptor (CAR) and T cell receptor (TCR) modified T cells, TCR-Tg cells), lymphokine-activated killer (LAK) cells, tumor-infiltrating lymphocytes (TILs), natural killer (NK) cells (including CAR NK cells and NK T cells), cytokine-induced killer (CIK) cells (such as NK cells, dendritic cells (DCs), and T cells); TRUCKs (payload carrying CAR T cells) and allogeneic CAR T cells.

CAR T-cell therapy is a form of ACT treatment that has been approved by the U.S. Food and Drug Administration for the treatment of children and adolescents with acute lymphoblastic leukemia (ALL) and adults with advanced lymphomas. CARs are modular membrane receptors having a defined extracellular single-chain variable fragment (scFv) derived from an antibody that functions as the target-binding domain of a CAR; a hinge/linker region that connects the extracellular scFv with intracellular signalling domains; and intracellular signalling domains comprising a single CD3ζ chain (first generation CARs), the CD3ζ chain in combination with the intracellular signalling domains of one of costimulatory CD28, 4-1BB, or OX-40 (second generation CARs), or the CD3ζ chain in combination with tandem intracellular signalling domains from two costimulatory molecules (third generation CARs). The additional inclusion of costimulatory signalling domains in second and third generation CARs enhance the persistence of CAR T-cells in vivo and result in increased anti-tumor activity (Brentjens, R. J., et al. Clin Cancer Res. 2007 Sep. 15, 13(18 Pt 1):5426-35; Milone, M. C., et al., Mol Ther. 2009 August, 17(8):1453-64; Kowolik, C. M., et al. Cancer Res. 2006 Nov. 15; 66(22):10995-1004; WO2016073629; Savoldo, B., et al. J Clin Invest. 2011 May, 121(5):1822-6). CARs facilitate T-cell specificity to the tumor cell and binding to the target tumor antigen in an HLA/MHC-independent manner, thereby activating the CAR T-cell's antitumor effector functions.

CAR T-cells targeting CD19 have demonstrated clinical efficacy in the treatment of a number of haematologic cancers including: B-cell non-Hodgkins lymphoma, ALL, and chronic lymphocytic leukemia (CLL). CAR T-cell therapies directed against CD116 have also been developed for treating myelomonocytic leukemia (Liu, J., et al. J Hematol Oncol. 2017; 10(1):35; Wang, X., et al. Blood. 2016; 127 (24):2980-90; Schubert, M. L., et al. Hum Gene Ther. 2016 October; 27(10):758-771; Maude, S. L., et al. N Engl J Med. 2014; 371(16):1504-17; Cai, et al. J Hematol Oncol. 2016; 9(1):131; Porter, D. L., et al. N Engl J Med. 2011; 365:725-733; Grupp, S. A., et al. N Engl J Med. 2013; 368:1509-1518; Brentjens, R. J., et al. Blood. 2011; 118:4817-4828; US20160009813; Kochenderfer, J. N., et al. Blood. 2012; 119:2709-2720; Nakazawa, Y., et al. J Hematol Oncol. 2016; 9(1):27; See also: US20160008398A1; US20150342993A1; US20150140019A1; US20150376296A1; US20140271635A1; US20160009813A1; WO2016073629A1; WO2017049166A1; US20170224798A1; WO2009091826A3; US20170137783A1; WO2017040324A1; US20170183407A1; WO2017040945A1; U.S. Pat. No. 9,701,758; WO2017075147A1; US20170283775A1; US20170334968A1; US20170158749A1; and WO2016126608A1).

Unlike haematologic malignancies, solid tumors are heterogeneous and comprise both cancer cells and stromal cells. Tumor-associated stroma is comprised of various cell types including: fibroblasts; vascular endothelial cells; and immune cells such as lymphocytes, granulocytes and macrophages. Collectively, these stromal components create a physical barrier and immunosuppressive environment that impedes access of CAR T-cells to tumor cells, inhibits persistence and proliferation of CAR T-cells, and attenuates the cytotoxic activity of CAR T-cells. In contrast to the successes achieved in haematologic cancers, clinical results using CAR T-cells against solid tumors have been less promising (see Newick et al., 2016, Mol Ther Oncolytics. 2016; 3: 16006). Studies investigating the efficacy of CAR T-cell therapy in treating sarcomas, glioblastomas, ovarian cancers, pancreatic cancers, mesotheliomas, colon cancers, and renal cell carcinomas have consistently reported modest efficicacy (see: Ahmed, N., et al., J Clin Oncol. 2015, 33(15):1688-1696; O'Rourke, D., et al., Sci Transl Med. 2017; 19(9):399; Kershaw, M. H., et al., Clin Cancer Res. 2006; 12(20):6106-6115; Beatty, G. L., et al., Cancer Immunol Res. 2014; 2:112-120; Beatty, G. L., J Clin Oncol. 2015; 33(15):3007; Maus, M. V., et al., Cancer Immunol Res. 2013; 1:26-31; Beatty, G. L., et al., Cancer Immunol Res. 2014; 2:112-120; Morgan, R. A., Mol Ther. 2010; 18(4): 843-851; Katz, S. C., et al. Clin Cancer Res. 2015; 21(14): 3149-3159; Lamers, C. H., et al., Mol Ther. 2013; 21(4): 904-912; Lamers, C. H., et al., J Clin Oncol. 2006, 24(13):

e20-e22; Xu et al., 2017, Human Vaccines & Immunotherapeutics vol. 13, Iss. 7, pp 1548-155; Liu et al., 2017, J Hematol Oncol. 2017 Jan. 31, 10(1):35). Unlike blood-borne malignancies, difficulties associated with treating solid tumors with CAR T-cell therapies reportedly include limited CAR T-cell persistence and expansion, the immunosuppressive milieu of tumors, and inefficient homing of CAR T-cells from the peripheral vasculature to tumor sites.

In view of the foregoing challenges, a wide variety of alternative adoptive cell therapies have been described. See for example: US20130287748A1; U.S. Pat. No. 9,394,368; US20140370045A1; US20150140019A1; U.S. Pat. Nos. 9,365,641; 9,272,002; US20140050708A1; US20150038684A1; US20150024482A1; WO2015090230A1; WO2015157399A1; WO2015142675A2; WO2016044605A8; US20140286973A1; US20150225480A1; WO2017015427A1; WO2013126712A1; WO2014055771A1; WO2013123061A1; U.S. Pat. No. 9,598,489; WO2014011988A3; US20170002072A1; US20140301993A1; US20170260268A1; WO2013063419A2; WO2017049166A1; WO2015142675A3; WO2016044605A1; US20140099340A1; WO2014130657A1; US20170137783A1; WO2017070649A1; US20160326265A1; WO2012099973A3; WO2014055442A2; WO2017040324A1; US20170174771A1; WO2014055442A9; US20120148552A1; WO2017070395A1; WO2017027291A1; US20170136063A1; WO2014011987A1; WO2016149665A1; WO2015142675A8; WO2014055442A3; US20170335281A1; U.S. Pat. No. 9,447,194; US20170107285A1; US20170240630A1; WO2012079000A1; US20170232070A1; US20140322275A1; WO2013126729A1; WO2014011988A2; U.S. Pat. No. 9,402,865; WO2013063419A3; US20160311917A1; WO2017015427A8; WO2013126726A1; WO2016126608A1; WO2012099973A2; WO2010025177A1; US20160008398A1; US20150342993A1; US20150307623A1; US20140314795A1; US20160045551A1; US20160122766A1; US20150376296A1; WO2016055551A1; US20170067022A1; WO2017049166A1; WO2017059557A1; US20170313759A1; US20170145095A1; US20170137783A1; WO2017178562A1; WO2016174652A1; US20170183407A1; US20160361360A1; WO2017027291A1; WO2017108805A1; WO2015142675A8; US20160228547A1; US20170335281A1; WO2016154628A1; US20170107285A1; WO2015188141A8; WO2017041143A1; WO2017149515A1; WO2017075537A1; US20170166652A1; and US20170158749A1.

SUMMARY

Therapeutic modalities are provided for targeting adoptive cellular therapies to specific sites of disease, involving the use of specific repertoirs of PRR ligands. In effect, innate immune system signaling is provoked so as to facilitate the homing of adoptive immune cells to sites of disease, for example to the site of a solid tumor.

Aspects of the disclosed therapeutic modalities involve the use of an effective amount of an immunogenic composition to treat a cancer or other disorder in a mammalian subject, for example where a cancer forms a tumor in a target tissue. The immunogenic composition is for use in combination with an effective amount of an activated adoptive immune cell, for example a cell having a receptor for a cancer or disease antigen expressed, respectively, by cancer or disease cells, for example expressed in a tumor. The immunogenic composition may for example comprise an artificial repertoire of mammalian pattern recognition receptor (PRR) ligands that recapitulates at least a portion of a PRR agonist signature of a microbial mammalian pathogen, such as a pathogen that is pathogenic in the target tissue. The repertoire of mammalian PRR ligands may be formulated together in a therapeutic vehicle for combined presentation following administration to the mammalian subject. The composition may include components of the microbial mammalian pathogen that are ligands for a plurality of mammalian PRRs, for example at least 5, 6, 7, 8, 9, 10, 11, 12, 13, 14 or 15 distinct mammalian PRRs. The immunogenic composition may be adapted and administered so as to cause the adoptive immune cell to localize to the tumor in the target tissue, for example by modulating an innate immune response in the target tissue.

The therapeutic uses recited herein are reflected in corresponding methods of treatment, and vice versa.

Implementations of the present innovations may include one or more of the following features. The use where the PRR ligands are PRR agonists. The use where the immunogenic composition modulates an innate immune response in the target tissue. The use where the repertoire of mammalian pattern recognition receptors is an artificial repertoire and the portion of the PRR agonist signature is a distinct portion that is different from any native PRR ligand signature of the microbial mammalian pathogen. The use where the adoptive immune cell is recombinant, and/or where the cancer antigen is one or more of an NKG2D ligand, CD3, CD19, CD22, CD123, B-cell maturation antigen (BCMA), WT1, L1CAM (CD171), ROR1, LewisY (LeY), IL-13Rα2, GD2, Mesothelin (MSLN), PSA, CAIX, folate receptor α, HER2, EGFR, EGFRvIII, VEGF2, ErbB, ErbB2, CEA, PSMA, MUC1, MUC16, FXYD3, carcinoembryonic antigen (CEA), CEACAM5, carbonic anhydrase IX or fibroblast activation protein α (FAP). The use where the adoptive immune cell is selected from the group including gamma delta T cells, engineered T-cells (such as chimeric antigen receptor (CAR) and T cell receptor (TCR) modified T cells, TCR-Tg cells; NKG2D-CAR T cells), lymphokine-activated killer (LAK) cells, tumor-infiltrating lymphocytes (TILs), natural killer (NK) cells (such as CAR NK cells and NK T cells), cytokine-induced killer (CIK) cells (such as NK cells, dendritic cells (DCs), and T cells); TRUCKs (payload carrying CAR T cells) and allogeneic CAR T cells. The use wherein the receptor for the cancer antigen is recombinant. The use where the receptor for the cancer antigen is a chimeric antigen receptor, a modified T cell receptor or a modified nk cell receptor. The use where the subject is a mouse, cat, dog, horse, rodent or human. The use where the therapeutic vehicle includes a microbial cell, a recombinant microbial cell, a cellular fraction of the recombinant microbial cell, a cellular fraction of the microbial cell, a bacterial outer membrane fraction, a bacterial inner membrane fraction, a pellet from a gradient centrifugation of microbial cell components, microbial chromosomal dna, a microparticle or a liposome, each including components of the microbial mammalian pathogen that provide the PRR agonists that together make up the repertoire of PRR agonists. The use where the recombinant microbe includes a recombinant gene encoding a component of at least one of the PRR agonists. The use where the therapeutic vehicle includes a whole killed or attenuated microbial cell or recombinant microbial cell. The use where the adoptive immune cell is a CXCR3 responsive immune cell. The use where the SSI upregulates expression of the cancer or other disease antigen by the target tissue, such as by cancer cells of a tumor. The use where the cancer or other disease antigen is a NKG2D ligand or other "danger associated molecular pattern" (DAMP; see Tang et al., Immunol Rev. 2012 September; 249(1): 158-175). The use where the SSI upregulates expression of a chemotactic cytokine by the tumor, and the adoptive immune cell includes a cytokine receptor for the chemotactic cytokine. The use where the adoptive immune cell includes a plurality of receptors of distinct chemotactic cytokines expressed by the tumor. The use where the adoptive immune cell includes a cytokine receptor for a chemotactic cytokine expressed by the tumor. The use where the cytokine receptor is recombinant. The use where the cytokine receptor is CCR2B.

BRIEF DESCRIPTION OF THE DRAWINGS

FIG. 11 is a column scatter plot showing that SSI induced modest increases in murine CXCL9 chemokine production in the IP department, regardless of adoptive transfer.

FIG. 12 is a column scatter plot showing that SSI induced modest increases in murine CXCL10 chemokine production in the IP department, regardless of adoptive transfer.

FIG. 13 is a column scatter plot showing that SSI induced substantially increased human CXCL9 chemokine production in the IP compartment, regardless of adoptive transfer.

FIG. 14 is a column scatter plot showing that SSI induced substantially increased human CXCL10 chemokine production in the IP compartment, regardless of adoptive transfer.

DETAILED DESCRIPTION

Figure 1:
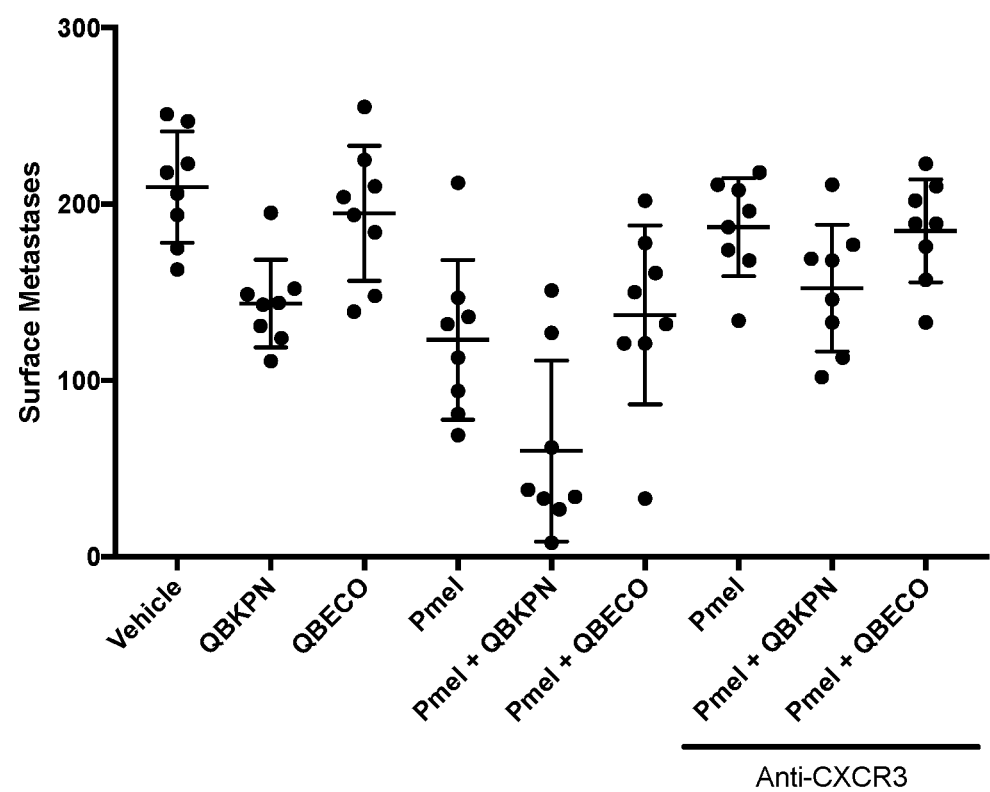
FIG. 1 is a column scatter plot, showing the average and standard deviation and all data points representing the number of surface metastases in each subject, grouped into columns according to treatment, the last three columns reflecting animals treated with anti-CXCR3. The data illustrates that a site-specific immunotherapy with a microbial PRR ligand formulation (QBKPN) enhances the anti-tumor efficacy of adoptively-transferred, tumor antigen-specific CD8+ T cells (Pmel), and this activity is inhibited by anti-CXCR3.

In the following detailed description, various examples are set out of particular embodiments, together with experimental procedures that may be used to implement a wide variety of modifications and variations in the practice of the present invention. For clarity, a variety of technical terms are used herein in accordance with what is understood to be the commonly understood meaning, as reflected in definitions set out below.

An "immunogen" refers to a molecule, or a composition comprising the molecule, that is capable of eliciting an immune response by an organism's immune system. An "antigen" refers to a molecule that is capable of binding to the product of an immune response.

"Pathogenic" agents are agents, such as microbes, such as bacteria or viruses, which are known to cause infection in a host in nature, and in this sense, "pathogenic" is used in the context of the present invention to mean "naturally pathogenic". Although a wide variety of microbes may be capable of causing infection under artificial conditions, such as artificial inoculations of a microbe into a tissue, the range of microbes that naturally cause infection is necessarily limited, and well established by medical practice.

An "infection" is the state or condition in which the body or a part of it is invaded by a pathogenic agent (e.g., a microbe, such as a bacterium) which, under favorable conditions, multiplies and produces effects that are injurious (Taber's Cyclopedic Medical Dictionary, 14th Ed., C. L. Thomas, Ed., F. A. Davis Company, PA, USA). An infection may not always be apparent clinically and may result in only localized cellular injury. Infections may remain subclinical, and temporary if the body's defensive mechanisms are effective. Infections may spread locally to become clinically apparent as an acute, a subacute, or a chronic clinical infection or disease state. A local infection may also become systemic when the pathogenic agent gains access to the lymphatic or vascular. Infection is usually accompanied by inflammation, but inflammation may occur without infection.

"Inflammation" is the characteristic tissue reaction to injury (marked by swelling, redness, heat, and pain), and includes the successive changes that occur in living tissue when it is injured. Infection and inflammation are different conditions, although one may arise from the other (Taber's Cyclopedic Medical Dictionary, supra). Accordingly, inflammation may occur without infection and infection may occur without inflammation (although inflammation typically results from infection by pathogenic bacteria or viruses). Inflammation is characterized by the following symptoms: redness (rubor), heat (calor), swelling (tumour), pain (dolor). Localized visible inflammation on the skin may be apparent from a combination of these symptoms, particularly redness at a site of administration.

Various subjects may be treated or assayed or sampled in accordance with alternative aspects of the invention. As used herein, a "subject" is an animal, for e.g., a vertebrate or a mammal. Accordingly, a subject may be a patient, e.g., a human, suffering from a disease or disorder amenable to treatment, such as a cancer, a proliferative cell disorder or infectious disease (such as a persistent viral infection or opportunistic fungal infection, particularly in an immunocompromised patient). A subject may also be an experimental animal, e.g., an animal model of an immune dysregulation. In some embodiments, the terms "subject" and "patient" may be used interchangeably, and may include a human, a non-human mammal, a non-human primate, a rat, mouse, cat or dog. A healthy subject may be a human who is not suffering from a disease, such as a cancer or immune dysfunction, or suspected of having the disease, or who is not suffering from a chronic disorder or condition. A "healthy subject" may also be a subject who is not immunocompromised. By immunocompromised is meant any condition in which the immune system functions in an abnormal or incomplete manner. Immunocompromisation may be due to disease, certain medications, or conditions present at birth. Immunocompromised subjects may be found more frequently among infants, the elderly, and individuals undergoing extensive drug or radiation therapy.

A "sample" from a subject may include any relevant biological material, including for example a cell, tissue or bodily fluid sample taken from a patient. For example, a sample may conveniently include samples of skin, cheek, blood, stool, hair or urine. Sample nucleic acids for use in diagnostic and prognostic methods can for example be obtained from a selected cell type or tissue of a subject. For example, a subject's bodily fluid (e.g. blood) can be obtained by known techniques. Alternatively, nucleic acid tests can be performed on dry samples (e.g., hair or skin).

The term "polymorphism" refers to a location within a biological sequence, such as a genomic sequence, which varies within a population. Polymorphisms are comprised of different "alleles". The term "genotype" refers to the specific alleles in a genome, for example in a cell, tissue sample or an individual. The location of a polymorphism may be identified by its position, for example within the genome or within a sequence such as a protein that is reflective of a genomic locus. This may for example be provided in the form of a characterization of the different amino acids or bases that are found at a designated location. For diploid genomes, the genotype is typically comprised of at least two alleles, which may be the same (homozygous) or different (heterozygous). Individual polymorphisms are typically assigned unique identifiers in the art (such as "Reference SNP", "refSNP" or "rs #"), for example in the Single Nucleotide Polymorphism Database (dbSNP) of Nucleotide Sequence Variation available on the NCBI website.

Characterization of polymorphisms, alleles or a genotype may be performed by any of very wide variety of methods. These methods may for example variously involve hybridization, labeling, cloning, sequencing and/or amplification of nucleic acids, such as genomic DNA, for example using PCR, LCR, xMAP, invader assays, mass spectrometry, pyrosequencing, selective oligonucleotide hybridization, selective amplification, selective primer extension or probes. In this context, the term "probes" includes naturally occurring or recombinant single- or double-stranded nucleic acids or chemically synthesized nucleic acids. A probe can for example be a polynucleotide of a length suitable for selective hybridization to a nucleic acid containing a polymorphic region. Labeled probes also can be used in conjunction with amplification of a polymorphism. DNA microarray technologies, sometimes referred to as DNA chips or gene chips, may for example be used for genomic characterization, for example to characterize point mutations, single nucleotide polymorphisms (SNPs), and/or short tandem repeats (STRs). For example, several probes capable of hybridizing specifically to an allelic variant may be attached to a solid phase support by a variety of processes, including lithography. Additional methods include laser capture microdissection (LCM), comparative genomic hybridization (CGH) and chromatin immunoprecipitation (ChIP). Allele specific hybridization may for example make use of probes overlapping the polymorphic site and having about 5, or alternatively 10, or alternatively 20, or alternatively 25, or alternatively 30 nucleotides around the polymorphic region. Alternatively, the presence of the specific allele in DNA from a subject can in some case be characterized by restriction enzyme analysis. Similarly, protection from cleavage agents (such as a nuclease, hydroxylamine or osmium tetroxide) can be used to detect mismatched bases in RNA/RNA DNA/DNA, or RNA/DNA heteroduplexes, using technique that may be described as "mismatch cleavage" assays. Alterations in electrophoretic mobility may be used to characterize allelic variants, for example to detect single strand conformation polymorphisms.

Many of the methods described herein may be performed using kits, for example comprising at least one probe or primer nucleic acid, or one of more of the compositions described herein and instructions for use of the kit. Kits can for example comprise at least one probe or primer which is capable of specifically hybridizing to a polymorphic region or adjacent to the polymorphic region, so that the oligonucleotides are "specific for" the polymorphic region. Kits may also comprise at least one reagent necessary to perform a particular assay. Kits can also include positive controls, negative controls, sequencing markers, or antibodies, for example for determining a subject's genotype or biological marker profile.

An "immune response" includes, but is not limited to, one or more of the following responses in a mammal: induction of cellular immunomodulators such as cytokines and chemokines, induction or activation of antibodies, neutrophils, monocytes, macrophages (including both M1-like macrophages and M2-like macrophages as described herein), B cells, or T cells (including helper T cells, natural killer cells, cytotoxic T cells, gamma-delta (γδ) T cells), such as induction or activation by one or more immunogens in an immunogenic composition, following administration of the composition. An immune response to a composition thus generally includes the development in the host animal of a cellular and/or antibody-mediated response to the composition. In some embodiments, the immune response is such that it will also result in slowing or stopping the progression of an immune dysregulation, or a disease characterized by immune dysregulation. An immune response may accordingly include one or both of a cellular immune response and/or a humoral immune response, and may be an adaptive response or an innate immune response.

"Immune dysregulation" is an inappropriately regulated immune response, such as an inappropriately restrained or inappropriately robust immune response. The immune dysregulation may for example be in the context of a neoplastic disease, such as a cancer.

A "site specific immunotherapy" (SSI) is an immunomodulatory treatment that is effective to therapeutically or prophylactically alter an aspect of the immune state, or immune system physiology, at an anatomical site or sites, such as an organ or tissue. In some instances, for example, an SSI may be adapted to ameliorate an immune dysregulation, or to treat a condition characterized by an immune dysregulation.

A "cancer" or "neoplasm" is any unwanted growth of cells serving no physiological function. In general, a cancer cell has been released from its normal cell division control, i.e., a cell whose growth is not regulated by the ordinary biochemical and physical influences in the cellular environment. Thus, "cancer" is a general term for diseases characterized by abnormal uncontrolled cell growth. In most cases, a cancer cell proliferates to form clonal cells that are malignant. The lump or cell mass, "neoplasm" or "tumour," is generally capable of invading and destroying surrounding normal tissues. By "malignancy", as used herein, is meant as an abnormal growth of any cell type or tissue that has a deleterious effect in the organism having the abnormal growth. The term "malignancy" or "cancer" includes cell growths that are technically benign but which carry the risk of becoming malignant. Cancer cells may spread from their original site to other parts of the body through the lymphatic system or blood stream in a process known as "metastasis." Many cancers are refractory to treatment and prove fatal. Examples of cancers or neoplasms include, without limitation, transformed and immortalized cells, tumours, carcinomas, in various organs and tissues as described herein or known to those of skill in the art.

Most cancers fall within three broad histological classifications: carcinomas, which are the predominant cancers and are cancers of epithelial cells or cells covering the external or internal surfaces of organs, glands, or other body structures (for e.g., skin, uterus, lung, breast, prostate, stomach, bowel), and which tend to metastasize; carcinomas, which are derived from connective or supportive tissue (for e.g., bone, cartilage, tendons, ligaments, fat, muscle); and hematologic tumours, which are derived from bone marrow and lymphatic tissue. Carcinomas may be adenocarcinomas (which generally develop in organs or glands capable of secretion, such as breast, lung, colon, prostate or bladder) or may be squamous cell carcinomas (which originate in the squamous epithelium and generally develop in most areas of the body). Sarcomas may be osteosarcomas or osteogenic sarcomas (bone), chondrosarcomas (cartilage), leiomyosarcomas (smooth muscle), rhabdomyosarcomas (skeletal muscle), mesothelial sarcomas or mesotheliomas (membranous lining of body cavities), fibrosarcomas (fibrous tissue), angiosarcomas or hemangioendotheliomas (blood vessels), liposarcomas (adipose tissue), gliomas or astrocytomas (neurogenic connective tissue found in the brain), myxosarcomas (primitive embryonic connective tissue), or mesenchymous or mixed mesodermal tumours (mixed connective tissue types). Hematologic tumours may be myelomas, which originate in the plasma cells of bone marrow; leukemias which may be "liquid cancers" and are cancers of the bone marrow and may be myelogenous or granulocytic leukemia (myeloid and granulocytic white blood cells), lymphatic, lymphocytic, or lymphoblastic leukemias (lymphoid and lymphocytic blood cells) or polycythemia vera or erythremia (various blood cell products, but with red cells predominating); or lymphomas, which may be solid tumours and which develop in the glands or nodes of the lymphatic system, and which may be Hodgkin or Non-Hodgkin lymphomas. In addition, mixed type cancers, such as adenosquamous carcinomas, mixed mesodermal tumours, carcinosarcomas, or teratocarcinomas also exist.

Cancers named based on primary site may be correlated with histological classifications. For example, lung cancers are generally small cell lung cancers or non-small cell lung cancers, which may be squamous cell carcinoma, adenocarcinoma, or large cell carcinoma; skin cancers are generally basal cell cancers, squamous cell cancers, or melanomas. Lymphomas may arise in the lymph nodes associated with the head, neck and chest, as well as in the abdominal lymph nodes or in the axillary or inguinal lymph nodes. Identification and classification of types and stages of cancers may be performed by using for example information provided by the Surveillance, Epidemiology, and End Results (SEER) Program of the National Cancer Institute, which is an authoritative source of information on cancer incidence and survival in the United States and is recognized around the world. The SEER Program currently collects and publishes cancer incidence and survival data from 14 population-based cancer registries and three supplemental registries covering approximately 26 percent of the US population. The program routinely collects data on patient demographics, primary tumour site, morphology, stage at diagnosis, first course of treatment, and follow-up for vital status, and is the only comprehensive source of population-based information in the United States that includes stage of cancer at the time of diagnosis and survival rates within each stage. Information on more than 3 million in situ and invasive cancer cases is included in the SEER database, and approximately 170,000 new cases are added each year within the SEER coverage areas. The incidence and survival data of the SEER Program may be used to access standard survival for a particular cancer site and stage. For example, to ensure an optimal comparison group, specific criteria may be selected from the database, including date of diagnosis and exact stage (for example, in the case of the lung cancer example herein, the years were selected to match the time-frame of the retrospective review, and stage 3B and 4 lung cancer were selected; and in the case of the colon cancer example herein, the years were also selected to match the time-frame of the retrospective review, and the stage 4 colon cancer was selected).

Cancers may also be named based on the organ in which they originate i.e., the "primary site," for example, cancer of the breast, brain, lung, liver, skin, prostate, testicle, bladder, colon and rectum, cervix, uterus, etc. This naming persists even if the cancer metastasizes to another part of the body that is different from the primary site. With the present invention, treatment is directed to the site of the cancer, not type of cancer, so that a cancer of any type that is symptomatic or etiologically located in the lung, for example, would be treated on the basis of this localization in the lung.

"Cancer antigens" are antigens expressed on cancer cells. For example, a number of antigens have been identified having restricted expression on human tumors, or as being overexpressed in human tumors. A number of such cancer antigens have for example been clinically tested as CAR T-cell targets, including: mesothelin, human epidermal growth factor receptor 2 (HER2), carbonic anhydrase IX (CAIX), epidermal growth factor receptor (EGFRvIII), CD171, folate receptor α (FR-α), GD2, mucin 1 (MUC1), fibroblast activation protein (FAP), carcinoembryonic antigen (CEA), and vascular endothelial growth factor receptor 2 (VEGF-R2). See for example: Lanitis, E., et al., Mol Ther. 2012, 20:633-643; Carpenito, C., et al. Proc Natl Acad Sci USA. 2009, 106:3360-3365; Morgan et al. Mol Ther. 2010, 18:843-851; Ahmed, N., et al. Cancer Res. 2012, 72; Lamers, C. H., et al. J Clin Oncol. 2006, 24:e20-e22; Lamers, C. H., et al. J Clin Oncol. 2006, 24:e20-e22; Lamers, C. G., et al. Mol Ther. 2013, 21:904-912; Johnson, L. A. et al. Sci Transl Med. 2015, 7(275):275ra222; O'Rourke, D., et al. Sci Transl Med. 2017, 19(9):399; Park, J. R., et al. Mol Ther. 2007; 15:825-833; Kershaw, M. H. et al. Clin Cancer Res. 2006, 12:6106-6115; Pule, M. A., et al. Nat Med. 2008, 14(11):1264-1270; Maher J., and Wilkie, S. Cancer Res. 2009 69(11):4559-4562; Kakarla, S., et al. Mol Ther. 2013, 21(8):1611-20; Schuberth, P. C., et al. J Transl Med. 2013, 11:187; Song, D. G., et al. Cancer Res. 2011, 71:4617-4627; Emtage, P. C., et al. Clin Cancer Res. 2008, 14:8112-8122; Shibaguchi, H., et al. Anticancer Res. 2006, 26:4067-4072; Niederman, T. M., et al. Proc Natl Acad Sci USA. 2002, 99:7009-7014; Chinnasamy, D., et al. J Clin Invest. 2010; 120:3953-3968).

Aspects of the invention relate to the use of PRR ligands. PRR ligands may for example be available commercially, for example in widely available preparations of attenuated or killed recombinant bacteria, which may for example be ligands for TLR2, TLR4 and TLR5. Compositions of pathogen-associated molecular patterns (PAMPs) may include PAMPS that are recognized by PRRs, including: Toll-like receptors (TLRs), NOD-like receptors (NLRs), RIG-1-like receptors (RLRs), C-type lectin receptors (CLRs) including Dectin-1, cytosolic dsDNA sensors (CDSs) and NLRs involved in the formation of inflammasomes.

Toll-like receptor 2 (TLR2) is involved in the recognition of a wide array of microbial molecules representing broad groups of species including Gram-positive and Gram-negative bacteria, as well as *Mycoplasma* and yeast. TLR2 recognizes cell-wall components such as peptidoglycan, lipoteichoic acid and lipoprotein from Gram-positive bacteria, lipoarabinomannan from mycobacteria, and zymosan from the yeast cell wall. Toll-like receptor 3 (TLR3) recognizes double-stranded RNA (dsRNA). Bacterial lipopolysaccharide (LPS) is recognized by Toll-like receptor 4 (TLR4) which interacts with at least three different extracellular proteins: LPS-binding protein (LBP), CD14 and, myeloid differentiation protein 2 (MD-2), to induce a signaling cascade leading to the activation of NF-κB and the production of proinflammatory cytokines. LPS generally consists of a polysaccharide region that is anchored in the outer bacterial membrane by a carbohydrate lipid moiety: lipid A, which is largely responsible for the immunostimulatory activity of LPS. Particularly active forms of lipid A contain six fatty acyl groups, as for example may be found in pathogenic bacteria that are strains of *Escherichia coli* or *Salmonella* spp. Toll-like receptor 5 (TLR5) recognizes flagellin from both Gram-positive and Gram-negative bacteria. Toll-like receptor 7 (TLR7) and TLR8 recognize single stranded RNAs and small synthetic molecules such as imidazoquinolines and nucleoside analogs. Toll-like receptor 9 (TLR9) recognizes specific unmethylated CpG motifs prevalent in microbial but not vertebrate genomic DNA.

NLRs are a family of at least 22 cytoplasmic innate immune sensors, including NOD1 (CARD4) and NOD2 (CARD15) which are intracellular pattern-recognition receptors involved in the recognition of peptidoglycan (PGN). These receptors detect specific motifs within PGN. NOD1 senses the diaminopimelatic acid (DAP)-containing muropeptide (specifically d-Glu-meso-DAP dipeptide "iE-DAP" dipeptide) which is found primarily in PGN of Gram-negative bacteria, as well as certain Gram-positive bacteria. NOD2 recognizes the muramyl dipeptide (MDP) structure found in almost all bacterial PGN.

The RIG-I-Like receptors (RLRs), particularly RIG-1 and MDA-5, detect viral RNA species.

CLR ligands include Dectin-1 and Mincle (macrophage-inducible C-type lectin) agonists. Dectin-1 is a specific receptor for β-glucans, which are glucose polymers found in the cell walls of fungi. Mincle is a multi-tasking danger signal receptor that recognizes a wide variety of ligands such as damaged cells, fungal components, yeast components and components of mycobacteria.

Cytosolic DNA Sensors (CDS) bind intracellular DNA from pathogens, and there are multiple CDSs which may display contextual preferences for the recognition of particular DNAs.

Cyclic dinucleotides (CDNs) and xanthenone derivatives, such as DMXAA, bind to and activate STING (STimulator of INterferon Genes).

The inflammasome is a multi-protein complex involved in the production of mature IL-1β, specifically through cleavage of pro-IL-1β and pro-IL-18 into active and secretable forms. Inflammasomes may be segregated into NLRP1, NLRP3, NLRC4 and AIM2 subtypes, which are activated by a wide variety of microbial molecules, danger signals and crystalline substances.

TABLE 1

PRR Receptors and their Ligands

| PRR | Ligand |
|---|---|
| TLR2 | Microbial cell wall components/preparations, Pam2C-Aca-Benzyl-Murabutide (Pam2C-conjugated murabutide) |
| TLR3 | Polyadenylic-polyuridylic acid, Polyinosine-polycytidylic acid |
| TLR4 | Lipopolysaccharide, Monophosphoryl Lipid A |
| TLR5 | Flagellin |
| TLR7/8 | Single-stranded RNAs, Nucleoside analogs, Imidazoquinolines/Thiazoquinolines |
| TLR9 | unmethylated CpG DNA motifs |
| NOD1 | iE-DAP, Acylated iE-DAP, D-gamma-Glu-mDAP, L-Ala-gamma-D-Glu-mDAP |

TABLE 1-continued

PRR Receptors and their Ligands

| PRR | Ligand |
|---|---|
| NOD2 | MDP (MurNAc-L-Ala-D-isoGln, muramyl dipeptide), N-glycolylated muramyldipeptide, N-Acetyl-muramyl-L-Alanyl-D-Glutamin-n-butyl-ester, MurNAc-Ala-D-isoGln-Lys, N-Acetylmuramyl-L-Alanyl-D-Isoglutamine (L-D isoform), 6-O-stearoyl-N-Acetyl-muramyl-L-alanyl-D-isoglutamine, Pam2C-Aca-Benzyl-Murabutide, |
| TLR2/NOD2 | Pam2C-conjugated murabutide |
| NOD1/NOD2 | PGN, Pam2C-conjugated murabutide |
| RIG1/MDA5 | 5' triphosphate double stranded RNA (18-20mer), polyriboinosinic:polyribocytidylic acid |
| DAI, LRRFIP1, AIM2, RIG1 | dsDNA, poly(dA-dT)•poly(dT-dA) |
| Dectin-1 | Beta-glucan peptide, fungal cell wall preparations |
| Mincle | damaged microbial cells, fungus, yeast and mycobacteria, Trehalose-6,6-dibehenate, trehalose-6,6-dimycolate |
| STING | Cyclic dinucleotides (c-di-nucleotides), xanthenone derivatives, 3'3'-cGAMP, 2'3'-cGAMP, 2'2'-cGAMP, 2'2'-cGAMP, c-di-AMP (cyclic di-adenylate monophosphate), c-di-GMP, c-di-IMP, c-di-UMP, c-di-AMP |

TABLE 2

Cytosolic nucleic acid-sensing PRRs and their Ligands (Broz & Monack, 2013, Nature Reviews Immunology 13, 551-565).

| PRR | Ligands |
|---|---|
| RIG-I | PPP-ssRNA (PPP-ssRNA, ssRNA with a 5'-triphosphate group), RNA with base pairing and polyI:C |
| MDA5 | Long dsRNA |
| LGP2 | dsRNA |
| DDX41 | B-form DNA and CDNs (cyclic dinucleotides) |
| DHX9 | DNA, RNA, CpG-A oligodeoxynucleotids and CpG-B ODNs |
| DDX3 | Viral RNA |
| DHX36 | DNA, RNA, CpG-A oligodeoxynucleotids and CpG-B oligodeoxynucleotids |
| DDX1-DDX21-DDX36 | RNA and polyI:C |
| DDX60 | ssRNA, dsRNA and dsDNA |
| KU70 | DNA |
| cGAS | DNA |
| STING | CDNs (c-di-GMP and c-di-AMP) |
| NOD2 | ssRNA |
| NLRP3 | ssRNA, dsRNA, bacterial mRNA and oxidized mitochondrial DNA |
| AIM2 | DNA |
| IFI16 | dsDNA |
| LRRFIP1 | B-form DNA, Z-form DNA and dsRNA |
| DAI | DNA |
| IFIT1, 2, 3 and 5 | PPP-ssRNA |

Aspects of the invention accordingly involve using PRR agonists derived from a selected microbial pathogen. For example, peptidoglycan (PGN) may be obtained from a bacteria or bacterial strain that is pathogenic in a selected target tissue or organ, for use as a NOD1/NOD2 agonist. Similarly, cell wall components may be obtained from a bacteria or bacterial strain that is pathogenic in a selected target tissue or organ, for use as a TLR2 agonist. Similarly, DNA, including double stranded DNA, particularly repetitive double stranded DNA, may be obtained from a microbial pathogen, such as a bacteria or bacterial strain that is pathogenic in a selected target tissue or organ, for use as a DAI, LRRFIP1, RIG1, TLR9, AIM2 or cytosolic DNA sensor (CDS) agonist. Beta-glucan peptides may be obtained from fungi or yeast that are pathogenic in a selected target tissue or organ, for use as a Dectin-1 agonists. Cyclic dinucleotides may be obtained from a microbial pathogen that is pathogenic in a selected target tissue or organ, for use as a STING agonist.

Aspects of the invention involve compositions that have a distinct PRR agonist signature, which connotes a repertoire of PRR agonists that are together collected in a therapeutic vehicle, so that the selected collection of PRR agonists is distinct. A "therapeutic vehicle" in this context is a formulation that aggregates and retains the PRR agonists, for example in a pharmaceutically acceptable particle or vesicle, such as a recombinant microbe. For example, the PRR agonist signature may be different from a reference PRR agonist signature, for example different from the collection of PRR agonists that would be present on a microbe that is not pathogenic in the target tissue. The PRR signature may also be distinct in the sense that it is different than a native PRR agonist signature of the microbial mammalian pathogen, for example altered by way of the recombinant expression of genes that alter what would otherwise be the wildtype PRR agonist signature of the pathogen. For purposes of determining the distinctiveness of a PRR agonist signature, the levels or kinds of PRR agonist may be directly measured, or may be measured for example by determining the activation or inhibition of a signaling pathway in a cell consequent to PRR agonist/receptor binding.

Various genes and nucleic acid sequences of the invention may be recombinant sequences. The term "recombinant" means that something has been recombined, so that when made in reference to a nucleic acid construct the term refers to a molecule that is comprised of nucleic acid sequences that are joined together or produced by means of molecular biological techniques. Nucleic acid "constructs" are accordingly recombinant nucleic acids, which have been generally been made by aggregating interoperable component sequencers. The term "recombinant" when made in reference to a protein or a polypeptide refers to a protein or polypeptide molecule which is expressed using a recombinant nucleic acid construct created by means of molecular biological techniques. The term "recombinant" when made in reference to the genetic composition or an organism or cell refers to new combinations of alleles that did not occur in the parental genomes. Recombinant nucleic acid constructs may include a nucleotide sequence which is ligated to, or is manipulated to become ligated to, a nucleic acid sequence to which it is not ligated in nature, or to which it is ligated at a different location in nature. Referring to a nucleic acid construct as "recombinant" therefore indicates that the nucleic acid molecule has been manipulated using genetic engineering, i.e. by human intervention (so that it is anthropogenic). Recombinant nucleic acid constructs may for example be introduced into a host cell by transformation. Such recombinant nucleic acid constructs may include sequences derived from the same host cell species or from different host cell species, which have been isolated and reintroduced into cells of the host species. Recombinant nucleic acid construct sequences may become integrated into a host cell genome, either as a result of the original transformation of the host cells, or as the result of subsequent recombination and/or repair events.

Recombinant constructs of the invention may include a variety of functional molecular or genomic components, as required for example to mediate gene expression or suppression in a transformed plant. In this context, "DNA regulatory sequences," "control elements," and "regulatory elements," refer to transcriptional and translational control sequences, such as promoters, enhancers, polyadenylation signals, terminators, and protein degradation signals that regulate gene expression, as well as epigenetic regulatory signals for example involving methylation or acetylation of histones (e.g. histone methyltransferase or acetyltransferase), leading to conformational changes in the transcriptional landscape and gene expression differences. In the context of the present disclosure, "promoter" means a sequence sufficient to direct transcription of a gene when the promoter is operably linked to the gene. The promoter is accordingly the portion of a gene containing DNA sequences that provide for the binding of RNA polymerase and initiation of transcription. Promoter sequences are commonly, but not universally, located in the 5' non-coding regions of a gene. A promoter and a gene are "operably linked" when such sequences are functionally connected so as to permit gene expression mediated by the promoter. The term "operably linked" accordingly indicates that DNA segments are arranged so that they function in concert for their intended purposes, such as initiating transcription in the promoter to proceed through the coding segment of a gene to a terminator portion of the gene. Gene expression may occur in some instances when appropriate molecules (such as transcriptional activator proteins) are bound to the promoter. Expression is the process of conversion of the information of a coding sequence of a gene into mRNA by transcription and subsequently into polypeptide (protein) by translation, as a result of which the protein is said to be expressed. As the term is used herein, a gene or nucleic acid is "expressible" if it is capable of expression under appropriate conditions in a particular host cell.

An "isolated" nucleic acid or polynucleotide as used herein refers to a component that is removed from its original environment (for example, its natural environment if it is naturally occurring). An isolated nucleic acid or polypeptide may contain less than about 50%, less than about 75%, less than about 90%, less than about 99.9% or less than any integer value between 50 and 99.9% of the cellular or biological components with which it was originally associated. A polynucleotide amplified using PCR so that it is sufficiently distinguishable (on a gel from example) from the rest of the cellular components is, for example, thereby "isolated". The polynucleotides of the invention may be "substantially pure," i.e., having the high degree of isolation as achieved using a purification technique.

In the context of biological molecules "endogenous" refers to a molecule such as a nucleic acid that is naturally found in and/or produced by a given organism or cell. An "endogenous" molecule may also be referred to as a "native" molecule. Conversely, in the context of biological molecules "exogenous" refers to a molecule, such as a nucleic acid, that is not normally or naturally found in and/or produced by a given organism or cell in nature.

As used herein to describe nucleic acid or amino acid sequences, the term "heterologous" refers to molecules or portions of molecules, such as DNA sequences, that are artificially introduced into a particular host cell, for example by transformation. Heterologous DNA sequences may for example be introduced into a host cell by transformation. Such heterologous molecules may include sequences derived from the host cell. Heterologous DNA sequences may become integrated into the host cell genome, either as a result of the original transformation of the host cells, or as the result of subsequent recombination events.

Various aspects of the present disclosure encompass nucleic acid or amino acid sequences that are homologous to other sequences. As the term is used herein, an amino acid or nucleic acid sequence is "homologous" to another sequence if the two sequences are substantially identical and the functional activity of the sequences is conserved (as used herein, sequence conservation or identity does not infer evolutionary relatedness). Nucleic acid sequences may also be homologous if they encode substantially identical amino acid sequences, even if the nucleic acid sequences are not themselves substantially identical, for example as a result of the degeneracy of the genetic code.

With reference to biological sequences "substantial homology" or "substantial identity" is meant, in the alternative, a homology of greater than 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% up to 100% sequence identity. Homology may refer to nucleic acid or amino acid sequences as the context dictates. In alternative embodiments, sequence identity may for example be at least 75%, at least 90% or at least 95%. Optimal alignment of sequences for comparisons of identity may be conducted using a variety of algorithms, such as the local homology algorithm of Smith and Waterman (1981) *Adv. Appl. Math* 2: 482, the homology alignment algorithm of Needleman and Wunsch (1970) *J. Mol. Biol.* 48:443, the search for similarity method of Pearson and Lipman (1988) *Proc. Nat. Acad. Sci. USA* 85: 2444, and the computerized implementations of these algorithms (such as GAP, BESTFIT, FASTA and TFASTA in the Wisconsin Genetics Software Package, Genetics Computer Group, Madison, Wis., U.S.A.). Sequence identity may also be determined using the BLAST algorithm, described in Altschul et al. (1990), *J. Mol. Biol.* 215:403-10 (using the published default settings). Software for performing BLAST analysis may be available through the National Center for Biotechnology Information (NCBI) at their Internet site. The BLAST algorithm involves first identifying high scoring sequence pairs (HSPs) by identifying short words of length W in the query sequence that either match or satisfy some positive-valued threshold score T when aligned with a word of the same length in a database sequence. T is referred to as the neighborhood word score threshold. Initial neighborhood word hits act as seeds for initiating searches to find longer HSPs. The word hits are extended in both directions along each sequence for as far as the cumulative alignment score can be increased. Extension of the word hits in each direction is halted when the following parameters are met: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T and X determine the sensitivity and speed of the alignment. The BLAST program may use as defaults a word length (W) of 11, the BLOSUM62 scoring matrix (Henikoff and Henikoff (1992) *Proc. Natl. Acad. Sci. USA* 89: 10915-10919) alignments (B) of 50, expectation (E) of 10, M=5, N=4, and a comparison of both strands. One measure of the statistical similarity between two sequences using the BLAST algorithm is the smallest sum probability (P(N)), which provides an indication of the probability by which a match between two nucleotide or amino acid sequences would occur by chance. In alternative embodiments, nucleotide or amino acid sequences are considered substantially identical if the smallest sum probability in a comparison of the test sequences is less than about 1, less than about 0.1, less than about 0.01, or less than about 0.001.

An alternative indication that two amino acid sequences are substantially identical is that one peptide is specifically immunologically reactive with antibodies that are also specifically immunoreactive against the other peptide. Antibodies are specifically immunoreactive to a peptide if the antibodies bind preferentially to the peptide and do not bind in a significant amount to other proteins present in the sample, so that the preferential binding of the antibody to the peptide is detectable in an immunoassay and distinguishable from non-specific binding to other peptides. Specific immunoreactivity of antibodies to peptides may be assessed using a variety of immunoassay formats, such as solid-phase ELISA immunoassays for selecting monoclonal antibodies specifically immunoreactive with a protein (see Harlow and Lane (1988) *Antibodies, A Laboratory Manual*, Cold Spring Harbor Publications, New York).

An alternative indication that two nucleic acid sequences are substantially identical is that the two sequences hybridize to each other under moderately stringent, or stringent, conditions. Hybridization to filter-bound sequences under moderately stringent conditions may, for example, be performed in 0.5 M $NaHPO_4$, 7% sodium dodecyl sulfate (SDS), 1 mM EDTA at 65° C., and washing in 0.2×SSC/0.1% SDS at 42° C. (see Ausubel, et al. (eds), 1989, *Current Protocols in Molecular Biology*, Vol. 1, Green Publishing Associates, Inc., and John Wiley & Sons, Inc., New York, at p. 2.10.3). Alternatively, hybridization to filter-bound sequences under stringent conditions may, for example, be performed in 0.5 M $NaHPO_4$, 7% SDS, 1 mM EDTA at 65° C., and washing in 0.1×SSC/0.1% SDS at 68° C. (see Ausubel, et al. (eds), 1989, supra). Hybridization conditions may be modified in accordance with known methods depending on the sequence of interest (see Tijssen, 1993, *Laboratory Techniques in Biochemistry and Molecular Biology—Hybridization with Nucleic Acid Probes*, Part I, Chapter 2 "Overview of principles of hybridization and the strategy of nucleic acid probe assays", Elsevier, N.Y.). Generally, stringent conditions are selected to be about 5° C. lower than the thermal melting point for the specific sequence at a defined ionic strength and pH. The term "a polynucleotide that hybridizes under stringent (low, intermediate) conditions" is intended to encompass both single and double-stranded polynucleotides although only one strand will hybridize to the complementary strand of another polynucleotide. Washing in the specified solutions may be conducted for a range of times from several minutes to several days and those skilled in the art will readily select appropriate wash times to discriminate between different levels of homology in bound sequences.

It is well known in the art that some modifications and changes can be made in the structure of a polypeptide without substantially altering the biological function of that peptide, to obtain a biologically equivalent polypeptide. As used herein, the term "conserved amino acid substitutions" refers to the substitution of one amino acid for another at a given location in the peptide, where the substitution can be made without any appreciable loss or gain of function, to obtain a biologically equivalent polypeptide. In making such changes, substitutions of like amino acid residues can be made on the basis of relative similarity of side-chain substituents, for example, their size, charge, hydrophobicity, hydrophilicity, and the like, and such substitutions may be assayed for their effect on the function of the peptide by routine testing. Conversely, as used herein, the term "non-conserved amino acid substitutions" refers to the substitution of one amino acid for another at a given location in the peptide, where the substitution causes an appreciable loss or gain of function of the peptide, to obtain a polypeptide that is not biologically equivalent.

In some embodiments, conserved amino acid substitutions may be made where an amino acid residue is substituted for another having a similar hydrophilicity value (e.g., within a value of plus or minus 2.0), where the following hydrophilicity values are assigned to amino acid residues (as detailed in U.S. Pat. No. 4,554,101): Arg (+3.0); Lys (+3.0); Asp (+3.0); Glu (+3.0); Ser (+0.3); Asn (+0.2); Gln (+0.2); Gly (0); Pro (−0.5); Thr (−0.4); Ala (−0.5); His (−0.5); Cys (−1.0); Met (−1.3); Val (−1.5); Leu (−1.8); Ile (−1.8); Tyr (−2.3); Phe (−2.5); and Trp (−3.4). Non-conserved amino acid substitutions may be made were the hydrophilicity value of the residues is significantly different, e.g. differing by more than 2.0.

In alternative embodiments, conserved amino acid substitutions may be made where an amino acid residue is substituted for another having a similar hydropathic index (e.g., within a value of plus or minus 2.0). In such embodiments, each amino acid residue may be assigned a hydropathic index on the basis of its hydrophobicity and charge characteristics, as follows: Ile (+4.5); Val (+4.2); Leu (+3.8); Phe (+2.8); Cys (+2.5); Met (+1.9); Ala (+1.8); Gly (−0.4); Thr (−0.7); Ser (−0.8); Trp (−0.9); Tyr (−1.3); Pro (−1.6); His (−3.2); Glu (−3.5); Gln (−3.5); Asp (−3.5); Asn (−3.5); Lys (−3.9); and Arg (−4.5). Non-conserved amino acid substitutions may be made were the hydropathic index of the residues is significantly different, e.g. differing by more than 2.0.

In alternative embodiments, conserved amino acid substitutions may be made where an amino acid residue is substituted for another in the same class, where the amino acids are divided into non-polar, acidic, basic and neutral classes, as follows: non-polar: Ala, Val, Leu, Ile, Phe, Trp, Pro, Met; acidic: Asp, Glu; basic: Lys, Arg, His; neutral: Gly, Ser, Thr, Cys, Asn, Gln, Tyr. Non-conserved amino acid substitutions may be made were the residues do not fall into the same class, for example substitution of a basic amino acid for a neutral or non-polar amino acid.

PRR ligands for use in alternative aspects of the invention may be derived from microorganisms. More particularly, the microorganism that is the source of the PRR ligands may be pathogenic is a target tissue of interest. The characterization of a microbe as a pathogen is nuanced, in that most animals are colonized to some degree by microorganisms, such as bacteria, which exist in symbiotic or commensal relationships with the host animal. Thus, many species of normally harmless bacteria are found in healthy animals, and are usually localized to the surface of specific organs and tissues. Often, these microbial communities aid in the normal functioning of the body, as members of what is termed the microbiome. Microbes that are generally harmless, such as *Escherichia coli*, can cause infection in healthy subjects, with results ranging from mild infection to death. Whether or not a microorganism is pathogenic (i.e., causes infection) depends on factors such as: the route of entry and access to specific host cells, tissues, or organs; the intrinsic virulence of the microorganism; the amount of the microorganism present at the site of potential infection; or the health of the host animal. Thus, microorganisms that are normally harmless can become pathogenic given favorable conditions for infection, and even the most virulent microorganism generally requires specific circumstances to cause infection. Accordingly, microbial species that are members of the normal flora can be pathogens when they move beyond their normal ecological role in the endogenous flora. For example, endogenous species can cause infection outside of their ecological niche in regions of anatomical proximity, for example by contiguous spread. When this occurs, these normally harmless endogenous bacteria are pathogenic.

Specific microbial species are known to cause infections in specific cells, tissues, or organs in otherwise healthy subjects. Examples of bacteria and viruses that commonly cause infections in specific organs and tissues of the body are listed below; and these examples are not limiting in the sense that a skilled person would be able to recognize and identify infectious or pathogenic bacteria that cause infections, or commonly cause infections, in various organs and tissues in otherwise healthy organisms (and recognize the relative frequency of infection with each bacterial species) based on the knowledge in the field as represented, for example, by the following publications: Manual of Clinical Microbiology 8th Edition, Patrick Murray, Ed., 2003, ASM Press American Society for Microbiology, Washington, DC, USA; Mandell, Douglas, and Bennett's Principles and Practice of Infectious Diseases 5th Edition, G. L. Mandell, J. E. Bennett, R. Dolin, Eds., 2000, Churchill Livingstone, Philadelphia, PA, USA, all of which are incorporated by reference herein.

Infections of the skin are commonly caused by the following bacterial species: *Staphylococcus aureus*, Beta hemolytic streptococci group A, B, C or G, *Corynebacterium diptheriae*, *Corynebacterium ulcerans*, or *Pseudomonas aeruginosa*; or viral pathogens: rubeola, rubella, varicella-zoster, echoviruses, coxsackieviruses, adenovirus, vaccinia, herpes simplex, or parvo B19.

Infections of the soft tissue (e.g., fat and muscle) are commonly caused by the following bacterial species: *Streptococcus pyogenes*, *Staphylococcus aureus*, *Clostridium perfringens*, or other *Clostridium* spp.; or viral pathogens: influenza, or coxsackieviruses.

Infections of the breast are commonly caused by the following bacterial species: *Staphylococcus aureus*, or *Streptococcus pyogenes*.

Infections of the lymph nodes of the head and neck are commonly caused by the following bacterial species: *Staphylococcus aureus*, or *Streptococcus pyogenes*; or viral pathogens: Epstein-Barr, cytomegalovirus, adenovirus, measles, rubella, herpes simplex, coxsackieviruses, or varicella-zoster.

Infections of the lymph nodes of the arm/axillae are commonly caused by the following bacterial species: *Staphylococcus aureus*, or *Streptococcus pyogenes*; or viral pathogens: measles, rubella, Epstein-Barr, cytomegalovirus, adenovirus, or varicella-zoster.

Infections of the lymph nodes of the mediastinum are commonly caused by the following bacterial species: *viridans* streptococci, *Peptococcus* spp., *Peptostreptococcus* spp., *Bacteroides* spp., *Fusobacterium* spp., or *Mycobacterium tuberculosis*; or viral pathogens: measles, rubella, Epstein-Barr, cytomegalovirus, varicella-zoster, or adenovirus.

Infections of the pulmonary hilar lymph nodes are commonly caused by the following bacterial species: *Streptococcus pneumoniae*, *Moraxella catarrhalis*, *Mycoplasma pneumoniae*, *Klebsiella pneumoniae*, *Haemophilus influenza*, *Chlamydophila pneumoniae*, *Bordetella pertussis* or *Mycobacterium tuberculosis*; or viral pathogens: influenza, adenovirus, rhinovirus, coronavirus, parainfluenza, respiratory syncytial virus, human metapneumovirus, or coxsackievirus.

Infections of the intra-abdominal lymph nodes are commonly caused by the following bacterial species: *Yersinia enterocolitica*, *Yersinia pseudotuberculosis*, *Salmonella* spp., *Streptococcus pyogenes*, *Escherichia coli*, *Staphylococcus aureus*, or *Mycobacterium tuberculosis*; or viral pathogens: measles, rubella, Epstein-Barr, cytomegalovirus, varicella-zoster, adenovirus, influenza, or coxsackieviruses.

Infections of the lymph nodes of the leg/inguinal region are commonly caused by the following bacterial species: *Staphylococcus aureus*, or *Streptococcus pyogenes*; or viral pathogens: measles, rubella, Epstein-Barr, cytomegalovirus, or herpes simplex.

Infections of the blood (i.e., septicemia) are commonly caused by the following bacterial species: *Staphylococcus aureus*, *Streptococcus pyogenes*, coagulase-negative staphylococci, *Enterococcus* spp., *Escherichia coli*, *Klebsiella* spp., *Enterobacter* spp., *Proteus* spp., *Pseudomonas aeruginosa*, *Bacteroides fragilis*, *Streptococcus pneumoniae*, or group B streptococci; or viral pathogens: rubeola, rubella, varicella-zoster, echoviruses, coxsackieviruses, adenovirus, Epstein-Barr, herpes simplex, or cytomegalovirus.

Infections of the bone are commonly caused by the following bacterial species: *Staphylococcus aureus*, coagulase-negative staphylococci, *Streptococcus pyogenes*, *Streptococcus pneumoniae*, *Streptococcus agalactiae*, other streptococci spp., *Escherichia coli*, *Pseudomonas* spp., *Enterobacter* spp., *Proteus* spp., or *Serratia* spp.; or viral pathogens: parvovirus B19, rubella, or hepatitis B.

Infections of the joint are commonly caused by the following bacterial species: *Staphylococcus aureus*, coagulase-negative staphylococci, *Streptococcus pyogenes*, *Streptococcus pneumoniae*, *Streptococcus agalactiae*, other streptococci spp., *Escherichia coli*, *Pseudomonas* spp., *Enterobacter* spp., *Proteus* spp., *Serratia* spp., *Neisseria* gonorrhea, *salmonella* species, *Mycobacterium tuberculosis*, *Hemophilus influenza*; or viral pathogens: parvovirus B19, rubella, hepatitis B; or fungal pathogen: *Scedosporium prolificans*

Infections of the meninges are commonly caused by the following bacterial species: *Haemophilus influenzae*, *Neisseria meningitidis*, *Streptococcus pneumoniae*, *Streptococcus agalactiae*, or *Listeria monocytogenes*; or viral pathogens: echoviruses, coxsackieviruses, other enteroviruses, or mumps.

Infections of the brain are commonly caused by the following bacterial species: *Streptococcus* spp. (including *S. anginosus*, *S. constellatus*, *S. intermedius*), *Staphylococcus aureus*, *Bacteroides* spp., *Prevotella* spp., *Proteus* spp., *Escherichia coli*, *Klebsiella* spp., *Pseudomonas* spp., *Enterobacter* spp., or *Borrelia burgdorferi*; or viral pathogens: coxsackieviruses, echoviruses, poliovirus, other enteroviruses, mumps, herpes simplex, varicella-zoster, flaviviruses, or bunyaviruses.

Infections of the spinal cord are commonly caused by the following bacterial species: *Haemophilus influenzae*, *Neisseria meningitidis*, *Streptococcus pneumoniae*, *Streptococcus agalactiae*, *Listeria monocytogenes*, or *Borrelia burgdorferi*; or viral pathogens: coxsackieviruses, echoviruses, poliovirus, other enteroviruses, mumps, herpes simplex, varicella-zoster, flaviviruses, or bunyaviruses.

Infections of the eye/orbit are commonly caused by the following bacterial species: *Staphylococcus aureus*, *Streptococcus pyogenes*, *Streptococcus pneumoniae*, *Streptococcus milleri*, *Escherichia coli*, *Bacillus cereus*, *Chlamydia trachomatis*, *Haemophilus influenza*, *Pseudomonas* spp.,

*Klebsiella* spp., or *Treponema pallidum*; or viral pathogens: adenoviruses, herpes simplex, varicella-zoster, or cytomegalovirus.

Infections of the salivary glands are commonly caused by the following bacterial species: *Staphylococcus aureus, viridans* streptococci (e.g., *Streptococcus salivarius, Streptococcus sanguis, Streptococcus mutans*), *Peptostreptococcus* spp., or *Bacteroides* spp., or other oral anaerobes; or viral pathogens: mumps, influenza, enteroviruses, or rabies.

Infections of the mouth are commonly caused by the following bacterial species: *Prevotella melaninogenicus*, anaerobic streptococci, *viridans* streptococci, *Actinomyces* spp., *Peptostreptococcus* spp., or *Bacteroides* spp., or other oral anaerobes; or viral pathogens: herpes simplex, coxsackieviruses, or Epstein-Barr.

Infections of the tonsils are commonly caused by the following bacterial species: *Streptococcus pyogenes*, or Group C or G B-hemolytic streptococci; or viral pathogens: rhinoviruses, influenza, coronavirus, adenovirus, parainfluenza, respiratory syncytial virus, or herpes simplex.

Infections of the sinuses are commonly caused by the following bacterial species: *Streptococcus pneumoniae, Haemophilus influenza, Moraxella catarrhalis,* α-streptococci, anaerobic bacteria (e.g., *Prevotella* spp.), or *Staphylococcus aureus*; or viral pathogens: rhinoviruses, influenza, adenovirus, or parainfluenza.

Infections of the nasopharynx are commonly caused by the following bacterial species: *Streptococcus pyogenes*, or Group C or G B-hemolytic streptococci; or viral pathogens: rhinoviruses, influenza, coronavirus, adenovirus, parainfluenza, respiratory syncytial virus, or herpes simplex.

Infections of the thyroid are commonly caused by the following bacterial species: *Staphylococcus aureus, Streptococcus pyogenes*, or *Streptococcus pneumoniae*; or viral pathogens: mumps, or influenza.

Infections of the larynx are commonly caused by the following bacterial species: *Mycoplasma pneumoniae, Chlamydophila pneumoniae*, or *Streptococcus pyogenes*; or viral pathogens: rhinovirus, influenza, parainfluenza, adenovirus, corona virus, or human metapneumovirus.

Infections of the trachea are commonly caused by the following bacterial species: *Mycoplasma pneumoniae*; or viral pathogens: parainfluenza, influenza, respiratory syncytial virus, or adenovirus.

Infections of the bronchi are commonly caused by the following bacterial species: *Mycoplasma pneumoniae, Chlamydophila pneumoniae, Bordetella pertussis, Streptococcus pneumoniae*, or *Haemophilus influenzae*; or viral pathogens: influenza, adenovirus, rhinovirus, coronavirus, parainfluenza, respiratory syncytial virus, human metapneumovirus, or coxsackievirus.

Infections of the lung are commonly caused by the following bacterial species: *Streptococcus pneumoniae, Moraxella catarrhalis, Mycoplasma pneumoniae, Klebsiella pneumoniae*, or *Haemophilus influenza*; or viral pathogens: influenza, adenovirus, respiratory syncytial virus, or parainfluenza.

Infections of the pleura are commonly caused by the following bacterial species: *Staphylococcus aureus, Streptococcus pyogenes, Streptococcus pneumoniae, Haemophilus influenzae, Bacteroides fragilis, Prevotella* spp., *Fusobacterium nucleatum, Peptostreptococcus* spp., or *Mycobacterium tuberculosis*; or viral pathogens: influenza, adenovirus, respiratory syncytial virus, or parainfluenza.

Infections of the mediastinum are commonly caused by the following bacterial species: *viridans* streptococci, *Peptococcus* spp., *Peptostreptococcus* spp., *Bacteroides* spp., *Fusobacterium* spp., or *Mycobacterium tuberculosis*; or viral pathogens: measles, rubella, Epstein-Barr, or cytomegalovirus.

Infections of the heart are commonly caused by the following bacterial species: *Streptococcus* spp. (including *S. mitior, S. bovis, S. sanguis, S. mutans, S. anginosus*), *Enterococcus* spp., *Staphylococcus* spp., *Corynebacterium diptheriae, Clostridium perfringens, Neisseria meningitidis*, or *Salmonella* spp.; or viral pathogens: enteroviruses, coxsackieviruses, echoviruses, poliovirus, adenovirus, mumps, rubeola, or influenza.

Infections of the esophagus are commonly caused by the following bacterial species: *Actinomyces* spp., *Mycobacterium avium, Mycobacterium tuberculosis*, or *Streptococcus* spp.; or viral pathogens: cytomegalovirus, herpes simplex, or varicella-zoster.

Infections of the stomach are commonly caused by the following bacterial species: *Streptococcus pyogenes* or *Helicobacter pylori*; or viral pathogens: cytomegalovirus, herpes simplex, Epstein-Barr, rotaviruses, noroviruses, or adenoviruses.

Infections of the small bowel are commonly caused by the following bacterial species: *Escherichia coli, Clostridium difficile, Bacteroides fragilis, Bacteroides vulgatus, Bacteroides thetaiotaomicron, Clostridium perfringens, Salmonella enteriditis, Yersinia enterocolitica*, or *Shigella flexneri*; or viral pathogens: adenoviruses, astroviruses, caliciviruses, noroviruses, rotaviruses, or cytomegalovirus.

Infections of the colon/rectum are commonly caused by the following bacterial species: *Escherichia coli, Clostridium difficile, Bacteroides fragilis, Bacteroides vulgatus, Bacteroides thetaiotaomicron, Clostridium perfringens, Salmonella enteriditis, Yersinia enterocolitica*, or *Shigella flexneri*; or viral pathogens: adenoviruses, astroviruses, caliciviruses, noroviruses, rotaviruses, or cytomegalovirus.

Infections of the anus are commonly caused by the following bacterial species: *Streptococcus pyogenes, Bacteroides* spp., *Fusobacterium* spp., anaerobic streptococci, *Clostridium* spp., *Escherichia coli, Enterobacter* spp., *Pseudomonas aeruginosa*, or *Treponema pallidum*; or viral pathogens: herpes simplex.

Infections of the perineum are commonly caused by the following bacterial species: *Escherichia coli, Klebsiella* spp., *Enterococcus* spp., *Bacteroides* spp., *Fusobacterium* spp., *Clostridium* spp., *Pseudomonas aeruginosa*, anaerobic streptococci, *Clostridium* spp., or *Enterobacter* spp.; or viral pathogens: herpes simplex.

Infections of the liver are commonly caused by the following bacterial species: *Escherichia coli, Klebsiella* spp., *Streptococcus (anginosus* group), *Enterococcus,* spp. other *viridans* streptococci, or *Bacteroides* spp.; or viral pathogens: hepatitis A, Epstein-Barr, herpes simplex, mumps, rubella, rubeola, varicella-zoster, coxsackieviruses, or adenovirus.

Infections of the gallbladder are commonly caused by the following bacterial species: *Escherichia coli, Klebsiella* spp., *Enterobacter* spp., enterococci, *Bacteroides* spp., *Fusobacterium* spp., *Clostridium* spp., *Salmonella enteriditis, Yersinia enterocolitica*, or *Shigella flexneri*.

Infections of the biliary tract are commonly caused by the following bacterial species: *Escherichia coli, Klebsiella* spp., *Enterobacter* spp., enterococci, *Bacteroides* spp., *Fusobacterium* spp., *Clostridium* spp., *Salmonella enteriditis, Yersinia enterocolitica*, or *Shigella flexneri*; or viral pathogens: hepatitis A, Epstein-Barr, herpes simplex, mumps, rubella, rubeola, varicella-zoster, coxsackieviruses, or adenovirus.

Infections of the pancreas are commonly caused by the following bacterial species: *Escherichia coli, Klebsiella* spp., *Enterococcus* spp., *Pseudomonas* spp., Staphylococcal spp., *Mycoplasma* spp., *Salmonella typhi, Leptospirosis* spp., or *Legionella* spp.; or viral pathogens: mumps, coxsackievirus, hepatitis B, cytomegalovirus, herpes simplex 2, or varicella-zoster.

Infections of the spleen are commonly caused by the following bacterial species: *Streptococcus* spp., *Staphylococcus* spp., *Salmonella* spp., *Pseudomonas* spp., *Escherichia coli,* or *Enterococcus* spp.; or viral pathogens: Epstein-Barr, cytomegalovirus, adenovirus, measles, rubella, coxsackieviruses, or varicella-zoster.

Infections of the adrenal gland are commonly caused by the following bacterial species: *Streptococcus* spp., *Staphylococcus* spp., *Salmonella* spp., *Pseudomonas* spp., *Escherichia coli,* or *Enterococcus* spp.; or viral pathogens: varicella-zoster.

Infections of the kidney are commonly caused by the following bacterial species: *Escherichia coli, Proteus mirabilis, Proteus vulgatus, Providentia* spp., *Morganella* spp., *Enterococcus faecalis,* or *Pseudomonas aeruginosa*; or viral pathogens: BK virus, or mumps.

Infections of the ureter are commonly caused by the following bacterial species: *Escherichia coli, Proteus mirabilis, Proteus vulgatus, Providentia* spp., *Morganella* spp., or *Enterococcus* spp.

Infections of the bladder are commonly caused by the following bacterial species: *Escherichia coli, Proteus mirabilis, Proteus vulgatus, Providentia* spp., *Morganella* spp., *Enterococcus faecalis,* or *Corynebacterium jekeum*; or viral pathogens: adenovirus, or cytomegalovirus.

Infections of the peritoneum are commonly caused by the following bacterial species: *Staphylococcus aureus, Streptococcus pyogenes, Streptococcus pneumoniae, Escherichia coli, Klebsiella* spp., *Proteus* spp., enterococci, *Bacteroides fragilis, Prevotella melaninogenica, Peptococcus* spp., *Peptostreptococcus* spp., *Fusobacterium* spp., or *Clostridium* spp.

Infections of the retroperitoneal area are commonly caused by the following bacterial species: *Escherichia coli,* or *Staphylococcus aureus.*

Infections of the prostate are commonly caused by the following bacterial species: *Escherichia coli, Klebsiella* spp., *Enterobacter* spp., *Proteus mirabilis,* enterococci spp., *Pseudomonas* spp., *Corynebacterium* spp., or *Neisseria gonorrhoeae*; or viral pathogens: herpes simplex.

Infections of the testicle are commonly caused by the following bacterial species: *Escherichia coli, Klebsiella pneumoniae, Pseudomonas aeruginosa, Staphylococcus* spp., *Streptococcus* spp., or *Salmonella enteriditis*; or viral pathogens: mumps, coxsackievirus, or lymphocytic choriomeningitis virus.

Infections of the penis are commonly caused by the following bacterial species: *Staphylococcus aureus, Streptococcus pyogenes, Neisseria gonorrhoeae,* or *Treponema pallidum*; or viral pathogens: herpes simplex.

Infections of the ovary/adnexae are commonly caused by the following bacterial species: *Neisseria gonorrhoeae, Chlamydia trachomatis, Gardnerella vaginalis, Prevotella* spp., *Bacteroides* spp., *Peptococcus* spp. *Streptococcus* spp., or *Escherichia coli.*

Infections of the uterus are commonly caused by the following bacterial species: *Neisseria gonorrhoeae, Chlamydia trachomatis, Gardnerella vaginalis, Prevotella* spp., *Bacteroides* spp., *Peptococcus* spp., *Streptococcus* spp., or *Escherichia coli.*

Infections of the cervix are commonly caused by the following bacterial species: *Neisseria gonorrhoeae, Chlamydia trachomatis,* or *Treponema pallidum*; or viral pathogens: herpes simplex.

Infections of the vagina are commonly caused by the following bacterial species: *Gardnerella vaginalis, Prevotella* spp., *Bacteroides* spp., peptococci spp., *Escherichia coli, Neisseria gonorrhoeae, Chlamydia Trachomatis,* or *Treponema pallidum*; or viral pathogens: herpes simplex.

Infections of the vulva are commonly caused by the following bacterial species: *Staphylococcus aureus, Streptococcus pyogenes,* or *Treponema pallidum*; or viral pathogens: herpes simplex.

Bacterial species are classified operationally as collections of similar strains (which generally refers to groups of presumed common ancestry with identifiable physiological but usually not morphological distinctions, and which may be identified using serological techniques against bacterial surface antigens). Thus, each bacterial species (e.g., *Streptococcus pneumoniae*) has numerous strains (or serotypes), which may differ in their ability to cause infection or differ in their ability to cause infection in a particular organ/site. For example, although there are at least 90 serotypes of *Streptococcus pneumoniae,* serotypes 1, 3, 4, 7, 8, and 12 are most frequently responsible for pneumococcal disease in humans.

Certain strains of *Escherichia coli,* referred to as extraintestinal pathogenic *E. coli* (ExPEC), are more likely to cause urinary tract infection or other extraintestinal infections such as neonatal meningitis, whereas other strains, including enterotoxigenic *E. coli* (ETEC), enteropathogenic *E. coli* (EPEC), enterohemorrhagic *E. coli* (EHEC), Shiga toxin-producing *E. coli* (STEC), enteroaggregative *E. coli* (EAEC), enteroinvasive *E. coli* (EIEC) and diffuse adhering *E. coli* (DAEC) are more likely to cause gastrointestinal infection/diarrhea. Even among the sub-category of ExPEC strains, specific virulence factors (e.g., production of type-1 fimbriae) enable certain strains to be more capable of causing infection of the bladder, while other virulence factors (e.g., production of P fimbriae) enable other strains to be more capable of causing infection in the kidneys. In accordance with the present invention, an ExPEC strain(s) that is more likely to cause infection in the bladder may be chosen for a formulation to target immune dysregulation in the bladder cancer, whereas an ExPEC strain(s) that is more likely to cause infection in the kidney may be chosen for a formulation to target immune dysregulation in the kidney cancer. Likewise, one or more of an ETEC, EPEC, EHEC, STEC, EAEC, EIEC or DAEC strains of *E. coli* (i.e., strains that cause colon infection), may be chosen for a formulation to treat immune dysregulation in the colon.

Similarly, there may be numerous subtypes of specific viruses. For example, there are three types of influenza viruses, influenza A, influenza B and influenza C, which differ in epidemiology, host range and clinical characteristics. For example, influenza A is more likely to be associated with viral lung infection, whereas influenza B is more likely to be associated with myositis (i.e., muscle infection). Furthermore, each of these three types of influenza virus have numerous subtypes, which also may differ in epidemiology, host range and clinical characteristics. In accordance with the present invention, one may choose an influenza A subtype most commonly associated with lung infection to target immune dysregulation in the lung, whereas one may choose an influenza B strain most commonly associated with myositis to treat immune dysregulation in the muscle/soft tissues.

There are specific microbiota associated with some pathological tissue states, for example microbiota of specific tumours. For example, *Fusobacterium* and *Providencia* have been associated with colorectal cancer.

The compositions of the invention include immunogens of pathogenic microbial species (bacterial, viral or fungal) that are pathogenic in a specific tissue or organ, in which the immunogens are provided in the form of an artificial repertoire of mammalian PRR agonists that recapitulate a distinct portion of the PRR agonist signature of the microbial mammalian pathogen that is pathogenic in the target tissue. In select embodiments, the portion of the PRR agonist signature is distinct in the sense that it is both: different from a reference PRR agonist signature of a microbe that is not pathogenic in the target tissue; and, different than the native PRR agonist signature of the microbial mammalian pathogen. This distinct artificial repertoire of mammalian PRR agonists are formulated together in a therapeutic vehicle for combined presentation to an innate immune cell resident in the target tissue in the mammalian host.

Compositions of the invention may be provided alone or in combination with other compounds (for example, nucleic acid molecules, small molecules, peptides, or peptide analogues), in the presence of a liposome, an adjuvant, or any pharmaceutically acceptable carrier, in a form suitable for administration to mammals, for example, humans (a "therapeutic vehicle"). As used herein "pharmaceutically acceptable carrier" or "excipient" includes any and all solvents, dispersion media, coatings, antibacterial and antifungal agents, isotonic and absorption delaying agents, and the like that are physiologically compatible. The carrier can be suitable for any appropriate form of administration, including subcutaneous, intradermal, intravenous, parenteral, intraperitoneal, intramuscular, sublingual, inhalational, intratumoural or oral administration. Pharmaceutically acceptable carriers include sterile aqueous solutions or dispersions and sterile powders for the extemporaneous preparation of sterile injectable solutions or dispersion. The use of such media and agents for pharmaceutically active substances is well known in the art. Except insofar as any conventional media or agent is incompatible with the active compound (i.e., the specific bacteria, bacterial antigens, or compositions thereof of the invention), use thereof in the pharmaceutical compositions of the invention is contemplated. Supplementary active compounds can also be incorporated into the compositions.

Aspects of the invention involve the use of nanoparticle (NP) formulations. For example, virus-like particles (VLPs) are in essence empty viral particles with an intact protein hull and, in some embodiments, membrane envelopes. In general, VLPs lack genetic material. Production of VLPs may for example be by expression of viral proteins in mammalian, avian, insect, plant, yeast, or bacterial cells. Alternatively, fully synthetic VLPs may be produced. Alternative nanoparticle formulations emulsions, liposomes alginates, chitosan, and polylactide-coglycolide (PLGA) NPs. Examples of NP/TLR ligand preparations that may be adapted for use to induce immune responses are ligands for TLR2 (Pam(3)Cys), TLR9 (Poly I:C), TLR4 (3-O-desacyl-4 0-monophosphoryl lipid A (MPL)), TLR7 (9-benzyl-8-hydroxyadenine), TLR7/8 (resiquimod, R848), and TLR9 (CpG DNA).

In addition to selected co-formulations, a wide variety of adjuvants may be used to potentiate a desired immune response (see Levast et al., 2014, *Vaccines,* 2, 297-322).

Treatment with PRR ligands according to the invention may be combined with more traditional and existing therapies. For cancer, for example, these may include chemotherapy, radiation therapy, surgery, etc., or with a therapy that stimulates the immune system, reduces inflammation or otherwise benefits the subject, such as nutrients, vitamins and supplements. For example, vitamin A, vitamin D, vitamin E, vitamin C, vitamin B complex, selenium, zinc, co-enzyme Q10, beta carotene, fish oil, curcumin, green tea, bromelain, resveratrol, ground flaxseed, garlic, lycopene, milk thistle, melatonin, other antioxidants, cimetidine, indomethacin, or COX-2 Inhibitors (e.g., Celebrex™ [celecoxib] or Vioxx™ [rofecoxib]) may be also be administered to the subject.

Conventional pharmaceutical practice may be employed to provide suitable formulations or compositions to administer the compounds to subjects. Alternative routes of administration may be employed, for example, parenteral, intravenous, intradermal, subcutaneous, intramuscular, intracranial, intraorbital, ophthalmic, intraventricular, intracapsular, intraspinal, intrathecal, intracisternal, intraperitoneal, intranasal, inhalational, aerosol, topical, intratumoural, sublingual or oral administration. Therapeutic formulations may be in the form of liquid solutions or suspensions; for oral administration, formulations may be in the form of tablets or capsules; for intranasal formulations, in the form of powders, nasal drops, or aerosols; and for sublingual formulations, in the form of drops, aerosols or tablets.

Methods well known in the art for making formulations are found in, for example, "Remington's Pharmaceutical Sciences" (20th edition), ed. A. Gennaro, 2000, Mack Publishing Company, Easton, PA. Formulations for parenteral administration may, for example, contain excipients, sterile water, or saline, polyalkylene glycols such as polyethylene glycol, oils of vegetable origin, or hydrogenated napthalenes. Biocompatible, biodegradable lactide polymer, lactide/glycolide copolymer, or polyoxyethylene-polyoxypropylene copolymers may be used to control the release of the compounds. Other potentially useful parenteral delivery systems for include ethylene-vinyl acetate copolymer particles, osmotic pumps, implantable infusion systems, and liposomes. Formulations for inhalation may contain excipients, for example, lactose, or may be aqueous solutions containing, for example, polyoxyethylene-9-lauryl ether, glycocholate and deoxycholate, or may be oily solutions for administration in the form of nasal drops, or as a gel. For therapeutic or prophylactic compositions, the pathogenic bacterial species are administered to an individual in an amount effective to stop or slow progression or metastasis of the cancer, or to increase survival of the subject (relative to, for example, prognoses derived from the SEER database) depending on the disorder.

Pharmaceutical compositions or formulations may be packaged in a variety of ways depending upon the method used for administering the drug. For example, an article of manufacture or package may include a container having deposited therein the pharmaceutical formulation in an appropriate form. Suitable containers may for example include materials such as bottles (plastic and glass), sachets, ampoules, plastic bags, metal cylinders, and vials. The container may have a sterile access port, for example the container may be an intravenous solution bag or a vial having a stopper pierceable by a hypodermic injection needle. The package or container may also include a tamperproof or multi-use mechanism adapted to control access to the contents of the package or the container, for example a multi dose vial adapter matched to a vial contained in the package. The container or package may include a label, for example a label that describes the contents of the container, for example a drug label identifying the pharmaceutical composition therein and/or specifying modes or routes of administration. The label may also include appropriate warnings, for example specifying storage conditions for the container or package, or setting out contraindications or adverse effects of a mode of treatment. Articles of manufacture may accordingly take the form of a "kit" comprising pharmaceutical compositions or accessories adapted to facilitate use of pharmaceutical compositions. Kits may include a label or package insert, where the term "package insert" is used to refer to instructions customarily included in commercial packages of therapeutic products, that contain information about the indications, usage, dosage, administration, contraindications and/or warnings concerning the use of such therapeutic products. Kits may further include accessories associated with use of the pharmaceutical composition, including buffers, diluents, filters, needles, and syringes. Kits may also be adapted for the delivery of selected dosage forms of a pharmaceutical composition, for example including a number of unit dosages. Such kits can include a memory aid or mechanism, in the form of a physical or written indication of the intended timing of a treatment schedule in which the dosages are to be used.

A "companion diagnostic" may be associated with a pharmaceutical treatment or composition. Companion diagnostics are assays that facilitate the associated treatment, by providing diagnostic or prognostic information, typically in the form of a diagnostic test to determine the applicability of a treatment to a specific patient. Point-of-care companion diagnostics may for example involve providing diagnostic compositions and/or articles of manufacture in conjunction with providing a pharmaceutical formulation, for example as part of a kit. Alternatively, companion diagnostics may be separately provided, as assays to monitor the therapy of subjects or to predict the therapeutic efficacy of an intended treatment. A companion diagnostic may for example take the form of a medical device, such as an imaging tool, or a process carried out by such a device, for example for conducting assays in vitro, which provides information that is relevant for the safe and effective use of a corresponding drug or biological product. Companion diagnostics may be used with therapies disclosed herein so as to provide diagnostic or prognostic information about therapeutic efficacy or evidence of undesirable side effects or risks. The use of a companion diagnostic with a particular therapeutic may be stipulated in instructions, for example on the labeling of a diagnostic device and/or the labeling of the corresponding therapeutic product. Types of companion diagnostic tests may for example include: screening and detection, in form of tests that screen for genetic patterns, such as genetic SSI response markers; prognosis and theranostics, such as assays for biochemical SSI response markers that help to predict the future course of a disease, or indicate a patient's response to a therapy; monitoring, for example to evaluate the effectiveness and appropriate dosing of a prescribed therapy; or, recurrence, involving tests that analyze the patient's risk for a recurrence of the disease.

An "effective amount" of a composition according to the invention includes a therapeutically effective amount or a prophylactically effective amount. A "therapeutically effective amount" refers to an amount effective, at dosages and for periods of time necessary, to achieve the desired therapeutic result, such as reduction or elimination of the immune dysregulation. A therapeutically effective amount of a composition may vary according to factors such as the disease state, age, sex, and weight of the individual, and the ability of the compound to elicit a desired response in the individual. Dosage regimens may be adjusted to provide the optimum therapeutic response. A therapeutically effective amount may also be one in which any toxic or detrimental effects of the composition are outweighed by the therapeutically beneficial effects. A "prophylactically effective amount" refers to an amount effective, at dosages and for periods of time necessary, to achieve the desired prophylactic result, such as amelioration of immune dysregulation. Typically, a prophylactic dose is used in subjects prior to or at an earlier stage of cancer, so that a prophylactically effective amount may be less than a therapeutically effective amount.

For any particular subject, the timing and dose of treatments may be adjusted over time (e.g., timing may be daily, every other day, weekly, monthly) according to the individual need and the professional judgment of the person administering or supervising the administration of the compositions. For example, in the context of subcutaneous or intradermal administration, the compositions may be administered every second day. An initial dose of approximately 0.05 ml may be administered subcutaneously, followed by increases from 0.01-0.02 ml every second day until an adequate skin reaction is achieved at the injection site (for example, a 1 inch to 2 inch diameter delayed reaction of visible redness at the injection site). Once this adequate immune reaction is achieved, this dosing is continued as a maintenance dose. The maintenance dose may be adjusted from time to time to achieve the desired visible skin reaction (inflammation) at the injection site. Dosing may be for a dosage duration, for example of at least 1 week, 2 weeks, 2 months, 6 months, 1, 2, 3, 4, or 5 years or longer.

Oral dosages may for example range from 4 times per day, daily or weekly. Dosing may be for a dosage duration, for example of at least 1 week, 2 weeks, 2 months, 6 months, 1, 2, 3, 4, or 5 years or longer. In some embodiments, the invention may include compositions administered sublingually or by inhalation, or administered to one or more epithelial tissues (i.e., skin by intradermal or subcutaneous injection; lung epithelium by inhalation; gastrointestinal mucosa by oral ingestion; mouth mucosa by sublingual administration) simultaneously or sequentially. Accordingly, in some embodiments the compositions of the invention are administered so as to provoke an immune response in an epithelial tissue. In some embodiments, one or more epithelial routes of administration may be combined with one or more additional routes of administration, such as intratumoural, intramuscular or intravenous administration.

In the case of immunogenic formulations, an immunogenically effective amount of a composition of the invention can be provided, alone or in combination with other compounds, for example with an immunological adjuvant. The composition may for example include compounds linked with a carrier molecule, such as bovine serum albumin or keyhole limpet hemocyanin to enhance immunogenicity. An immunogenic composition is a composition that includes materials that elicit a desired immune response. An immunogenic composition may select, activate or expand, without limitation: memory B, T cells, neutrophils, monocytes or macrophages of the immune system.

An antigenic composition comprising killed recombinant bacteria for administration by injection may be made as follows. The bacteria may be grown in suitable media, and washed with physiological salt solution. The bacteria may then be centrifuged, resuspended in saline solution, and killed with heat. The suspensions may be standardized by direct microscopic count, mixed in required amounts, and stored in appropriate containers, which may be tested for safety, shelf life, and sterility in an approved manner. In addition to the pathogenic bacterial species and/or antigens thereof, a killed bacterial vaccine suitable for administration to humans may include 0.4% phenol preservative and/or 0.9% sodium chloride. The bacterial vaccine may also include trace amounts of brain heart infusion (beef), peptones, yeast extract, agar, sheep blood, dextrose, sodium phosphate and/or other media components.

In select embodiments, medicaments may be administered at an administration site in successive doses given at a dosage interval of between one hour and one month, over a dosage duration of at least one week. Optionally, the medicament may be administered intradermally or subcutaneously. Optionally, the medicament may be administered in a dose so that each dose is effective to cause a visible localized inflammatory immune response at the administration site. Optionally, the medicament may be administered so that visible localized inflammation at the administration site occurs within 1 to 48 hours. However, a visible localized inflammatory immune response may not always be present in all circumstances despite an immune response being initiated. There are other methods by which the mounting of an immune response can be monitored. For example, the profile (and relative change in characterization) of immune cells from a subject undergoing an immune reaction can be compared with those from a subject that is not undergoing an immune reaction.

In another aspect, a method of monitoring efficacy of a treatment regime in an individual being treated for an immune dysfunction in a specific organ or tissue is provided. The method involves measuring a characteristic of an immune response in a post-treatment immune sample obtained from the specific organ or tissue after the individual has been subject to the treatment regime for a period of time.

In some embodiments, PRR agonists derived from bacteria that are members of the endogenous flora of a particular region of the GIT may be used to formulate immunogenic compositions of the invention. The rows of Table 3 list a number of bacterial species, together with the biological regions in which each species may form a part of the endogenous flora. For example, *Abiotrophia* spp. are typically members of the endogenous flora of the mouth.

TABLE 3

Human Bacterial Normal Flora (Endogenous Bacterial Human Pathogens)

| Bacterial species | Mouth | Stomach | Duodenum/Jejunum | Ileum | Colon |
|---|---|---|---|---|---|
| CFU/mL | $10^5$ | $10^2$ | $10^5$ | $10^8$ | $10^{11}$ |
| Abiotrophia spp | + | | | | |
| Acholeplasma laidlawii | + | | | | |
| Acidaminococcus fermentans | + | | + | + | + |
| Acinetobacter spp. | + | | + | + | + |
| Actinobacillus spp. | + | | | | |
| Actinobaculum spp. | + | | + | + | + |
| Actinomyces spp. | + | | + | + | + |

TABLE 3-continued

Human Bacterial Normal Flora (Endogenous Bacterial Human Pathogens)

| Bacterial species | Mouth | Stomach | Duodenum/Jejunum | Ileum | Colon |
|---|---|---|---|---|---|
| Aeromonas spp. | | | + | + | + |
| Anaerorhabdus furcosus | | | | + | + |
| Anaerococcus hydrogenalis | | | | + | + |
| Anaerococcus lactolyticus | | | | + | + |
| Anaerococcus prevotii | | | | + | + |
| Atopobium spp. | + | | + | + | + |
| Bacillus spp. | | | | + | + |
| Bacteroides caccae | | | | + | + |
| Bacteroides distasonis | | | | + | + |
| Bacteroides eggerthii | | | | + | + |
| Bacteroides fragilis | | | | + | + |
| Bacteroides merdae | | | | + | + |
| Bacteroides ovatus | | | | + | + |
| Bacteroides splanchnicus | | | | + | + |
| Bacteroides thetaiotaomicron | | | | + | + |
| Bacteroides vulgatus | | | | + | + |
| Bifidobacterium adolescentis | | | + | + | + |
| Bifidobacterium bifidum | | | + | + | + |
| Bifidobacterium breve | | | + | + | + |
| Bifidobacterium catenulatum | | | + | + | + |
| Bifidobacterium dentium | + | | + | + | + |
| Bifidobacterium longum | | | + | + | + |
| Bilophila wadsworthia | + | | + | + | + |
| Burkholderia cepacia | | | + | + | + |
| Butyrivibrio fibrisolvens | | | + | + | + |
| Campylobacter concisus | | | + | + | + |
| Campylobacter curvus | | | + | + | + |
| Campylobacter gracilis | | | + | + | + |
| Campylobacter jejuni | | | + | + | + |
| Campylobacter rectus | | | + | + | + |
| Campylobacter showae | + | | + | + | + |
| Campylobacter sputorum | + | | | | |
| Capnocytophaga granulosum | + | | | | |
| Capnocytophaga gingivalis | + | | | | |
| Campylobacter haemolytica | + | | | | |
| Capnocytophaga ochracea | + | | + | + | + |
| Capnocytophaga sputigena | + | | | | |
| Cardiobacterium hominis | + | | | | |

TABLE 3-continued

Human Bacterial Normal Flora (Endogenous Bacterial Human Pathogens)

| Bacterial species | Mouth | Stomach | Duodenum/Jejunum | Ileum | Colon |
|---|---|---|---|---|---|
| *Cedecea* spp | | | | | + |
| *Centipeda periodontii* | + | | | | |
| *Citrobacter freundii* | | | + | + | + |
| *Citrobacter koseri* | | | + | + | + |
| *Clostridium* spp. | | | + | + | + |
| *Corynebacterium accolens* | + | | | | |
| *Corynebacterium afermentans* | + | | | | |
| *Desulfomonas pigra* | | | + | + | + |
| *Dysgonomonas* spp. | | | + | + | + |
| *Eikenella corrodens* | + | | + | + | + |
| *Enterobacter aerogenes* | | | + | + | + |
| *Enterobacter cloacae* | | | + | + | + |
| *Enterobacter gergoviae* | | | + | + | + |
| *Enterobacter sakazakii* | | | + | + | + |
| *Enterobacter taylorae* | | | + | + | + |
| *Enterococcus* spp. | | | + | + | + |
| *Escherichia coli* | | | + | + | + |
| *Escherichia fergusonii* | | | + | + | + |
| *Escherichia hermannii* | | | + | + | + |
| *Escherichia vulneris* | | | + | + | + |
| *Eubacterium* spp. | + | | + | + | + |
| *Ewingella americana* | + | | | | |
| *Finegoldia magnus* | | | + | + | + |
| *Fusobacterium alocis* | + | | | | |
| *Fusobacterium gonidiaformans* | | | + | + | + |
| *Fusobacterium mortiferum* | | | + | + | + |
| *Fusobacterium naviforme* | | | + | + | + |
| *Fusobacterium necrophorum* | + | | + | + | + |
| *Fusobacterium nucleatum* | + | | | | + |
| *Fusobacterium sulci* | + | | | | |
| *Fusobacterium russii* | | | + | + | + |
| *Fusobacterium varium* | | | + | + | + |
| *Gardnerella vaginalis* | | | + | + | + |
| *Gemella haemolysans* | + | | | | |
| *Gemella morbillorum* | + | | + | + | + |
| *Globicatella* spp. | + | | | | + |
| *Granulicatella* spp. | + | | | | |
| *Haemophilus* spp. | + | | | | |
| *Hafnia alvei* | | | + | + | + |
| *Helcococcus kunzii* | | | | | |
| *Helicobacter* spp. | | | + | + | + |
| *Kingella* spp. | + | | | | |
| *Klebsiella* spp. | + | | + | + | + |
| *Lactobacillus acidophilus* | + | + | + | + | + |
| *Lactobacillus breve* | + | | | | |
| *Lactobacillus casei* | + | | | | |
| *Lactobacillus fermentum* | + | + | + | + | + |
| *Lactobacillus reuteri* | | + | + | + | + |
| *Lactobacillus salivarius* | + | + | + | + | + |
| *Leclercia adecarboxylata* | | | + | + | + |
| *Leminorella* spp. | | | + | + | + |
| *Leptotrichia buccalis* | + | | | | |
| *Megasphaera elsdenii* | | | + | + | + |
| *Micrococcus luteus* | + | | | | |
| *Micrococcus lylae* | + | | | | |
| *Micromonas micros* | + | | | | |
| *Mitsuokella multiacidus* | | | + | + | + |
| *Mobiluncus curisii* | | | + | + | + |
| *Mobiluncus mulieris* | | | + | + | + |
| *Moellerella wisconsensis* | | | + | + | + |
| *Moraxella catarrhalis* | + | | | | |
| other *Moraxella* spp. | + | | | | |
| *Morganella morganii* | | | + | + | + |
| *Mycoplasma buccale* | + | | | | |
| *Mycoplasma fermentans* | + | | | | |
| *Mycoplasma hominis* | + | | | | |
| *Mycoplasma lipophilum* | + | | | | |
| *Mycoplasma orale* | + | | | | |
| *Mycoplasma pneumoniae* | + | | | | |
| *Mycoplasma salivarium* | + | | | | |
| *Pantoea agglomerans* | | | + | + | + |
| *Pasteurella multocida* | + | | | | |
| *Pediococcus* spp. | + | | | | + |
| *Peptoniphilus asaccharolyticus* | | | + | + | + |
| *Peptostreptococcus anaerobus* | + | | + | + | + |
| *Peptostreptococcus productus* | | | + | + | + |
| *Porphyromonas asaccharolytica* | + | | + | + | + |

TABLE 3-continued

Human Bacterial Normal Flora (Endogenous Bacterial Human Pathogens)

| Bacterial species | Mouth | Stomach | Duodenum/Jejunum | Ileum | Colon |
|---|---|---|---|---|---|
| *Porphyromonas catoniae* | + | | + | | |
| *Porphyromonas endodontalis* | + | | + | | |
| *Porphyromonas gingivalis* | + | | + | | |
| *Prevotella buccae* | + | | + | | |
| *Prevotella buccalis* | + | | + | | |
| *Prevotella corporis* | + | | + | | |
| *Prevotella dentalis* | + | | + | | |
| *Prevotella denticola* | + | | + | | |
| *Prevotella enoeca* | + | | + | | |
| *Prevotella heparlnolytlca* | + | | + | | |
| *Prevotella intermedia* | + | | + | | |
| *Prevotella loescheii* | + | | + | | |
| *Prevotella melaninogenica* | + | | + | | |
| *Prevotella nigrescens* | + | | + | | |
| *Prevotella oralis* | + | | + | | |
| *Prevotella oris* | + | | + | | |
| *Prevotella oulorum* | + | | + | | |
| *Prevotella tannerae* | + | | + | | |
| *Prevotella veroralis* | + | | + | | |
| *Prevotella zoogleoformans* | + | | + | | |
| *Propionibacterium propionicum* | + | | | | |
| *Proteus mirabilis* | | | | + | + |
| *Proteus penneri* | | | | + | + |
| *Proteus vulgaris* | | | | + | + |
| *Providencia rettgeri* | | | | + | + |
| *Providencia stuartii* | | | + | + | + |
| *Pseudomonas aeruginosa* | | | + | + | + |
| *Retortamonas intestinalis* | | | + | + | + |
| *Rothia dentocariosa* | + | | | | |
| *Rothia mucilaginosa* | + | | | | |
| *Ruminococcus productus* | | | + | + | + |
| *Selenomonas* spp. | + | | | | |
| *Serratia liquefaciens* | | | | + | + |
| *Serratia marcescens* | | | | + | + |
| *Serratia odorifera* | | | | + | + |
| *Staphylococcus aureus* | + | | | | |
| *Staphylococcus epidermidis* | + | | | | |
| *Streptococcus agalactiae* | | | + | + | + |
| *Streptococcus anginosus* | + | | + | + | + |
| *Streptococcus bovis* | | | + | + | + |
| *Streptococcus constellatus* | + | | + | + | + |
| *Streptococcus criceti* | + | | | | |
| *Streptococcus crista* | + | | | | |
| *Streptococcus equisimilis* | + | | | | |
| *Streptococcus gordonii* | + | | | | |
| *Streptococcus intermedius* | + | | | + | + |
| *Streptococcus mitis* | + | + | | | |
| *Streptococcus mutans* | + | | | | |
| *Streptococcus oralis* | + | | | | |
| *Streptococcus parasanguis* | + | | | | |
| *Streptococcus pyogenes* | + | + | | | |
| *Streptococcus salivarius* | + | + | | | |
| *Streptococcus sanguis* | + | + | | | |
| *Streptococcus sobrinus* | + | | | | |
| *Streptococcus vestibularis* | + | | | | |
| Group C + G Streptococci | + | | | | + |
| *Succinivibrio dextrinosolvens* | | | + | + | + |
| *Sutterella* spp. | + | | | + | + |
| *Suttonella indologenes* | + | | | | |
| *Tissierella praeacuta* | | | + | + | + |
| *Treponema denticola* | + | | | | |
| *Treponema maltophilum* | + | | | | |
| *Treponema socranskii* | + | | | | |
| *Treponema vincentii* | + | | | | |
| *Ureaplasma urealyticum* | + | | | | |
| *Veillonella* spp. | + | | + | + | + |

Endogenous microbial flora, such as bacteria, have access to tissues for pathogenesis either through contiguous spread or bacteremic spread. Under favorable conditions, endogenous organisms can become pathogenic and invade locally and spread by contiguous spread to adjacent tissues and organs. Endogenous bacterial flora of the skin, mouth and colon are species that are understood to also be amenable to bacteremic spread. Bacteria that are members of a particular endogenous flora domain may therefore cause infection in tissues or organs to which these bacteria may spread. Accordingly, one aspect of the invention involves the use of PRR agonists derived from endogenous microbial pathogens to treat an immune dysregulation having symptoms localized to a region of the GIT in which the endogenous bacteria may spread to cause infection. The columns of Table 2 list domains for endogenous flora. The rows of Table 4 list regions of the GIT within which immune dysregulation may be symptomatic or etiologically located. Accordingly, one aspect of the invention involves the use of PRR agonists derived from endogenous microbial pathogens to formulate immunogenic compositions for treating an immune dysregulation symptomatic or etiologically located in the region of the GIT to which the pathogen may spread to cause an infection. Accordingly, in alternative embodiments, an immune dysregulation that is symptomatic in the region listed in the first column of Table 2 may be treated with immunogenic compositions comprising an artificial repertoire of mammalian PRR agonists that recapitulates a distinct portion of a PRR agonist signature of a microbial mammalian pathogen that is a member of the endogenous flora of one or more of the endogenous flora domains listed in the first row of Table 2 and indicated with an X or a check mark in the appropriate row.

TABLE 4

Tissue/Organ Pathogenicity of Endogenous Flora

| Tissue/organ site | Mouth | Stomach | Duodenum/ Jejunum | Ileum | Colon |
|---|---|---|---|---|---|
| Oral | X | | | | |
| Tonsil | X | | | | |
| Nasopharynx/Sinus | X | | | | |
| Esophagus | | X | | | |
| Stomach | | X | | | |
| Small bowel | | | X | X | |
| Colon/Rectum | | | | | X |
| Anus | | | | | X |

In accordance with the combined information in Tables 1 and 2, an immune dysregulation manifest in a particular region of the GIT set out in column 1 of Table 2 may be treated with antigenic compositions comprising an artificial repertoire of mammalian PRR agonists that recapitulates a distinct portion of a PRR agonist signature of a microbial mammalian pathogen that is one of the corresponding bacterial species of Table 1, so that the column headings in Table 2 are in effect replaced with the bacterial species of Table 1.

In some embodiments, PRR agonists may be derived from exogenous bacterial pathogens. For example, PRR agonists derived from the organisms listed in Table 5 may be used in an artificial repertoire of PRR agonists to treat an immune dysregulation that is symptomatic in the region of the GIT listed with the relevant organism in Table 5. In some embodiments, PRR agonists derived from both endogenous and exogenous microbial species may be used in combination.

TABLE 5

Exogenous Bacterial Human Pathogens, and their Sites of Infection in the GIT.

| Bacterial Species | Region of the GIT |
|---|---|
| *Aerobacter* spp. | small bowel, colon, |
| *Bacillus anthracis* | oral, small bowel, colon, hematological |
| *Bacillus cereus* | colon, |
| other *Bacillus* spp. | colon, stomach, small bowel |
| *Brucella* spp. | small bowel, colon |
| *Campylobacter coli* | small bowel, colon |
| *Campylobacter jejuni* | colon |
| *Campylobacter sputorum* | small bowel, colon |
| *Clostridium bifermentans* | small bowel, colon, stomach |

TABLE 5-continued

Exogenous Bacterial Human Pathogens, and their Sites of Infection in the GIT.

| Bacterial Species | Region of the GIT |
|---|---|
| *Clostridium botulinum* | colon, small bowel |
| *Clostridium difficile* | colon |
| *Clostridium indolis* | small bowel, colon, stomach, |
| *Clostridium mangenolii* | small bowel, colon, stomach |
| *Clostridium perfringens* | small bowel, colon, stomach |
| *Clostridium sordellii* | small bowel, colon, stomach |
| *Clostridium sporogenes* | small bowel, colon, stomach |
| *Clostridium subterminale* | small bowel, colon, stomach |
| *Edwarsiella tarda* | small bowel, colon |
| *Francisella tularensis* | small bowel |
| *Helicobacter pylori* | stomach |
| *Leptospirosis* spp. | oral |
| *Listeria monocytogenes* | small bowel, colon |
| *Mycobacterium bovis* | colon, small bowel |
| *Mycobacterium tuberculosis* | small bowel, colon |
| *Pediococcus* spp. | colon |
| *Plesiomonas shigelloides* | small bowel, colon |
| *Rickettsia rickettsiae* | small bowel |
| *Salmonella* spp. | stomach, small bowel, colon |
| *Shigella boydii* | colon |
| *Shigella dysenteriae* | colon |
| *Shigella flexneri* | colon |
| *Shigella sonnei* | colon |
| other *Spirillum* spp. | colon |
| *Streptococcus zooepidemicus* | small bowel |
| *Treponema pallidum* | oral, anus |
| *Tropheryma whipplei* | small bowel, colon |
| *Vibrio cholerae* | colon, small bowel |
| *Vibrio fluvialis* | small bowel, colon |
| *Vibrio furnissii* | small bowel, colon |
| *Vibrio hollisae* | small bowel, colon |
| *Vibrio parahaemolyticus* | colon, small bowel |
| *Yersinia enterocolitica* | small bowel, colon |
| *Yersinia pseudotuberculosis* | small bowel, colon |

In some embodiments, PRR agonists for use in the invention may be derived from viral pathogens. Table provides an exemplary list of viral pathogens together with the tissue and organ sites for which each viral species is reportedly a pathogen. Accordingly, one aspect of the invention involves utilizing immunogenic compositions of PRR agonists derived from the named viruses to treat an immune dysregulation that is symptomatic in the region of the GIT that is identified adjacent to the name of the virus in Table 6.

TABLE 6

Viral Human Pathogens and Their Sites of Infection

| Virus | Region of the GIT |
|---|---|
| Herpes Simplex virus (1 and 2) | rectum, anus |

TABLE 6-continued

Viral Human Pathogens and Their Sites of Infection

| Virus | Region of the GIT |
| --- | --- |
| Cytomegalovirus | small bowel, colon/rectum |
| Epstein-Barr virus | oral |
| Adenovirus | oral, small bowel, colon |
| Human papillomavirus | anus, oral |
| Orthoreoviruses | small bowel, colon, oral |
| Coltiviruses | oral |
| Rotaviruses | small bowel, colon |
| Alphaviruses | small bowel, colon, |
| Coronaviruses | oral, small bowel, colon |
| Toroviruses | small bowel, colon |
| Parainfluenza viruses | oral |
| Respiratory syncytial virus | oral |
| Human metapneumovirus | oral, small bowel, colon |
| Vesicular stomatitis virus | oral, small bowel, colon |

TABLE 6-continued

Viral Human Pathogens and Their Sites of Infection

| Virus | Region of the GIT |
| --- | --- |
| Rabies virus | oral |
| Influenza virus | oral |
| Hantaviruses | oral |
| Machupo virus | small bowel, colon |
| Junin virus | small bowel, colon |
| Poliovirus | small bowel, colon |
| Coxsackieviruses | small bowel, colon |
| Echoviruses | oral, small bowel, colon |
| Hepatitis A virus | small bowel, colon |
| Rhinoviruses | oral |
| Noroviruses and other Caliciviruses | small bowel, colon |
| Astroviruses | small bowel, colon |

TABLE 6-continued

Viral Human Pathogens and Their Sites of Infection

| Virus | Region of the GIT |
| --- | --- |
| Picobirnaviruses | small bowel, colon |
| Hepatitis E virus | small bowel, colon |

In some embodiments, the pathogen from which PRR agonists are derived for use in immunogenic compositions of the invention may be one that is a common cause of acute infection in the region of the GIT in which the immune dysregulation to be treated is symptomatic. Table 7 identifies bacterial and viral pathogens of this kind, together with the region of the GIT in which they commonly cause infection. Accordingly, in selected embodiments, an immune dysregulation that is symptomatic in a region of the GIT identified in the first column of Table 7 may be treated with an immunogenic composition that comprises an artificial repertoire of mammalian PRR agonists that recapitulates a distinct portion of the PRR agonist signature of a pathogenic organism listed in the second column of Table 7.

TABLE 7

Common causes of acute infection (bacteria and viruses) for selected regions of the GIT

| Selected regions of the GIT | Common Bacterial or Viral Pathogens |
| --- | --- |
| Oral | *Prevotella melaninogenicus*, anaerobic *streptococci*, viridans *streptococci*, *Actinomyces* spp., *Peptostreptococcus* spp., *Bacteroides* spp., and other oral anaerobes<br>herpes simplex, coxsackieviruses, Epstein-Barr |
| Stomach | *Streptococcus pyogenes*, *Helicobacter pylori*<br>cytomegalovirus, herpes simplex, Epstein-Barr, rotaviruses, noroviruses, adenoviruses |
| Small bowel | *Escherichia coli*, *Clostridium difficile*, *Bacteroides fragilis*, *Bacteroides vulgatus*, *Bacteroides thetaiotaomicron*, *Clostridium perfringens*, *Salmonella enteriditis*, *Yersinia enterocolitica*, *Shigella flexneri*<br>adenoviruses, astroviruses, caliciviruses, noroviruses, rotaviruses, cytomegalovirus |
| Colon/Rectum | *Escherichia coli*, *Clostridium difficile*, *Bacteroides fragilis*, *Bacteroides vulgatus*, *Bacteroides thetaiotaomicron*, *Clostridium perfringens*, *Salmonella enteriditis*, *Yersinia enterocolitica*, *Shigella flexneri*<br>adenoviruses, astroviruses, caliciviruses, noroviruses, rotaviruses, cytomegalovirus |
| Anus | *Streptococcus pyogenes*, *Bacteroides* spp., *Fusobacterium* spp., anaerobic *streptococci*, *Clostridium* spp., *E. coli*, *Enterobacter* spp., *Pseudomonas aeruginosa*, *Treponema pallidum*<br>herpes simplex |

Humans are hosts to a wide range of gastrointestinal parasites, including various protozoa and helminths, which for purposes of the present invention constitute pathogens of the GIT (Schafer, T. W., Skopic, A. Parasites of the small intestine. Curr Gastroenterol Reports 2006; 8:312-20; Jernigan, J., Guerrant, R. L., Pearson, R. D. Parasitic infections of the small intestine. Gut 1994; 35:289-93; Sleisenger & Fordtran's Gastrointestinal and liver disease. 8th ed. 2006; Garcia, L. S. Diagnostic medical parasitology. 5th ed. 2007). Compositions of the invention may accordingly include PRR agonists of various protozoa, including for example: *Giardia lamblia*, *Cryptosporidium parvum*, *Cryptosporidium hominis*, *Isospora belli*, *Sarcocystis* species, Coccidian like bodies (*Cyclospora* species), *Enterocytozoon bieneusi*, *Entamoeba histolytica*, *Entamoeba dispar*, *Entamoeba coli*, *Entamoeba hartmanni*, *Endolimax nana*, *Iodamoeba batschlii*, *Dientamoeba fragilis*, *Blastocystis*

*hominus, Cyclospora cayetanensis*, Microsporidia, *Trypanosoma cruzi, Chilomastix mesnili, Pentatrichomonas hominis, Balantidium coli*. Similarly, compositions of the invention may include antigenic components of various helminths, including for example: Cestodes (tapeworms), *Taenia saginata, Taenia solium, Diphyllobothrium* species, *Hymenolepis nana, Hymenolepis diminuta, Dipylidium caninum*, Nematodes (round worms), *Ascaris lumbricoides, Strongyloides stercoralis, Necator americanus, Ancylostoma duodenale, Ancylostoma caninum, Tichuris trichiura, Capillaria philippinensis, Trichostrongylus* species, *Trichinella* species, *Necator americanus, Anisakis* and related species, *Angiostrongylus costaricensis, Enterobius vermicularis*, Trematodes (flukes), *Fasciolopsis buski, Heterophyes speicies, Echinostoma* species, *Clonorchis sinensis, Opisthorchis* species, *Fasciola* species, *Metagonimus yokogawi, Schistosoma mansoni, Schistosoma japonicum, Schistosoma mekongi, Schistosoma intercalatum, Echinostoma* species and *Paragonimus* species.

In accordance with the foregoing, in various aspects, the invention may involve the treatment of an immune dysregulation with formulations of an artificial repertoire of mammalian PRR agonists that recapitulates a distinct portion of a PRR agonist signature of a microbial pathogen that is an: *Acidaminococcus fermentans; Acinetobacter* spp.; *Actinobaculum* spp.; *Actinomyces* spp.; *Aeromonas* spp.; *Anaerorhabdus furcosus; Anaerococcus hydrogenalis; Anaerococcus lactolyticus; Anaerococcus prevotii; Atopobium* spp.; *Bacillus* spp.; *Bacteroides caccae; Bacteroides distasonis; Bacteroides eggerthii; Bacteroides fragilis; Bacteroides merdae; Bacteroides ovatus; Bacteroides splanchnicus; Bacteroides thetaiotaomicron; Bacteroides vulgatus; Bifidobacterium adolescentis; Bifidobacterium bifidum; Bifidobacterium breve; Bifidobacterium catenulatum; Bifidobacterium dentium; Bifidobacterium longum; Bilophila wadsworthia; Burkholderia cepacia; Butyrivibrio fibrisolvens; Campylobacter concisus; Campylobacter curvus; Campylobacter gracilis; Campylobacter jejuni; Campylobacter rectus; Campylobacter showae; Capnocytophaga ochracea; Cedecea* spp; *Citrobacter freundii; Citrobacter koseri; Clostridium* spp.; *Desulfomonas pigra; Dysgonomonas* spp.; *Eikenella corrodens; Enterobacter aerogenes; Enterobacter cloacae; Enterobacter gergoviae; Enterobacter sakazakii; Enterobacter taylorae; Enterococcus* spp.; *Escherichia coli; Escherichia fergusonii; Escherichia hermannii; Escherichia vulneris; Eubacterium* spp.; *Finegoldia magnus; Fusobacterium gonidiaformans; Fusobacterium mortiferum; Fusobacterium naviforme; Fusobacterium necrophorum; Fusobacterium nucleatum; Fusobacterium russii; Fusobacterium varium; Gardnerella vaginalis; Gemella morbillorum; Globicatella* spp.; *Hafnia alvei; Helicobacter* spp.; *Klebsiella* spp.; *Lactobacillus acidophilus; Lactobacillus fermentum; Lactobacillus reuteri; Lactobacillus salivarius; Leclercia adecarboxylata; Leminorella* spp.; *Megasphaera elsdenii; Mitsuokella multiacidus; Mobiluncus curisii; Mobiluncus mulieris; Moellerella wisconsensis; Morganella morganii; Pantoea agglomerans; Pediococcus* spp.; *Peptoniphilus asaccharolyticus; Peptostreptococcus anaerobus; Peptostreptococcus productus; Porphyromonas asaccharolytica; Proteus mirabilis; Proteus penneri; Proteus vulgaris; Providencia rettgeri; Providencia stuartii; Pseudomonas aeruginosa; Retortamonas intestinalis; Ruminococcus productus; Serratia liquefaciens; Serratia marcescens; Serratia odorifera; Streptococcus agalactiae; Streptococcus anginosus; Streptococcus bovis; Streptococcus constellatus; Streptococcus intermedius*; Group C+G Streptococci; *Succinivibrio dextrinosolvens; Sutterella* spp.; *Tissierella praeacuta; Veillonella* spp.; *Aerobacter* spp.; *Bacillus anthracis; Bacillus cereus*; other *Bacillus* spp.; *Borrelia recurrentis; Brucella* spp.; *Campylobacter coli; Campylobacter fetus; Campylobacter jejuni; Campylobacter sputorum; Clostridium bifermentans; Clostridium botulinum; Clostridium difficile; Clostridium indolis; Clostridium mangenolii; Clostridium perfringens; Clostridium sordellii; Clostridium sporogenes; Clostridium subterminale; Edwarsiella tarda; Francisella tularensis; Listeria monocytogenes; Mycobacterium bovis; Mycobacterium tuberculosis; Pediococcus* spp.; *Plesiomonas shigelloides; Rickettsia rickettsiae; Salmonella* spp.; *Shigella boydii; Shigella dysenteriae; Shigella flexneri; Shigella sonnei*; other *Spirillum* spp.; *Streptococcus zooepidemicus; Tropheryma whipplei; Vibrio cholerae; Vibrio fluvialis; Vibrio furnissii; Vibrio hollisae; Vibrio parahaemolyticus; Yersinia enterocolitica; Yersinia pseudotuberculosis*; Herpes Simplex virus (1 and 2); Cytomegalovirus; Adenovirus; Orthoreoviruses; Rotaviruses; Alphaviruses; Coronaviruses; Toroviruses; Human metapneumovirus; Vesicular stomatitis virus; Machupo virus; Junin virus; Poliovirus; Coxsackieviruses; Echoviruses; Hepatitis A virus; Noroviruses and other Caliciviruses; Astroviruses; Picobirnaviruses; or Hepatitis E virus.

In alternative aspects, the invention may involve the treatment of an immune dysregulation with formulations of an artificial repertoire of mammalian PRR agonists that recapitulates a distinct portion of a PRR agonist signature of a microbial mammalian pathogen that is a common small and larger bowel pathogens, for example: *Escherichia coli, Clostridium difficile, Bacteroides fragilis, Bacteroides vulgatus, Bacteroides thetaiotaomicron, Clostridium perfringens, Salmonella enteriditis, Yersinia enterocolitica, Shigella flexneri*; adenoviruses, astroviruses, caliciviruses, noroviruses, rotaviruses, and cytomegalovirus.

In selected embodiments, the invention involves diagnostic steps to assess a patient's previous exposure to an organism. For example, the diagnostic steps may include taking a medical history of exposure to selected pathogens, and/or evaluating a patient's immune response to a selected pathogen. For example, a serology test may be conducted to detect antibodies to selected pathogens in a patient's sera. In connection with this aspect of the invention, antigenic determinants of a selected pathogen may be chosen for use in an immunogenic composition on a selected patient based on a diagnostic indication that the patient has had one or more prior exposure(s) to the pathogen, for example by virtue of the presence of antibodies to antigenic determinants of that pathogen in the patient's sera.

In further selected embodiments, the invention involves diagnostic steps to assess a patient's immunological response to treatment with a selected immunogenic composition. For example, the diagnostic steps may include evaluating a patient's immune response to the immunological determinants of that immunogenic composition, for example using a serological test to detect antibodies to those immunogenic determinants. In connection with this aspect of the invention, a treatment with a selected immunogenic composition may be continued if the evaluation indicates that there is an active immunological response to the immunogenic determinants of that composition, and the treatment may be discontinued, and an alternative treatment with a different immunogenic composition may be initiated, if the evaluation indicates that there is not a sufficiently active immunological response to the immunogenic determinants of the immunogenic composition.

In some embodiments, pre-exposure of an organism to a microbial pathogen may be used to potentiate subsequent SSI efficacy. For example, pre-exposure to *K. pneumoniae* may, in some embodiments, induce tissue-specific immunologic memory, for example an innate immunological memory, that facilitates tumour cytolysis, particularly in combination with a cytotoxic adoptive immune cell therapy.

SSI and adoptive cell treatments may for example be combined with additional components that potentiate a cancer antigen response. A cancer antigen may for example be admixed with an SSI. The adoptive immune cell therapy may in turn be targeted to the antigen admixed with the SSI.

Microbial components may be formulated as SSIs, containing PRR ligands derived from microbial fractions such as: bacterial outer membrane (for example from Gram negative spp.); bacterial inner membrane; the pellet of a gradient centrifugation (for example from a sucrose gradient); chromosomal DNA; a capsular glycoprotein fraction; or, a peptidoglycan fraction, such as peptidoglycan ghosts. In alternative embodiments, engineered or recombinant organisms may be used in SSIs, in which genes involved in pathways relevant to particular cellular fractions have been modified, in particular genes involved in determining the composition of the foregoing fractions.

For cell fraction preparations, bacteria may for example be grown and heat-inactivated. Cell fractions may for example be resuspended in sterile saline+0.4% phenol. Inner membranes may for example be collected using the 2-step sucrose density gradient, as for example described in Methods in Enzymology, Vol 125:309-328, 1986. The bacterial pellet obtained after cultivation of 250 mls of cells may be resuspended in 20% sucrose, 10 mM Tris-HCl pH 8.0 and 50 ug/ml DNase 1. Cells may be incubated at 23° C. for 10 min. Cells may then be placed on ice and lysed two times through a French pressure cell at 15,000 psi; unbroken cells may be removed by centrifugation at 5,000×g for 10 min at 4° C. Supernatants may be layered onto a 2-step sucrose gradient (60% and 70%) and centrifuged in a SW28 swinging bucket rotor at 23,000 rpm for 18 hours at a temperature of 4° C. The inner membranes may be collected at the junction between the 20% and 60% sucrose. Sucrose may be diluted to below 20% with sterile distilled water and the membranes may be pelleted in an ultracentrifuge at 41,000 rpm at 4° C. for 1 hour. The inner membranes may be washed once with sterile water, and then resuspended in sterile saline+0.4% phenol. Crude outer membrane preparations may also be collected from the junction between the 60% and 70% sucrose gradient steps.

Chromosomal DNA, for example for *Klebsiella pneumoniae*, may be prepared using a Qiagen Blood and Tissue midi kit. Cells from 15 or 40 mls of broth culture from each strain may be harvested. The manufacture's protocol for purification of total DNA may then be followed.

An SSI may be co-formulated with or co-administered with additional therapeutic components. One class of additional therapeutic components comprises molecules or compositions for activating or recruiting innate immune cells, and these include:

GMCSF, for example in an amount that synergistically recruits and promotes the production of neutrophils and potentiates the SSI-induced innate immune response.

Vitamin D, for example in an amount that is effective to differentiate and activate monocytes and play a role in regulating innate immune function. In alternative embodiments, the vitamin D used in conjunction with SSIs may for example be one or more of vitamin $D_3$, $D_2$ or calcitriol (1,25-dihydroxycholecalciferol). In some embodiments, vitamin $D_3$ and/or $D_2$ may for example be given locally at a dosage that is effective to provide a locally effective amount of calcitriol at the site of SSI and vitamin D administration. For example, vitamin D precursors ($D_3$ and/or $D_2$) may be administered in an amount that is locally effective once it is converted into the calcitriol active form by local monocytes and/or macrophages (expressing CYP27B1) at the site of administration. In alternative embodiments, calcitriol may be administered in dose that is locally effective at the site of SSI administration, and this may for example be dose that is less than the dose required for other systemic effects.

An additional class of therapeutic components for co-formulation or co-administration comprise molecules or compositions that relieve immunosuppression:

NOHA (N(omega)-hydroxy-nor-L-arginine), an Arginase inhibitor—Arginase degrades arginine needed for immune activation. NOHA may for example be used in an amount effective to relieve immune suppression by making available free arginine.

Alpha1 antitrypsin—for example in an amount effective to relieve immune suppression mediated by neutrophils secreting proteases.

An additional class of therapeutic components for co-formulation or co-administration comprise molecules or compositions that prevent oxidative damage and improve immune function under stress:

Glutathione and other antioxidants.

An additional class of therapeutic components for co-formulation or co-administration comprise co-stimulatory molecules for innate cytotoxic lymphocytes (for example for anticancer treatments):

Phospho-antigens (isoprenoid molecules, such as isopentenyl pyrophosphate)—recognized by human peripheral blood $V\gamma9V\delta2$ T cells which play a central role in anticancer responses, for example in amounts effective for activating and differentiating monocytes working in concert with NK cells to target both solid and liquid cancers. In exemplary embodiments, it has been found that SSIs in co-formulation or co-administration with zoledronate increase markers of activation, for example CD25 and CD69, on human peripheral blood $V\gamma9V\delta2$ T cells.

Glycolipid molecules recognized by Type I NKT cells (such as synthetic $\alpha$-galactosylceramide).

SSIs may for example be administered for systemic distribution. A KPN SSI administered subcutaneously in a murine model, using cyanine dye (Cy5.5) labeled whole killed KPN cells and optical in-vivo dorsal and ventral whole-body imaging, revealed systemic distribution with highest concentrations seen at the new sites of injection and, surprisingly, at previous sites of injection. This provides an illustration of preferential SSI delivery/retention at sites of inflammation following systemic dispersal of locally administered formulations. The distribution of SSI in organs after 24 hours showed a preferential accumulation of KPN SSI in the lungs, compared to the heart and the spleen.

In select embodiments, SSIs can be administered directly to cancerous tissues, for example at the site of surgical resection of a cancer. For example, an SSI may be applied topically to melanoma in the skin or to the site of a surgical excision of a skin melanoma.

Clinical data has shown the efficacy of SSIs acting to down-regulate PD1 and PDL1 expression in neoplastic disease. Accordingly, PD1 and PDL1 may be sued as markers of SSI efficacy. In addition, SSIs may be formulated and administered in a dosage regime that is effective in target organ or tissue to mediate increased expression of one or more granzyme or perforin, such as of granzyme A, granzyme B, and perforin.

A variety of PRR receptors may be used as the targets for alternative SSIs.

TABLE 8

List of PRRs stimulated by select SSIs, including QBKPN, QBECO and QBSAU (*Staphylococus aureus* SSI). Where a PRR is "Optional", this indicates that some embodiments may be designed to include agonists for the specified PRR.

| Pattern Recognition Receptor | Major Agonists | QBECO | QBKPN | QBSAU |
|---|---|---|---|---|
| TLRs (Toll-Like Receptors) | | | | |
| TLR1 | Triacyl lipoprotein/peptidoglycan | Yes | Yes | Yes |
| TLR2 | Glycolipds, Lipoprotein, lipopeptides, lipoteichoic acid, others | Yes | Yes | Yes |
| TLR3 | dsRNA (viral) | No | No | No |
| TLR4 | Lipopolysaccharide (LPS), heat shock proteins, others | Yes | Yes | No |
| TLR5 | Flagellin, Profilin | Yes | No | No |
| TLR6 | Diacyl lipoprotein | Yes | Yes | Yes |
| TLR7 | ssRNA | No | No | No |
| TLR9 | CpG-DNA | Yes | Yes | Yes |
| TLR10 | Unclear | Optional | Optional | Optional |
| CLR (C-Type Lectin Receptors) (PMID 21616435) | | | | |
| Mannose Receptor (MR) | Mannose, N-acetylglucosamine and fucose on glycans | Optional | Optional | Optional |
| DEC-205 | Promiscuous antigen receptor-Class B CpG-DNA (Lahoud et al. 2012. PNAS) | Optional | Optional | Optional |
| Macrophage galactose-type lectin (MGL) | α- or β-N-acetylgalactosamine (GalNAc, Tn) residues of N- and O-glycans carried by glycoproteins and/or glycosphingolipids (PMID 15802303) | Optional | Optional | Optional |
| DC-SIGN (CD-209) | High-mannose-containing glycoproteins | Optional | Optional | Optional |
| Langerin (CD207) | Similar to CD-209 | Optional | Optional | Optional |
| Mannose Binding Lectin (MBL) | Mannose and N-acetylucosamine | Optional | Optional | Optional |
| Myeloid DAP12-associating lectin (MDL-1/CLEC5A) | Unclear, dengue viral particles (PMC3204838) | Optional | Optional | Optional |
| Dectin1/CLEC7A | B glucans on fungi, *mycobacteria* | Optional | Optional | Optional |
| DNGR1/CLEC9A | Actin filaments (no microbial ligands identified) | Optional | Optional | Optional |
| SIGNR3 | *Mycobacterium tuberculosis* | Optional | Optional | Optional |
| CLEC4B1 | Not Determined | Optional | Optional | Optional |
| CLEC4B2 | Not Determined | Optional | Optional | Optional |
| CLEC2 | Endogenous (prodoplanin), snake venom, HIV | Optional | Optional | Optional |
| CLEC12B | Not Determined | Optional | Optional | Optional |
| CLEC12A | Not Determined | Optional | Optional | Optional |
| DCIR/CLEC4A | HIV-1 | Optional | Optional | Optional |
| Dectin 2/CLEC6A | Mannose-type carbohydrates | Optional | Optional | Optional |
| CLEC4C | Unclear | Optional | Optional | Optional |
| CLEC4E (Mincle) | Fungal a-mannose and others | Optional | Optional | Optional |
| NLR (Nod-Like Receptors) | | | | |
| NOD1 | diaminopimelatic acid (DAP)-containing muropeptide | Optional | Optional | Optional |
| NOD2 | muramyl dipeptide (MDP) moieties universal to all bacterial peptidoglycan | Yes | Yes | Optional |
| NLRC3 (NOD3) | Cytosolic DNA, cyclic di-GMP, DNA viruses (PMID 24560620) This is an inhibitory PRR. | Optional | Optional | Optional |
| NLRC4 (NOD4) | Flagellin, components of the type three secretion system, others | Optional | Optional | Optional |
| NLRC6 | Unclear | Optional | Optional | Optional |
| NLRX1 (NOD5) | Unclear | Optional | Optional | Optional |
| NALP1-14 | Pathway unclear (Anthrax and muramyldipeptide for NALP1) | Optional | Optional | Optional |

TABLE 8-continued

List of PRRs stimulated by select SSIs, including QBKPN, QBECO and QBSAU (*Staphylococus aureus* SSI). Where a PRR is "Optional", this indicates that some embodiments may be designed to include agonists for the specified PRR.

| Pattern Recognition Receptor | Major Agonists | QBECO | QBKPN | QBSAU |
|---|---|---|---|---|
| NAIP | Unclear | Optional | Optional | Optional |
| CIITA (NLRA) | Unclear (does not directly bind DNA) | Optional | Optional | Optional |
| RLR (Rig-1 Like Receptors) | | | | |
| RIG-1 | dsRNA (viral), maybe bacterial | Optional | Optional | Optional |
| MDA5 | dsRNA (viral) | Optional | Optional | Optional |
| LGP2 | dsRNA (viral) | Optional | Optional | Optional |
| Others | | | | |
| DAI (DNA-dependent activator of IRFs) (PMID 20098460) | DNA | Optional | Optional | Optional |
| AIM2 (PMID 20098460) | dsDNA | Optional | Optional | Optional |
| Caspase 11 (PMID 25145754) | LPS | Optional | Optional | Optional |
| LBP (Lipopolysaccharide Binding Protein) | LPS | Optional | Optional | Optional |
| CD14 | LPS | Optional | Optional | Optional |
| Scavenger Receptors | LPS | Optional | Optional | Optional |
| Beta2 Integrins | LPS | Optional | Optional | Optional |
| Peptidoglycan receptor proteins (4 different receptors) | Peptidoglycan | Minor | Minor | Major |

TABLE 9

PRR agonists in select fractionated SSIs, particularly in the DNA fractions.
DNA Fractions

| Component | QBECO | QBKPN |
|---|---|---|
| DNA | TLR9 | TLR9 |
| | AIM2 | AIM2 |
| | DAI | DAI |
| | RIG-1 | RIG-1 |
| | DEC205 | DEC205 |
| | NLRC3 | NLRC3 |

TABLE 10

PRR agonists in select fractionated SSIs, particularly in the outer membrane fractions.
Outer Membrane Fractions

| Component | QBECO | QBKPN |
|---|---|---|
| LPS | TLR4 | TLR4 |
| | LBP | LBP |
| | CD14 | CD14 |
| | Caspase 11 | Caspase 11 |
| | Other Scavenger Receptors | Other Scavenger Receptors |
| Lipoprotein | TLR1 | TLR1 |
| | TLR2 | TLR2 |
| | TLR6 | TLR6 |
| Flagellin | TLR5 | N/A |
| | NOD4 | NOD4 |
| Peptidoglycan | NOD2 | NOD2 |
| Capsule | N/A | TLRs and CLRs |
| Other | Collection of CLRs | |

Accordingly, in select embodiments, SSI therapies are provided that target a select subset of PRRs, using microbial PRR agonists derived from microbial pathogens of a target tissue. For example, an immunogenic composition is provided that comprises microbial agonists for at least a select number of distinct PRRs, for use so as to illicit an innate response in a target tissue, wherein the PRR agonists are microbial components from a single species of microbe that is selectively pathogenic in the target tissue. The number of distinct PRRs targeted by the agonists may for example be a number from 5 to 25, or at least a number within that range of integers, for example at least 5, 6, 7, 8, 9, 10, 11, 12, 13, 14, 15, 16, 17, 18, 19, 20, 21, 22, 23, 24, 25 etc. The distinct PRRs may for example be selected from the PRRs set out in Tables 8, 9 and/or 10.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification, and all documents cited in such documents and publications, are hereby incorporated herein by reference as if each individual publication were specifically and individually indicated to be incorporated by reference herein and as though fully set forth herein. The invention includes all embodiments and variations substantially as described herein and with reference to the examples and drawings. In some embodiments, the invention excludes steps that involve medical or surgical treatment.

General Codes and Abbreviations

| | |
|---|---|
| Mean; MEAN | Average |
| SD; S.D.; STAND DEV; STANDARD DEV; sd; STD. DEV | Standard deviation |
| SE; S.E. | Standard error |
| —; NA | No value; not applicable; not present |
| #; N; No. | Number |
| Obs. | Observations |
| IPD | Immediate postdose |
| PD | Postdose |
| a.m. | Ante meridian |
| p.m. | Post meridian |
| M | Male |
| F | Female |
| ID | Identification |
| S.C. | Subcutaneous |
| I.V. or IV or i.v. or iv | Intra-venous |
| I.P. or IP or i.p. or ip | Intraperitoneal |
| K. pneumoniae, KPN | *Klebsiella pneumoniae* |
| QBKPN, KP SSI | *Klebsiella* spp. SSI, a formulation comprising PRR ligands of whole killed *Klebsiella* spp cells in aqueous suspension of a pathogenic *Klebsiella* clinical isolate variously identified as *K. pneumonia* or *K. variicola* (*Klebsiella* phylogroup III) |
| QBECO, EC SSI | *E. coli* SSI, a formulation comprising PRR ligands of whole killed *E. coli* cells in aqueous suspension of an enteropathogenic *E. coli* clinical isolate. |
| QBSAU, SA SSI | *Staphylococcus aureus* SSI, a formulation comprising PRR ligands of whole killed *S. aureus* cells in aqueous suspension of a pathogenic *S. aureus* clinical isolate. |
| SSI | Site specific Immunomodulator, a PRR ligand formulation |
| UT | Un-treated |
| Ns | Not significant |
| B6 | C57BL/6 mice |
| G, g | Gram |
| KG, kg | Kilogram |
| MG, mg | Milligram |
| ML, mL | Milliliter |
| UL, μL | Microliter |
| HR, hr | Hours |
| min | Minute |

EXAMPLES

Example 1: SSI Enhances the Anti-Tumor Efficacy of Adoptively-Transferred Tumor Antigen-Specific (TCR-Tg) T Cells This Example illustrates that a site-specific immunotherapy with a microbial PRR ligand formulation (QBKPN SSI) enhances the anti-tumor efficacy of adoptively-transferred, tumor antigen-specific CD8$^+$ T cells (Pmel).

To obtain the data shown in FIG. 1, B6 mice were treated with SSI or vehicle (30 ml SC), every other day, from day −10 until day +18. On day 0, mice were challenged with of 3×10$^5$ B16-F10 (B16) melanoma cells by IV injection. On day +2 and +6, some mice received IP infusion with 1 mg of anti-CXCR3 (clone CXCR3-173) mAb, to block CXCR3-mediated chemotaxis/extravasation. On day +3, some mice received an IV infusion of 1×10$^6$ in vitro-activated CD8$^+$ Pmel (TCR-tg) cells. These activated T cells are obtained from an immunologically well-characterized mouse strain (JAX Strain 005023—on B6 genetic background) carrying a recombinant T cell receptor specific for melanocyte/melanoma-associated antigen gp100/pmel 17 (see Overwijk, W. W. et al., 1998, J. Exp. Med. 188, 277-86). On day +18, mice were sacrificed and tumors enumerated (total surface metastases on lungs. The P values associated with the results illustrated in FIG. 1 are set out in the following Table.

| | QBKPN | QBECO | Pmel | Pmel + QBKPN | Pmel + QBECO | Pmel/anti-CXCR3 | Pmel + QBKPN/anti-CXCR3 | Pmel + QBECO/anti-CXCR3 |
|---|---|---|---|---|---|---|---|---|
| Vehicle | 0.0004 | 0.4149 | 0.0006 | <0.0001 | 0.0041 | 0.1504 | 0.0045 | 0.1259 |
| QBKPN | | 0.0068 | 0.2782 | 0.0010 | 0.7544 | 0.0054 | 0.5808 | 0.0088 |
| PBECO | | | 0.0041 | <0.0001 | 0.0225 | 0.6451 | 0.0383 | 0.5663 |
| Pmel | | | | 0.0209 | 0.5628 | 0.0043 | 0.1730 | 0.0058 |
| Pmel + QBKPN | | | | | 0.0090 | <0.0001 | 0.0010 | <0.0001 |
| Pmel + QBECO | | | | | | 0.0289 | 0.5027 | 0.0372 |
| Pmel/anti-CXCR3 | | | | | | | 0.0491 | 0.8835 |
| Pmel + QBKPN/anti-CXCR3 | | | | | | | | 0.0672 |

Example 2: SSI Enhances the Infiltration of Transferred Tumor Ag-Specific (TCR-Tg) T Cells in Tumor-Bearing Lungs This Example illustrates that a site-specific immunotherapy with a microbial PRR ligand formulation (QBKPN SSI) enhances the chemoattraction and infiltration of tumor-bearing lungs by activated tumor Ag-specific (TCR-tg) CD8$^+$ T cells.

Figure 2:
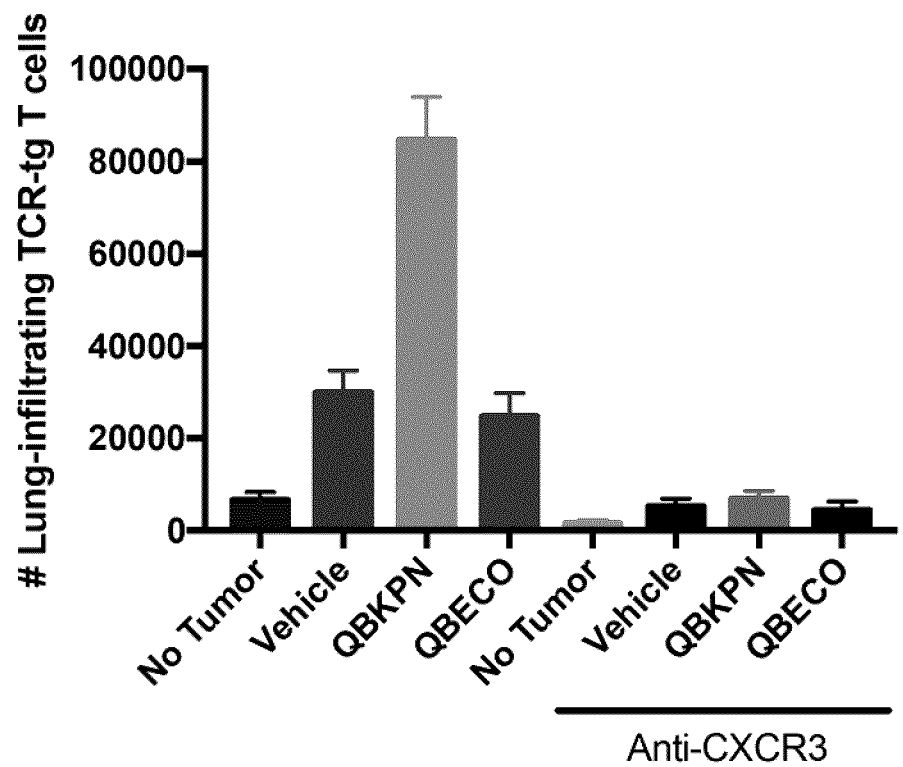
FIG. 2 is a bar graph showing the average and standard deviation of data points representing the number of lung-infiltrating TCR-tg T cells, grouped into columns according to treatment, the last four columns reflecting animals treated with anti-CXCR3. The data illustrates that a site-specific immunotherapy with a microbial PRR ligand formulation (QBKPN) enhances the chemoattraction and infiltration of tumor-bearing lungs by activated tumor Ag-specific (TCR-tg) CD8+ T cells, and this activity is inhibited by anti-CXCR3.

To obtain the data shown in FIG. 2, B6 mice were treated with SSI or vehicle (30 ml SC), every other day, from day −10 until day +4. On day 0, mice were challenged with of $3\times10^5$ B16-F10 (B16) melanoma cells by IV injection. On day +2, some mice received IP infusion with 1 mg of anti-CXCR3 (clone CXCR3-173) mAb, to block CXCR3-mediated chemotaxis/extravasation. On day +3, some mice received an IV infusion of $1\times10^6$ in vitro-activated CD8+ Pmel (TCR-tg) cells. On day +4, mice were sacrificed and viable, infiltrating TCR-tg T cells enumerated by flow cytometry (based on Thy-mismatch marker). The P values associated with the results illustrated in FIG. 2 are set out in the following Table.

nant IFN-g, SSI (QBKPN), and/or LPS. After 24 h culture, supernatants were assessed for CXCL9 or CXCL10 by specific ELISA. As shown in the figures, SSI acts directly on cancer cells to induce chemokine. More particularly, QBKPN alone did not induce chemokine, but QBKPN significantly enhanced CXCL9 production in IFN-g-primed cells (to levels approaching the biological maximum, defined as the level induced by IFN-g+LPS). Results for CXCL10 reflect a saturated assay system, in which the data are indicative that QBKPN induced CXCL10 production in a manner similar to CXCL9.

Example 5: SSI Enhances CAR T Cell Therapies

This Example illustrates that a site-specific immunotherapy with a microbial PRR ligand formulation (QBECO SSI) enhances the chemoattraction and efficacy of NKG2D-specific CAR T cells in a murine model of ovarian cancer.

Generation of NKG2D CAR T Cells

NKG2D-specific CAR T cells were generated by viral transduction of C57Bl/6 murine splenocytes, which were collected and stimulated with Sigma-sourced Con A (1

|  | Vehicle | QBKPN | QBECO | No Tumor/ Anti-CXCR3 | Vehicle/ Anti-CXCR3 | QBKPN/} Anti-CXCR3 | QBECO/ Anti-CXCR3 |
|---|---|---|---|---|---|---|---|
| No Tumor | <0.0001 | <0.0001 | <0.0001 | 0.0004 | 0.2500 | 0.7402 | 0.0962 |
| Vehicle |  | <0.0001 | 0.1309 | <0.0001 | <0.0001 | <0.0001 | <0.0001 |
| QBKPN |  |  | <0.0001 | <0.0001 | <0.0001 | <0.0001 | <0.0001 |
| QBECO |  |  |  | <0.0001 | <0.0001 | <0.0001 | <0.0001 |
| No tumor/ Anti-CXCR3 |  |  |  |  | 0.0023 | 0.0002 | 0.0155 |
| Vehicle/ Anti-CXCR3 |  |  |  |  |  | 0.1371 | 0.4813 |
| QBKPN/ Anti-CXCR3 |  |  |  |  |  |  | 0.0511 |

Example 3: SSI Enhances the Production of T Cell Chemokines in Tumor-Bearing Lungs This Example illustrates that a site-specific immunotherapy with a tissue-specific microbial PRR ligand formulation enhances chemokine production in tumor-bearing lungs during advanced stages of tumor growth (when chemokine is otherwise suppressed by tumor). This evidences a chemokine production profile that is associated with enhanced TCR-tg CD8$^+$ T cell infiltration in SSI-treated animals.

Figure 3:
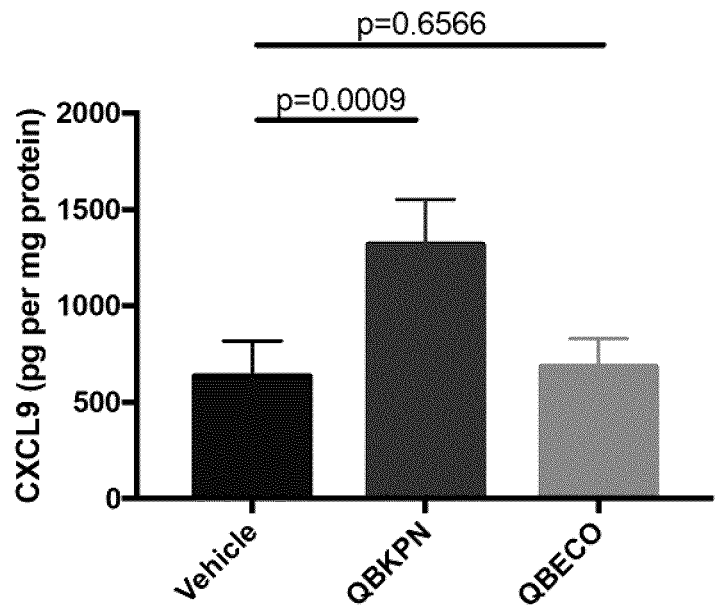
FIG. 3 is a bar graph showing the average and standard deviation of data points representing the concentration of CXCL9, grouped into columns according to treatment. The data illustrates that a lung site-specific immunotherapy with a tissue-specific microbial PRR ligand formulation (QBKPN) enhances CXCL9 chemokine production in tumor-bearing lungs during advanced stages of tumor growth (when chemokine is otherwise suppressed by tumor), compared both to control (vehicle) and a microbial PRR ligand formulation that is not specific for lungs (QBECO).
Figure 4:
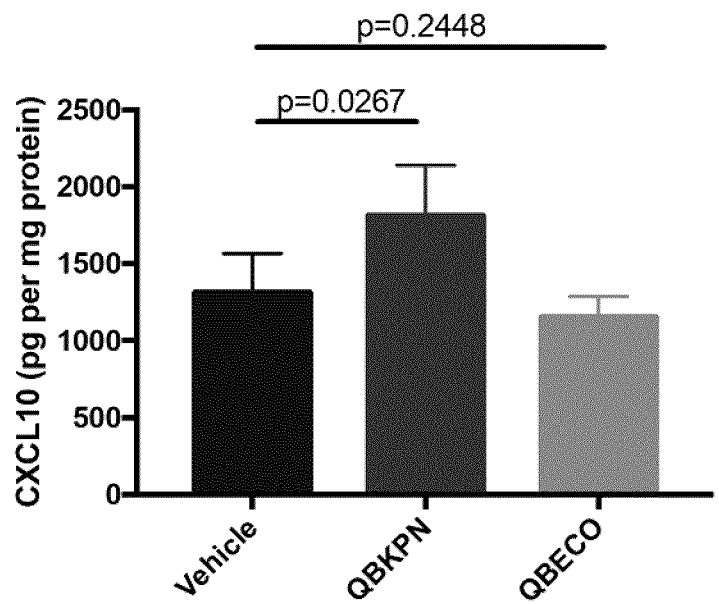
FIG. 4 is a bar graph showing the average and standard deviation of data points representing the concentration of CXCL10, grouped into columns according to treatment. The data illustrates that illustrates that a lung site-specific immunotherapy with a tissue-specific microbial PRR ligand formulation (QBKPN) enhances CXCL10 chemokine production in tumor-bearing lungs during advanced stages of tumor growth (when chemokine is otherwise suppressed by tumor), compared both to control (vehicle) and a microbial PRR ligand formulation that is not specific for lungs (QBECO).

To obtain the data illustrated in FIGS. 3 and 4, B6 mice were treated with SSI (QBKPN or QBECO) or vehicle (30 ml SC), every other day, from day −10 until day +18. On day 0, mice were challenged with of $3\times10^5$ B16-F10 (B16) melanoma cells by IV injection. On day +18, mice were sacrificed and chemokine in lung and serum (not shown) was analyzed by specific ELISA. As illustrated, QBKPN enhanced chemokine production in tumor-bearing lungs compared to vehicle and QBECO (an SSI formulated from a microbe, E. coli, that is not a lung pathogen).

Example 4: SSI Enhances the Production of T Cell Chemokines in Interferon-Induced Melanoma Cells This Example illustrates induction of chemokine production by melanoma in situ as a result of exposure to a microbial PRR ligand formulation.

Figure 5:
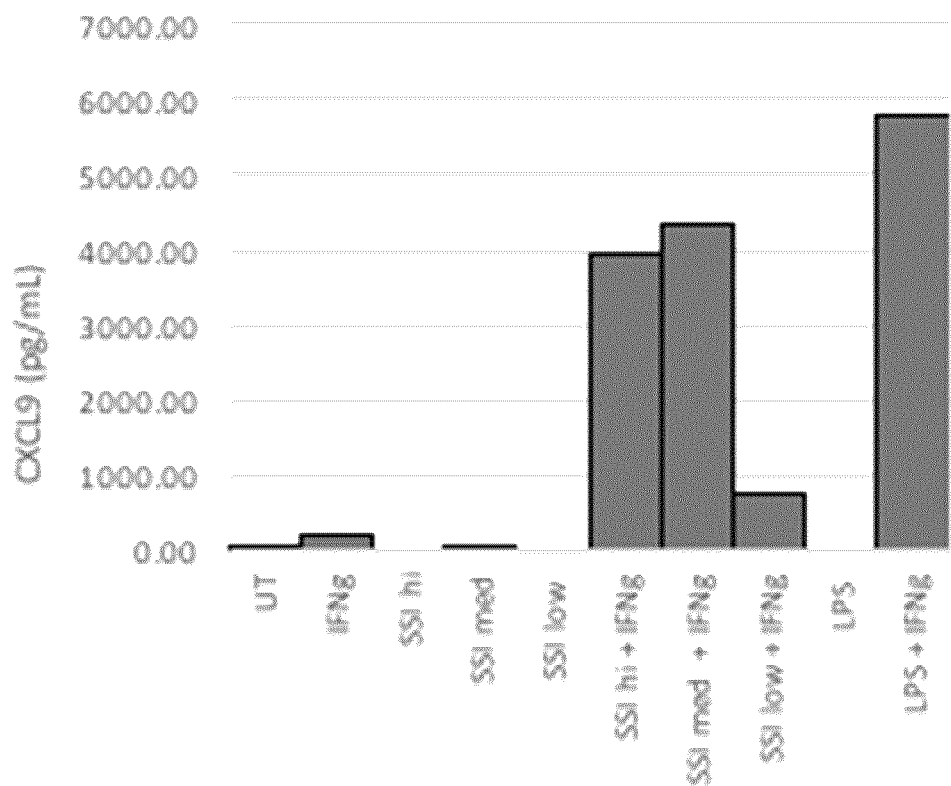
FIG. 5 is a bar graph illustrating the in vitro concentration of CXCL9 (pg/mL), grouped into columns according to treatment. The data illustrates induction of CXCL9 chemokine production by melanoma in situ as a result of exposure to a microbial PRR ligand formulation (QBKPN SSI, at low, medium and high doses).
Figure 6:
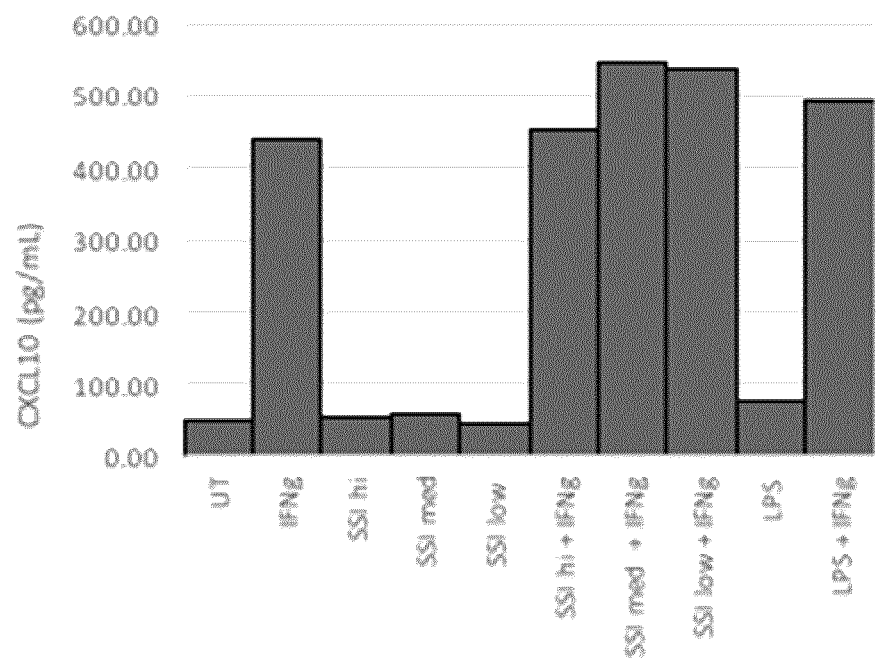
FIG. 6 is a bar graph illustrating the in vitro concentration of CXCL10 (pg/mL), grouped into columns according to treatment. The data illustrates induction of CXCL10 chemokine production by melanoma in situ as a result of exposure to a microbial PRR ligand formulation (QBKPN SSI, at low, medium and high doses).

To obtain the results illustrated in FIGS. 5 and 6, B16 melanoma cells were cultured in the presence of recombi- µg/mL), and then retrovirally transduced with chNKG2D (expressing a full-length NKG2D protein fused to the cytoplasmic portion of CD3zeta; chimeric NKG2D), as described by Spear et al, 2013, so that the CAR T cells thereby express a NKG2D receptor element. CAR T cell activity against NKG2D-expressing targets was confirmed using a cytotoxicity assay, comparting CAR T cells and untransfected cells (referred to as WT T cells) with NKG2D-positive or negative targets.

Mice

C57Bl/6 mice (8-10 weeks old, n=5/treatment group), were sourced from Jackson Laboratories (Bar Harbor, ME) and housed in micro-isolators at Geisel School of Medicine (Lebanon, NH). Mice were sourced from JAX general-use colonies that harbor E. coli.

SSI Treatment

Mice were treated with QBECO SSI by injection, every other day in rotating sites, using a 30 µl of QBECO. Initiation of SSI is termed as day 0.

Tumors

The C57Bl/6-derived ovarian cancer cell line ID84, transfected to express GFP cells (ID8-GFP; Spear et al., 2013), was used to induce metastatic-like ovarian cancer ($2\times10^6$ ID8-GFP cells administered i.p. on day +14).

CAR-T Treatment

WT (untransfected) or NKG2D-expressing CAR-T cells ($5\times10^6$ per mouse) were transferred i.p. at day +28. SSI treatments continued throughout the study.

Treatment Groups

The following groups were be assessed (n=5/group):
Group A: No T cells
Group B: No T cells+QBECO
Group C: WT T cells
Group D: WT T cells+QBECO
Group E: CAR-T cells
Group F: CAR-T cells+QBECO On day +42, peritoneal washes was performed using 1 ml cold PBS, then mice were sacrificed. CXCL9 in the peritoneal wash was determined by specific ELISA (R&D Systems) and calibrated against a recombinant protein standard curve. After necropsy, the number of visible solid tumors on the peritoneal wall was assessed.

Results

Figure 7:
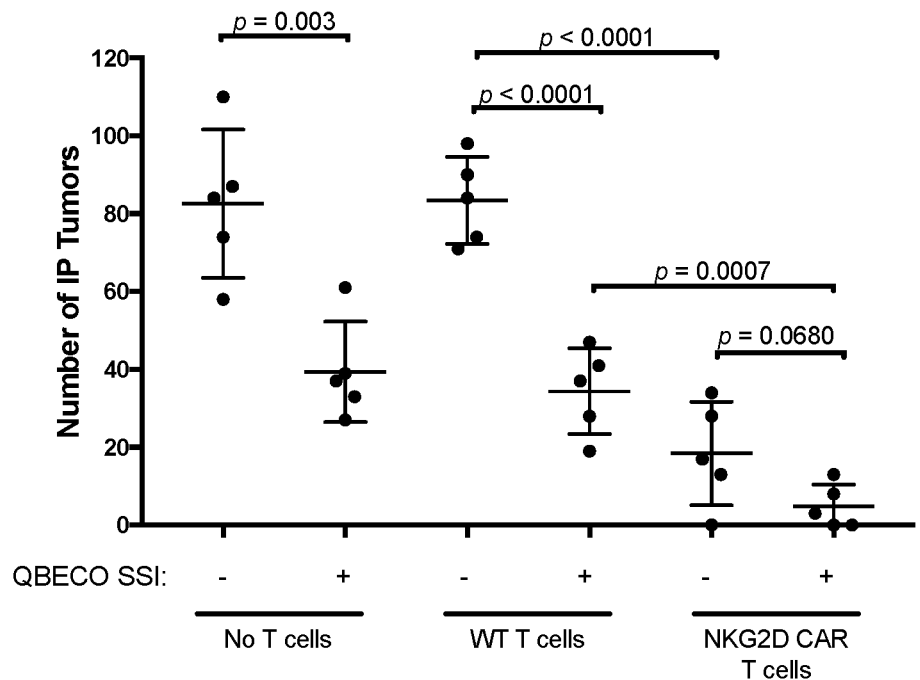
FIG. 7 is a column scatter plot showing intraperitoneal ovarian cancer efficacy in a murine model using QBECO in combination with NKG2D-CAR T cells.

The combination pf NKG2D-CAR T cells and QBECO SSI therapy is efficacious in an intraperitoneal ovarian cancer (ID8) mouse model. The combination of CAR T cells and QBECO therapy significantly enhanced anti-cancer efficacy, relative to QBECO alone, and relative to the efficacy of the CAR T cells. FIG. 7 is a column scatter plot illustrating this result, showing intraperitoneal ovarian cancer efficacy in the murine model using QBECO in combination with NKG2D-CAR T cells.

Figure 8:
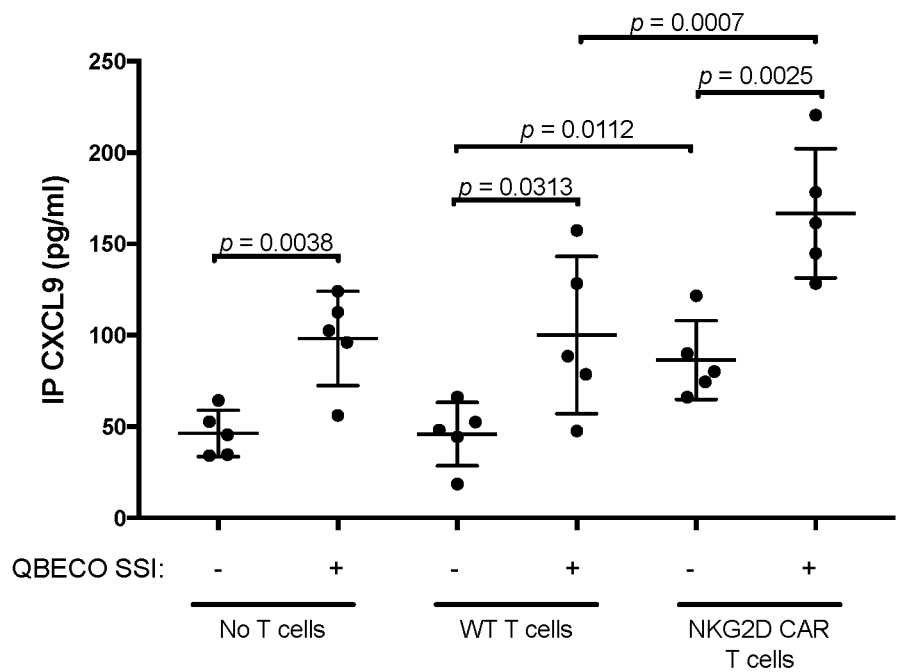
FIG. 8 is a column scatter plot showing chemokine induction of CXCL9 in the IP space in a murine model using QBECO in combination with NKG2D-CAR T cells.

Efficacy was correlated with increased chemokine (CXCL9) production in the tumour-bearing compartment. FIG. 8 is a column scatter plot illustrating this effect, showing chemokine induction of CXCL9 in the IP space in the murine model using QBECO in combination with NKG2D-CAR T cells.

Example 6: Model of Intraperitoneal Human Colon Cancer

Figure 9:
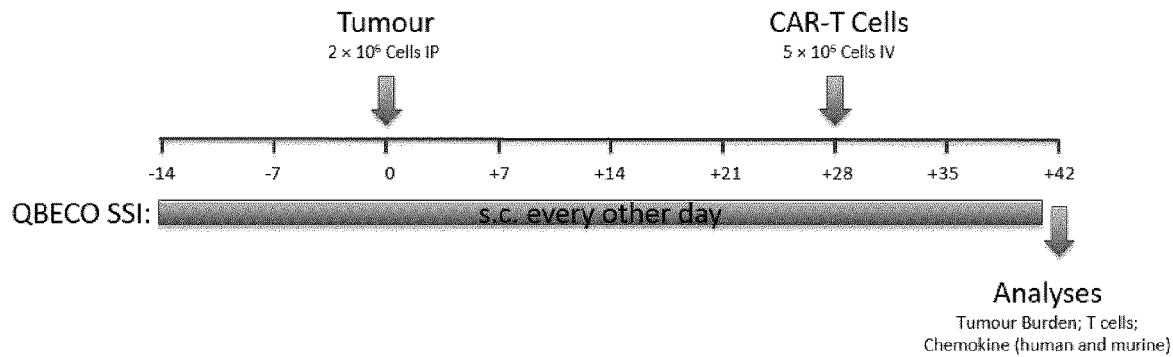
FIG. 9 is a timeline, illustrating a treatment regimen in a murine model, C57BL/6-NSG immunosuppressed mice, of human colon cancer therapy using a QBECO SSI and as CAR-Ts: human scFv-CD28-4-1BB-CD3ζ (3rd Generation) mesothelin-specific CARs.

This example is illustrative of a colon cancer treatment with a QBECO (*E. coli*) SSI. The host animals are C57BL/6-NSG immunosuppressed mice, housed in micro-isolators. The treatment involved administration of QBECO SSI s.c. every other day. Engrafted tumours were human mesothelin+ SKOVA-3 colon carcinoma (Sigma-Aldrich), in the IP compartment. The CAR-T cells are human scFv-CD28-4-1BB-CD3ζ (3rd Generation) mesothelin-specific CARs (ProMab; mock-transduced T cells as negative control). The treatment timeline is as illustrated in FIG. 9.

Figure 10:
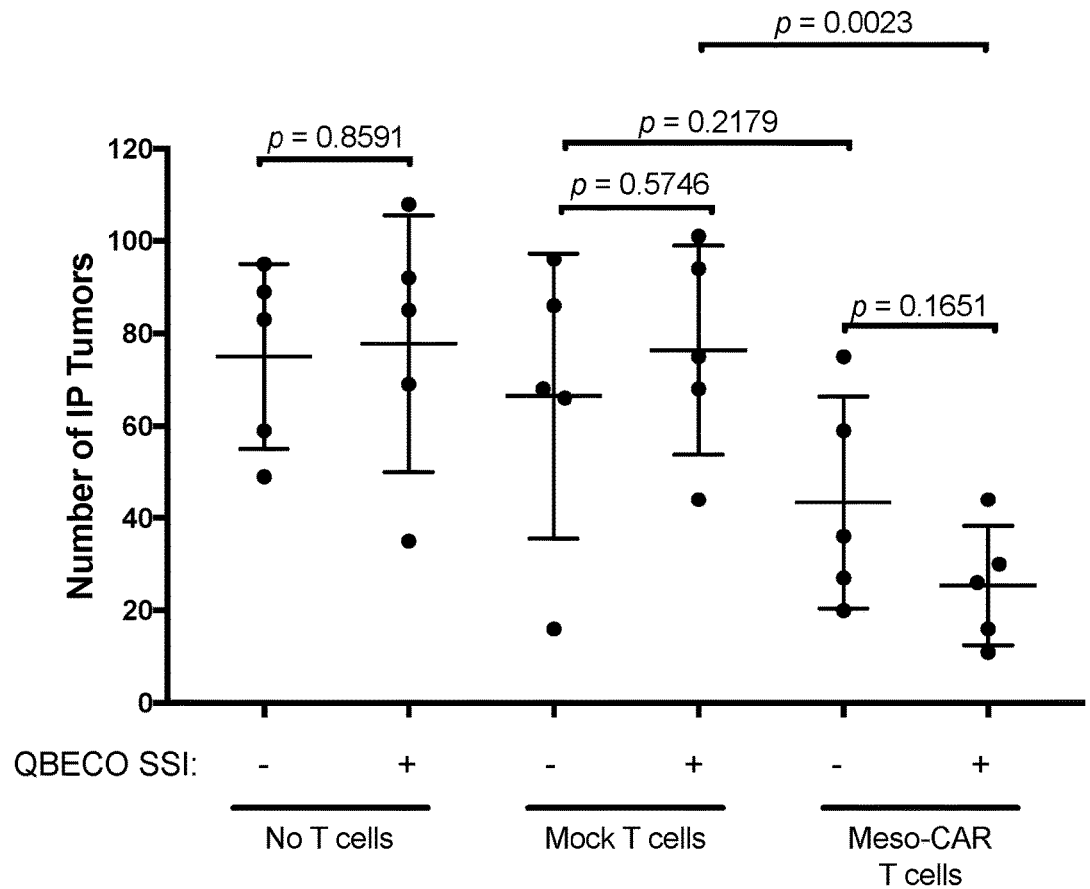
FIG. 10 is a column scatter plot showing that, in the a murine model of human colon cancer therapy, SSI+CAR T cells reduced tumour burden, relative to T cells alone, in the NSG hosts.

The results illustrate that SSI+CAR T cells reduced tumour burden, relative to T cells alone, in NSG hosts, as shown in FIG. 10. As illustrated, SSI alone did not reduce tumour burden in this model, likely because the NSG host lacks functional NK cells which are required for stand-alone SSI anti-cancer efficacy in this model. CAR-T cells modestly reduced tumour burden. In contrast, SSI in combination with CAR-T cells further reduced tumour burden, an effect that is consistent with enhanced infiltration of CAR T cell into the tumors due to combination SSI therapy. Tumour numbers following SSI+CAR T cell therapy are significantly lower than SSI+Mock CAR T cells.

Consistent with the anti-tumour efficacy, this example further illustrates that SSI induces human chemokine in the IP compartment in NSG hosts, as shown in FIGS. 11, 12, 13 and 14. Using species-specific ELISA, murine and human chemokines were assessed. As illustrated, SSI induced modest increased murine chemokine production in the IP department, regardless of adoptive transfer. This is consistent with a mechanism whereby murine chemokines are produced by mouse immune or stromal cells in the intraperitoneal site, targeted by QBECO SSI. In addition, SSI induced substantially increased human chemokine production in the IP compartment, regardless of adoptive transfer. This illustrates that human tumour cells in the IP space produce these chemokines, and is consistent with additional in vitro results that demonstrated that SSI drives human tumour cells to produce chemokines.

REFERENCES

Ahmed, N., et al. Human epidermal growth factor receptor 2 (HER2)-specific chimeric antigen receptor-modified T cells for the immunotherapy of HER2-positive sarcoma. J Clin Oncol. 2015; 33(15): 1688-1696.

Ahmed, N., et al. T cells redirected against HER2 for the adoptive immunotherapy for HER2-positive osteosarcoma. Cancer Res. 2012; 72 Abstract.

Bazett, M. et al. A novel microbe-based treatment that attenuates the inflammatory profile in a mouse model of allergic airway disease. Sci. Rep. 6, 35338 (2016).

Beatty, G. L., et al. Mesothelin-specific chimeric antigen receptor mRNA-engineered T cells induce anti-tumor activity in solid malignancies. Cancer Immunol Res. 2014; 2:112-120;

Beatty, G. L., Safety and antitumor activity of chimeric antigen receptor modified T cells in patients with chemotherapy refractory metastatic pancreatic cancer. J Clin Oncol. 2015; 33(15):3007.

Brentjens, R. J., et al. Genetically targeted T cells eradicate systemic acute lymphoblastic leukemia xenografts. Clin Cancer Res. 2007 Sep. 15; 13(18 Pt 1):5426-35.

Brentjens, R. J., et al. Safety and persistence of adoptively transferred autologous CD19-targeted T cells in patients with relapsed or chemotherapy refractory B-cell leukemias. Blood. 2011; 118:4817-4828; US20160009813.

Burga, R. A., et al. Liver myeloid-derived suppressor cells expand in response to liver metastases in mice and inhibit the anti-tumor efficacy of anti-CEA CAR-T. Cancer Immunol Immunother. 2015; 64:817-829.

Cai, et al. Co-infusion of haplo-identical CD-19 chimeric antigen receptor T cells and stem cells achieved full donor engraftment in refractory acute lymphoblastic leukemia. J Hematol Oncol. 2016; 9(1):131.

Carpenito, C., et al. Control of large, established tumor xenografts with genetically retargeted human T cells containing CD28 and CD137 domains. Proc Natl Acad Sci USA. 2009; 106:3360-3365.

Caruana, I., et al. Heparanase promotes tumor infiltration and antitumor activity of CAR-redirected T lymphocytes. Nat Med. 2015; 21:524-529.

Chinnasamy, D., et al. Gene therapy using genetically modified lymphocytes targeting VEGFR-2 inhibits the growth of vascularized syngenic tumors in mice. J Clin Invest. 2010; 120:3953-3968.

Chmielewski, M., et al. IL-12 release by engineered T cells expressing chimeric antigen receptors can effectively Muster an antigen-independent macrophage response on tumor cells that have shut down tumor antigen expression. Cancer Res, 2011; 71:5697-5706.

Craddock, J. A., et al. Enhanced tumor trafficking of GD2 chimeric antigen receptor T cells by expression of the chemokine receptor CCR2b. J Immunother. 2010; 33:780-788.

Emtage, P. C., et al. Second-generation anti-carcinoembryonic antigen designer T cells resist activation-induced cell death, proliferate on tumor contact, secrete cytokines, and exhibit superior antitumor activity in vivo: a preclinical evaluation. Clin Cancer Res. 2008; 14:8112-8122.

Fong, M. Y. & Kakar, S. S. Ovarian cancer mouse models: a summary of current models and their limitations. J. Ovarian Res. 2, 12 (2009).

Grupp, S. A., et al. Chimeric antigen receptor-modified T cells for acute lymphoid leukemia. N Engl J Med. 2013; 368:1509-1518.

Hoyos, V., et al. Engineering CD19-specific T lymphocytes with interleukin-15 and a suicide gene to enhance their anti-lymphoma/leukemia effects and safety. Leukemia. 2010; 24:1160-1170.

Johnson, L. A. et al. Rational development and characterization of humanized anti-EGFR variant III chimeric antigen receptor T cells for glioblastoma. Sci Transl Med. 2015; 7(275):275ra222.

Johnson, L. A. et al. Rational development and characterization of humanized anti-EGFR variant III chimeric antigen receptor T cells for glioblastoma. Sci Transl Med. 2015; 7(275):275ra222.

Kakarla, S., et al. Antitumor Effects of Chimeric Receptor Engineered Human T Cells Directed to Tumor Stroma. Mol Ther. 2013; 21(8):1611-20.

Katz, S. C., et al. Phase I hepatic immunotherapy for metastases study of intra-arterial chimeric antigen receptor-modified T-cell therapy for CEA+ liver metastases. Clin Cancer Res. 2015; 21(14):3149-3159.

Kerkar, S. P., et al. Tumor-specific CD8+ T cells expressing interleukin-12 eradicate established cancers in lymphodepleted hosts. Cancer Res. 2010; 70:6725-6734.

Kershaw, M. H. et al. A phase I study on adoptive immunotherapy using gene-modified T cells for ovarian cancer. Clin Cancer Res. 2006; 12:6106-6115.

Kochenderfer, J. N., et al. B-cell depletion and remissions of malignancy along with cytokine-associated toxicity in a clinical trial of anti-CD19 chimeric-antigen-receptor-transduced T cells. Blood. 2012; 119:2709-2720.

Kowolik, C. M., et al. CD28 costimulation provided through a CD19-specific chimeric antigen receptor enhances in vivo persistence and antitumor efficacy of adoptively transferred T cells. Cancer Res. 2006 Nov. 15; 66(22): 10995-1004; WO2016073629.

Lamers, C. H., et al. Treatment of metastatic renal cell carcinoma with CAIX CAR-engineered T cells: clinical evaluation and management of on-target toxicity. Mol Ther. 2013; 21(4):904-912;

Lamers, C. H., et al. Treatment of metastatic renal cell carcinoma with autologous T-lymphocytes genetically retargeted against carbonic anhydrase IX: first clinical experience. J Clin Oncol. 2006; 24(13):e20-e22.

Lanitis, E., et al. Redirected antitumor activity of primary human lymphocytes transduced with a fully human anti-mesothelin chimeric receptor. Mol Ther. 2012; 20:633-643.

Liu, J., et al. Allogeneic CD19-CAR-T cell infusion after allogeneic hematopoietic stem cell transplantation in B cell malignancies. J Hematol Oncol. 2017; 10(1):35.

Mancini et al., Adoptive T-cell therapy in the treatment of viral and opportunistic fungal infections. Future Microbiol. 2015; 10(4):665-82.

Maher J., and Wilkie, S. CAR mechanics: driving T cells into the MUC of cancer. Cancer Res. 2009 69(11):4559-4562.

Maude, S. L., et al. Chimeric antigen receptor T cells for sustained remissions in leukemia. N Engl J Med. 2014; 371(16):1504-17.

Maus, M. V., et al. T cells expressing chimeric antigen receptors can cause anaphylaxis in humans. Cancer Immunol Res. 2013; 1:26-31;

Milone, M. C., et al. Chimeric receptors containing CD137 signal transduction domains mediate enhanced survival of T cells and increased antileukemic efficacy in vivo. Mol Ther. 2009 August; 17(8):1453-64.

Moon, E. K., et al. (2011). Expression of a functional CCR2 receptor enhances tumor localization and tumor eradication by retargeted human T cells expressing a mesothelin-specific chimeric antibody receptor. Clin Cancer Res. 2011; 17:4719-4730.

Morgan et al. Case report of a serious adverse event following the administration of T cells transduced with a chimeric antigen receptor recognizing ERBB2. Mol Ther. 2010; 18:843-851.

Morgan, R. A., Case report of a serious adverse event following the administration of T cells transduced with a chimeric antigen receptor recognizing ERBB2. Mol Ther. 2010; 18(4):843-851;

Nakazawa, Y., et al. Anti-proliferative effects of T cells expressing a ligand-based chimeric antigen receptor against CD116 on CD34+ cells of juvenile myelomonocytic leukemia. J Hematol Oncol. 2016; 9(1):27.

Niederman, T. M., et al. Antitumor activity of cytotoxic T lymphocytes engineered to target vascular endothelial growth factor receptors. Proc Natl Acad Sci USA. 2002; 99:7009-7014.

Nishio, N., and Dotti, G. Oncolytic virus expressing RANTES and IL-15 enhances function of CAR-modified T cells in solid tumors. Oncoimmunology, 2015; 4: e988098.

O'Rourke, D., et al. A single dose of peripherally infused EGFRvIII-directed CAR T cells mediates antigen loss and induces adaptive resistance in patients with recurrent glioblastoma. Sci Transl Med. 2017; 19(9):399.

Park, J. R., et al. Adoptive transfer of chimeric antigen receptor re-directed cytolytic T lymphocyte clones in patents with neuroblastoma. Mol Ther. 2007; 15:825-833.

Porter, D. L., et al. Chimeric antigen receptor-modified T cells in chronic lymphoid leukemia. N Engl J Med. 2011; 365:725-733.

Pule, M. A., et al. Virus-specific T cells engineered to coexpress tumor-specific receptors: persistence and antitumor activity in individuals with neuroblastoma. Nat Med. 2008; 14(11):1264-1270.

Savoldo, B., et al. CD28 costimulation improves expansion and persistence of chimeric antigen receptor-modified T cells in lymphoma patients. J Clin Invest. 2011 May; 121(5):1822-6.

Schubert, M. L., et al. Chimeric antigen receptor T cell therapy targeting CD19-positive leukemia and lymphoma in the context of stem cell transplantation. Hum Gene Ther. 2016 October; 27(10):758-771.

Schuberth, P. C., et al. Treatment of malignant pleural mesothelioma by fibroblast activation protein-specific re-directed T cells. J Transl Med. 2013; 11:187.

Sentman, M.-L. et al. Mechanisms of Acute Toxicity in NKG2D Chimeric Antigen Receptor T Cell-Treated Mice. J. Immunol. 197, 4674-4685 (2016).

Shibaguchi, H., et al. A fully human chimeric immune receptor for retargeting T-cells to CEA-expressing tumor cells. Anticancer Res. 2006; 26:4067-4072.

Song, D. G., et al. In vivo persistence, tumor localization, and antitumor activity of CAR-engineered T cells is enhanced by costimulatory signaling through CD137 (4-1BB). Cancer Res. 2011; 71:4617-4627.

Spear, P., Barber, A. & Sentman, C. L. Collaboration of chimeric antigen receptor (CAR)-expressing T cells and host T cells for optimal elimination of established ovarian tumors. Oncoimmunology 2, e23564 (2013).

Tang et al., PAMPs and DAMPs: Signal 0s that Spur Autophagy and Immunity. Immunol Rev. 2012 September; 249(1): 158-175.

Till, B. G., et al. Adoptive immunotherapy for indolent non-Hodgkin lymphoma and mantle cell lymphoma using genetically modified autologous CD20-specific T cells. Blood. 2008; 112:2261-2271.

van Schalkwyk, M. C., et al. Design of a phase I clinical trial to evaluate intratumoral delivery of ErbB-targeted chimeric antigen receptor T-cells in locally advanced or recurrent head and neck cancer. Hum Gene Ther Clin Dev. 2013; 24:134-142.

Wang, L. C., et al. Targeting fibroblast activation protein in tumor stroma with chimeric antigen receptor T cells can inhibit tumor growth and augment host immunity without severe toxicity. Cancer Immunol Res. 2014; 2:154-166.

Wang, X., et al. Phase 1 studies of central memory-derived CD19 CAR-T cell therapy following autologous HSCT in patients with B-Cell NHL. Blood. 2016; 127(24):2980-90.

Zhang, L., et al. Improving adoptive T cell therapy by targeting and controlling IL-12 expression to the tumor environment. Mol Ther. 2011; 19:751-759.

The invention claimed is:

1. A method of enhancing an anti-tumor efficacy of an adoptive immune cell against a cancer in a mammalian subject, wherein the cancer forms a solid tumor in a target tissue, comprising:
administering to the subject an effective amount of an immunogenic composition in combination with an effective amount of the adoptive immune cell, wherein:
the adoptive immune cell is activated and has a receptor for a cancer antigen expressed by the cancer cells of the tumor,
the immunogenic composition upregulates expression of a chemotactic cytokine by the tumor or target tissue,
the adoptive immune cell comprises a cytokine receptor for the chemotactic cytokine, and
the adoptive immune cell comprises a CXCR3 receptor and the chemotactic cytokine is CXCL9 or CXCL10;
wherein the immunogenic composition comprises a whole killed bacterial cell or recombinant bacterial cell of a bacterial mammalian pathogen that is an *Escherichia coli* (*E. coli*) or *Klebsiella pneumoniae* (*K. pneumoniae*) that is pathogenic in the target tissue; and
the immunogenic composition and the adoptive immune cell are administered so that the immunogenic composition produces an innate immune response in the target tissue and causes the adoptive immune cell to localize to the tumor in the target tissue, thereby enhancing the anti-tumor efficacy of the adoptive immune cell,
wherein:
the bacterial mammalian pathogen is the *E. coli* and the cancer is ovarian cancer and the target tissue is ovary or the cancer is colon cancer and the target tissue is colon, or
the bacterial mammalian pathogen is the *K. pneumoniae* and the cancer is a melanoma with metastases to lung and the target tissue is lung; and
further wherein:
the immunogenic composition is administered in a plurality of doses over a dosage duration, and the dosage duration is at least two weeks;
the doses are administered subcutaneously every day, or every other day; and
the adoptive immune cell is administered after initial administration of the immunogenic composition and administration of the immunogenic composition is continued after administration of the adoptive immune cell.

2. The method of claim 1, wherein the adoptive immune cell is recombinant, and/or wherein the antigen is one or more of a NKG2D ligand, DAMP, CD3, CD19, CD22, CD123, B-cell maturation antigen (BCMA), WT1, L1CAM (CD171), ROR1, Lewis Y (LeY), IL-13Rα2, GD2, Mesothelin (MSLN), PSA, CAIX, folate receptor α, HER2, EGFR, EGFRVIII, VEGF2, ErbB, ErbB2, CEA, PSMA, MUC1, MUC16, FXYD3, carcinoembryonic antigen (CEA), CEACAM5, carbonic anhydrase IX or fibroblast activation protein α (FAP), or prostate stem cell antigen (PSCA).

3. The method of claim 1, wherein the adoptive immune cell is selected from the group consisting of gamma delta T cells, engineered T-cells, chimeric antigen receptor (CAR) T cells, T cell receptor (TCR) modified T cells, TCR-Tg cells; NKG2D-CAR T cells, lymphokine-activated killer (LAK) cells, tumor-infiltrating lymphocytes (TILs), natural killer (NK) cells, CAR NK cells, NK T cells, cytokine-induced killer (CIK) cells, cytokine-induced NK cells, cytokine-induced dendritic cells (DCs), cytokine-induced T cells; TRUCKs (payload carrying CAR T cells) and allogeneic CAR T cells.

4. The method of claim 1, wherein the receptor for the cancer antigen is recombinant.

5. The method of claim 1, wherein the receptor for the cancer antigen is a chimeric antigen receptor, a modified T cell receptor or a modified NK cell receptor.

6. The method of claim 1, wherein the subject is a mouse, cat, dog, horse, rodent or human.

7. The method of claim 1, wherein the recombinant bacterial cell comprises a recombinant gene encoding a pattern recognition receptor (PRR) agonist.

8. The method of claim 1, wherein the adoptive immune cell expresses a NKG2D receptor element and the antigen is a NKG2D ligand.

9. The method of claim 1, wherein the cytokine receptor is recombinant.

10. The method of claim 1, wherein the cytokine receptor is CCR2b.

11. The method of claim 1, wherein the immunogenic composition further comprises one or more of: GMCSF, vitamin D, NOHA, alpha-1 antitrypsin, glutathione, an isoprenoid, or α-galactosylceramide.

12. The method of claim 1, further comprising measuring the level of a biomarker in the subject selected from the group consisting of PD1, PDL1, neutrophils, and NKG2D.

13. The method of claim 12, wherein the measuring comprises measuring the level of the biomarker PD1 and/or PDL1 in cells present in the target tissue.

14. The method of claim 1, wherein the immunogenic composition further comprises a cancer antigen.

15. The method of claim 1, wherein the immunogenic composition is administered at an administration site that is not the target tissue.

16. The method of claim 1, wherein the bacterial mammalian pathogen is the *E. coli* and the cancer is ovarian cancer and the target tissue is ovary.

17. The method of claim 1, wherein the bacterial mammalian pathogen is the *E. coli* and the cancer is colon cancer and the target tissue is colon.

18. The method of claim 1, wherein the bacterial mammalian pathogen is the *K. pneumoniae* and the cancer is melanoma with metastases to lung and the target tissue is lung.

* * * * *